US 7,579,984 B2

(12) United States Patent
Wang et al.

(10) Patent No.: US 7,579,984 B2
(45) Date of Patent: Aug. 25, 2009

(54) ULTRA-TIGHTLY COUPLED GPS AND INERTIAL NAVIGATION SYSTEM FOR AGILE PLATFORMS

(75) Inventors: Hanching Grant Wang, Hacienda Heights, CA (US); Bruce Cordell Detterich, Orange, CA (US)

(73) Assignee: The Boeing Company, Chicago, IL (US)

( * ) Notice: Subject to any disclaimer, the term of this patent is extended or adjusted under 35 U.S.C. 154(b) by 497 days.

(21) Appl. No.: 11/286,031

(22) Filed: Nov. 23, 2005

(65) Prior Publication Data

US 2007/0118286 A1 May 24, 2007

(51) Int. Cl.
*G01S 5/14* (2006.01)
*G01C 21/00* (2006.01)
(52) U.S. Cl. .................. 342/357.12; 701/216
(58) Field of Classification Search ........................ None
See application file for complete search history.

(56) References Cited

U.S. PATENT DOCUMENTS

| 6,445,756 | B1 * | 9/2002 | Takahashi | 375/343 |
| 6,516,021 | B1 * | 2/2003 | Abbott et al. | 375/150 |
| 6,731,672 | B1 * | 5/2004 | Eschenbach | 375/140 |
| 7,154,937 | B2 * | 12/2006 | Gilmour et al. | 375/148 |
| 2005/0147191 | A1 * | 7/2005 | Geier et al. | 375/344 |

* cited by examiner

*Primary Examiner*—Gregory C Issing
(74) *Attorney, Agent, or Firm*—Haynes and Boone, LLP

(57) ABSTRACT

An Ultra-Tightly Coupled GPS-inertial navigation system for use in a moving agile platform includes a range residual extractor that uses best curve fitting of a third order polynomial for estimating range residual. The curve-fitted residual is used to update an error Kalman filter. The error Kalman filter includes correction for navigation solution, and IMU and GPS parameters. The navigation solution together with GPS parameter corrections are used in a Tracking Predictor to generate high-sampling-rate carrier and code replicas. The curve-fitting error covariance indicates signal to noise ratio for the tracked GPS signal and may be used for early indication of interference or jamming.

13 Claims, 9 Drawing Sheets

500

ULTRA-TIGHTLY COUPLED GPS AND INERTIAL NAVIGATION SYSTEM FOR AGILE PLATFORMS

FIELD OF DISCLOSURE

The present invention relates generally to GPS and Inertial navigation systems for use on moving agile platforms (e.g., moving missiles, aircraft or spacecrafts) and more specifically to an ultra-tightly coupled (UTC) GPS/inertial navigating system.

CROSS REFERENCE TO PATENTS

The disclosure of the following U.S. patent is incorporated herein by reference:
(A) U.S. Pat. No. 6,516,021 B1, issued Feb. 4, 2003 to Abbott et al. and entitled "Global Positioning Systems and Inertial Measuring Unit UltraTight Coupling Method".

CROSS REFERENCE TO APPLICATIONS

The pending below application is owned by the owner of the present application, and its disclosure is hereby incorporated by reference herein:
(A) U.S. Ser. No. 10/647,958 of Hanching Grant Wang et al, filed on Aug. 26, 2003.

DESCRIPTION OF RELATED ART

Use of Global Positioning Systems (GPS) for locating an object within the framework of a constellation of GPS satellites is known in the art. Use of inertial measurement for locating a moving object is also known in the art. Each approach has strengths and weaknesses. One problem that GPS systems face is loss of signal tracking. If signals are lost from one or more of a set of in-view GPS satellites, for whatever reason (e.g., jamming, interference, lack of satellite within antenna field-of-view), it may become difficult or impossible for the GPS system to provide a standalone correct solution for object location in three dimensional (3D) space. Another drawback of using GPS alone is its low dynamic bandwidth. This makes a standalone GPS system insufficient for navigation and control of fast-moving and/or highly agile platforms.

One problem which inertial measurement systems face is drift over time without error bounding. Tiny errors in the measurement of platform accelerations and/or attitude rate integrate over time and can therefore produce significant positional and/or velocity errors. It is well known in the art of on-board navigation systems to use GPS and inertial measurement systems together so that each can help the other in overcoming their respective deficiencies.

There are different categories and levels of intercouplings between GPS and inertial measurement systems, ranging from loosely-coupled to tightly-coupled to ultra-tightly-coupled (UTC). A detailed introduction to UTC systems may be found in the above cited U.S. Pat. No. 6,516,021 (issued to Abbott et al. Feb. 4, 2003). Despite advances in intercoupled GPS/inertial-measurement systems, there is still room for improvement.

SUMMARY

An improved UTC GPS/inertial system is mounted on an agile platform in accordance with the present disclosure of invention and includes: (1) a plurality of range residual extractors (RRE's) for making measurement observations relative to an in-sight constellation of GPS vehicles; (2) a main error Kalman filter (EKF) for maintaining a situational model that is statistically adjusted relative to the plural measurement observations taken over time between the platform and the in-sight constellation of GPS vehicles; (3) an inertial navigation module (INM) that receives inertial measurement signals and integrates these in accordance with corrective signals provided by the main EKF; and (4) a plurality of GPS tracking predictors for predicting effective carrier frequencies and code phases for next-existing, relative positional and/or velocity states between the in-sight constellation of GPS vehicles and the platform.

One of the operations carried out in such a UTC GPS/inertial system is that of determining a parameter known as the pseudo range residual (RR). It may be derived from so-called in-phase (I) and quadrature phase (Q) components of a properly-tracked and synchronously-demodulated GPS signal. In accordance with a first aspect of the present invention, a curve fitting mechanism such as a least means square (LMS) curve fitting mechanism is used to find a second order or third order, magnitude-versus-time polynomial that mathematically correlates to carrier phase and/or code phase change of an obtained set of m digital samples from received GPS signals. The value of m can be adjusted so that the rate of production of GPS solutions closely matches solution input rates of other modules in the system. The fitted polynomial can be used to predict the over-time trajectory of the range residual parameter (RR) and to thereby predict Doppler effects expected for GPS carrier frequency and for GPS code phase. In one embodiment, the utilized samples represent integrated correlations of the in-phase (I) and quadrature phase (Q) of received GPS signal components, where the latter components are correlated relative to differently delayed versions (E=early, L=late, P=prompt) of a locally generated, pseudorandom code sequence (PRN). Curve-fitting coefficients representing range residual and rate of change of the RR for each GPS channel are solved for in respective ones of a plurality of range residual extractors (RRE's) and the plural solutions are then forwarded to a relatively slow-cycling Error Kalman Filter (Big EKF). The Big EKF derives and estimates correction signals from the plural RRE solutions and then sends the correction signals to a faster-cycling, inertial navigation module (INM) and to a faster-cycling, GPS tracking predictor, for assisting in the generation of an integrated navigation solution and in the generation of a prediction of GPS line-of-sight (LOS) range shift and Doppler shifts. The curve fitting mechanism in the RRE operates to remove noise from the received GPS sample data. The tightness of the fit (covariance) of the curve fitting process may be used to indicate what signal to noise ratio was present and thus how reliable or how certain the curve fitting solution is. The curve fitting mechanism allows for different output sampling rates (different rates at which the fit-derived RR and RR rate are output) because a time-backwards span of curve fitting operations can be adjusted to use a different number (m) of samples per curve fitting and to thus serve different input sample rates of different applications (e.g., the slow-cycling Error Kalman Filter). RRE extractions can be performed in parallel for respective GPS channels, thereby reducing computation time and freeing the EKF from managing each GPS channel individually.

Another of the operations carried out in a UTC GPS/inertial system is that of feeding a navigation solution signal, at an IMU-dictated sampling rate, to a GPS tracking predictor so that the predictor can use the navigation solution to help it predict how various GPS space vehicles (SVs) are going to shift in relative position and relative velocity with respect to the agile platform on which the predictor and IMU are mounted. In such an intercoupling of IMU and GPS operations, the relative location (including attitude) of the platform, relative to the SV constellation, may be derived from the latest output sample of the navigation solution signal and the propagation of earlier tracked locations of the utilized GPS constellation of SVs. The relative position and velocity information (related to RR and RR rate) extracted from this intercoupled operation may be used to generate antenna selection and direction corrections and carrier phase and code phase and Doppler shift corrections. However, the problem is that the IMU may not be generating navigation solutions fast enough to keep up with the GPS carrier and code shifting relative to the rate of platform position and attitude changes. In accordance with one embodiment of the present invention, Doppler shift corrections (which in turn, define apparent frequency variation in the GPS carrier) are generated by the GPS tracking predictor at a substantially higher sampling rate (e.g., 1000 Hz, 500 KHz) than the sampling rate (e.g., 100 Hz) at which navigation solutions are produced by the navigation module (INM). The higher output sampling rate(s) of the GPS tracking predictor allows a highly-agile platform system to maintain a better phase and frequency lock on incoming GPS carrier signals and their embedded navigation data.

In accordance with another aspect of the invention, compensating corrections for drift of clock bias, of data synchronization latency, and of sensor latency are provided so as to improve the accuracy of various signals within the UTC system.

Other aspects of the disclosure will become apparent from the below detailed description.

BRIEF DESCRIPTION OF THE DRAWINGS

The below detailed description section makes reference to the accompanying drawings, in which.

DETAILED DESCRIPTION

Figure 1:
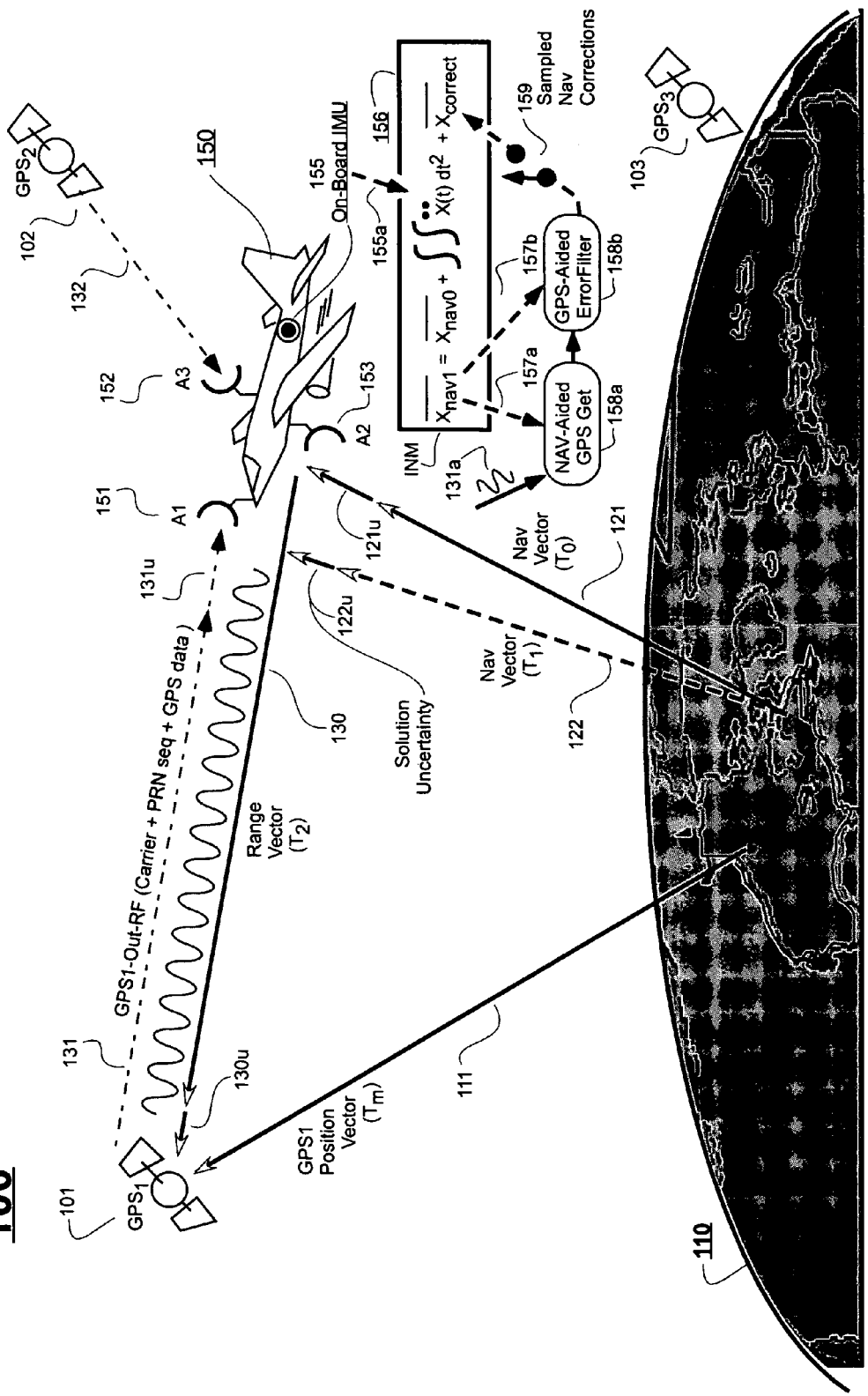
FIG. 1 is a schematic diagram showing a multidimensional environment in which a moving platform (e.g., aircraft) can make use of an Ultra-Tightly Coupled (UTC), cross-integrated GPS and inertial navigation system in accordance with the invention.

FIG. 1 is a schematic diagram showing a multidimensional environment 100 in which a moving platform 150 (e.g., an agile aircraft, an accelerating missile, or another such vehicle) can make use of an on-board Ultra-Tightly Coupled (UTC) GPS and inertial navigation system in accordance with the invention. As explained above, a detailed introduction to UTC systems may be found in U.S. Pat. No. 6,516,021 (issued to Abbott et al. Feb. 4, 2003). The Abbott '021 UTC system differs from the present invention at least in that Abbott '021 uses a so-called Kalman Pre-Filter to drive a main Kalman Filter and that Abbott '021 does not account for sampling-rate disparities of and between the GPS tracking unit and the inertial measurement unit (IMU).

FIG. 1 uses a high speed aircraft as an example of the moving platform 150 that is moving relative to the Earth 110 and relative to a constellation of GPS (Global Positioning Satellite) space vehicles (SVs). Although only three GPS SVs, 101, 102 and 103 are shown, it is generally understood that a constellation of at least 24 such GPS SVs currently surround the Earth 110 in Medium Earth Orbit (MEO) and that roughly only 12 or less of these will normally be in the field of view of a low altitude or suborbital craft. It is further understood that, for GPS standalone navigation solution, locked-on tracking is generally desired of at least four radio signals (RF) emitted by a respective four GPS SVs in order to determine platform 3D position and platform time (at least 4 dimensions total) relative to the GPS SVs 101, 102, 103. Each received GPS signal (e.g., 131) includes data representing its time of transmittal, $T_{sent}$, where the reference clock for $T_{sent}$ is very accurate. The platform 150 keeps its own, slightly less accurate clock and uses it to determine $T_{received}$, the time when the corresponding GPS signal is received. Then, assuming the signal speed was equal to c, the speed of light in free space, the range (R) between the platform 150 and the GPS transmitter (e.g., vehicle 101) may be estimated as: $R \sim (T_{received} - T_{sent})*c$. A number of factors contribute to error in this estimation. First, the actual signal does not travel through free space, but rather through layers of the atmosphere that add additional propagation delay and are difficult to model. Hence the value, c does not accurately reflect the true speed of the signal. Second, the on-platform clock is subject to having a bias error and to drifting. Hence the value, $T_{received}$ may not accurately reflect the actual time of receipt. Therefore, there is error in each of the factors in the product: $(T_{received} - T_{sent})*c$.

A yet more fundamental problem is that keeping a lock on each incoming GPS signal. As the speed and maneuvering agility of the moving platform 150 increases, it becomes more difficult to quickly acquire (or re-acquire) each of the GPS-emitted radio signals (e.g., 131, 132), to track the relative motions of their sources, to maintain frequency and phase locks on the respectively tracked GPS signals, to extract useful, noise-free information from each of the tracked signals, and to utilize the extracted information to accurately correct for inertial measurement drift. (The latter drift relates to operation 156, which operation will be further detailed below.)

For ease of understanding, the illustrated platform 150 is shown to have three steerable antennas provided thereon: A1 (151), A2 (153) and A3 (152). More practical systems often used phased array antennas with programmable digital beamforming capabilities rather than mechanically aimed antennas. Antenna A1 is shown to have its line-of-sight (LOS) correctly angled towards the first GPS space vehicle 101 so as to pick up the linearly propagated and circularly-polarized RF/microwave signal 131 arriving from vehicle 101. (In one embodiment, signal 131 has a carrier frequency of about or greater than about 1 GHz. Currently used GPS carrier frequencies are covered by the L1, L2 and L5 bands.) Antenna A3 is similarly shown to be correctly directed towards the second GPS space vehicle 102 so as to pick up corresponding RF signal 132 transmitted from GPS vehicle 102. Antenna A2 is shown to be not aimed at any particular GPS vehicle at the moment. Thus, acquisition of GPS signals 131 and 132 has already occurred and the platform 150 is now in a steady state mode relative to those acquired GPS signals. However, it can be appreciated that the platform (aircraft) 150 may quickly pitch its nose upwardly, in which case antenna A1 (151) may quickly lose its LOS on RF signal 131 while the underside A2 antenna may have an opportunity to lock onto that RF signal 131. Thus, as such a rapid pitch-up of the platform nose occurs, it may be advisable at that time to switch to using antenna A2 (152) for regaining tracking of the RF signal 131 that was lost by antenna A1 (151). Although not shown, other reasons for switching between different sets of utilized antennas may be due to quick rolling of the platform body 150 about its forward axis of movement and/or intermittent jamming or interference of signals 131, 132, etc. transmitted from the various GPS vehicles 101-103 to the platform. (Note that if GPS vehicle 103 drifts below the horizon it will generally be out-of-view to the antennas of platform 150 and thus no longer acquirable.)

In order for the platform 150 to internally establish its position relative to the Earth 110 and relative to each of the in-view GPS space vehicles, the platform may use a variety of position-defining techniques. One or more of the techniques may be used alone or in combination for arriving at an internally-available, "navigation solution" ($X_{nav1}$). A first of these techniques relies on adding a relatively precise, first vector 111 to a less precise, second vector 130. The more precise vector 111 can be drawn from a pre-established ground position to a precisely predicted position of a given GPS vehicle (101) at a corresponding time, say time $T_m$. Data representing this relatively precise vector 111 may be uplinked to the $GPS_1$ vehicle 101, embedded in the GPS navigation message, and later downlinked to the platform 150 after acquired and tracked the GPS signal so that an on-board computer of platform 150 obtains knowledge of the precision-determined parameters of vector 111 (ephemeredes data). But it is up to the on-board computer (not shown) to determine what the parameters of the second vector 130 are at the same time, $T_m$ based on GPS signals received at different time points, i.e., $T_2$. The length of the second vector 130 is often referred to as the GPS range (R).

A second position determining technique determines the parameters of a third vector, 121 drawn between the take-off position and current position of platform 150 at time point $T_0$. This third vector 121 may be developed using an on-board, inertial measurement unit (IMU) 155 within the body of the flying platform 150. Extension 121u represents amounts of uncertainty that are present in the various coordinate parameters of third vector 121 (e.g., the x, y, z, pitch, roll and yaw coordinates), where the coordinate parameters are defined as computer-stored variables (e.g., $X_{nav0}$) in an on-board navigation computer of the flying platform. Those skilled in the art will appreciate that the on-board IMU 155 includes appropriate gyroscopes and/or accelerometers for determining rotational accelerations and/or linear rates of the platform 150 from the time it takes off until its current in-flight state. However, as indicated above, over-time integration of the IMU output is subject to a growing and unbounded drift error.

By merging the first technique (GPS-based solution using vectors 111 and 130) with the second technique (IMU-based solution using vector 121), and properly accounting for the timing differences between the two techniques (To does not necessarily equal $T_m$ or $T_2$) it is possible to produce a synergistic "navigation solution" that reduces the errors generated by each of the first and second techniques taken alone. Computation box 156 in FIG. 1 shows that a current navigation position ($X_{nav1}$) value may be iteratively calculated in part from a previously calculated or given navigation position (initial state, $X_{nav0}$) by adding to $X_{nav0}$ a double integration over time of the IMU-measured platform accelerations (X double dot). However, due to unavoidable IMU measurement errors and uncertainties (i.e., sensor latencies and drifts thereof), due to bias, misalignment and scaling factor uncertainties and/or due to drifting clock bias, a growing error or positional drift often enters the navigation solution ($X_{nav1}$ of box 156, where the bar indicates it is a multidimensional vector quantity). This growing error can become unacceptably large if the navigation solution is not periodically recalibrated or "corrected" by the addition of an $X_{correct}$ factor. In one embodiment, the magnitude, direction and rate of current change of the correction vector ($X_{correct}$) can be determined by combining a sequence of older, GPS snapshot solutions 158a with a corresponding sequence of older navigation solutions ($X_{nav0}$'s, or alternatively, older EKF states) and filtering this historical data through a GPS-aided error filter 158b to develop a predictive model that predicts what the next $X_{correct}$ vector should be in view (157b) of what the recent navigations solutions were. At the same time, the taking 131a of newer GPS snapshots 158a can be augmented by use (157a) of the latest navigation solution if GPS-aided production 158b of the $X_{correct}$ vector is of improved accuracy. Thus the newest navigation solution ($X_{nav1}$) is enhanced by the improved taking 131a of GPS snapshots 158a to thereby produce a better $X_{correct}$ vector and the taking of GPS snapshots 158a is enhanced or aided (157a) by the provision of more accurate navigation solutions ($X_{nav}$'s). Box 156 and the various feedback loops (157a,157b, 159) drawn thereabout roughly show the synergistic loop as being constituted by navigation contributions 157a to the NAV-aided getting of the GPS solution 158a and by the GPS-aided and NAv solution driven (157b) filtering of error signals to thereby timely out sample (159) next correction snapshots ($X_{correct}$) for improving the overall accuracy of the more recent navigation solution samples ($X_{nav1}$).

Often, the IMU-driven double-dot portion 155a of the navigation solution generating operation, 156, is changing fairly rapidly (say about once every 10 milliseconds) and is being so used to contribute to the navigation solution ($X_{nav1}$, which therefore also updates about once every 10 ms in response to IMU produced inertial measurements). On the other hand, the $X_{correct}$ factor is often changing at a much slower rate (say in the range of about once every 500 ms to every 1000 ms) partially due to the large amount of time required to accurately compute $X_{correct}$. The computed $X_{correct}$ factor therefore contributes to the navigation solution much less often than does the double-dot factor. This slower contribution of computed corrections ($X_{correct}$) can lead to an undesirable increase of error within the navigation-aided getting (158a) of the GPS based information, which data generally comes in at a much faster rate than either the inertial measurements (155a) or the computed corrections ($X_{correct}$).

Such increase of error in the NAV-aided production (158a) of GPS data tends to increase the uncertainty factor 130u of the GPS based vector 130, which in turn increases the uncertainty 121u contained within the overall, navigation solution vector 121.

A number of methods may be used for reducing the overall uncertainty factor 121u in the navigation vector 121. One is to reduce the amount of uncertainty contained in the slowly-updated, $X_{correct}$ factor. A correlated one is to reduce data synchronization error between iterations of the NAV solution and delivery of the $X_{correct}$ factor. (Even if $X_{correct}$ is accurate for a given insertion time $t_{i1}$, if it is inserted into operation 156 at another effective time, $t_{i2}$, that synchronization problem introduces error.) Another possible method of improvement is to increase the rate 159 at which the $X_{correct}$ factor is updated. It would be better yet if both could be done together, namely, providing faster-delivered and more accurate $X_{correct}$ factor signals. However, if the update rate 159 is increased while sacrificing too much of the accuracy 158b provided by filtered generation of the $X_{correct}$ factor signals, the overall uncertainty 121u within the navigation solution may disadvantageously increase.

Yet another method for reducing uncertainty 121u is to improve the phase relationship between the inertial measurements 155a and their combination with the $X_{correct}$ signals. The inertial measurement signals might be relatively accurate for a first identifiable time point, $t_{pt1}$, but latencies may be present that cause the measurements to be computationally associated with a different and thus wrong time point, $t_{pt2}$ for which time point $t_{pt2}$, the state of the system has changed substantially such that the delivered inertial measurement signals 155a are no longer accurate. In other words, it is desirable to adjust for possible latencies and/or mis-synchronizations between the double-dot signal and the $X_{correct}$ signal.

As will be seen, the present invention provides a number of methods for reducing uncertainty 121u in the navigation solution. According to one aspect, compensation is provided for measurement latency inherent in the inertial sensors which drive the double-dot portion 155a of the navigation solution. According to another aspect, compensation is provided for data synchronization error possible between the IMU-produced data and the GPS-produced data. According to another aspect, compensation is further provided for a possible drift of an on-board time clock relative to the more accurate GPS constellation clock so that the ($T_{received}-T_{sent}$) difference can be more accurately computed. According to another aspect, signal to noise ratio is reduced in the GPS snapshot samples (131) that are used to generate the $X_{correct}$ factor signal through the use of curve-fitting techniques. According to another aspect, the rate at which a GPS solution portion 158 of the system tracks the incoming GPS signals (131, 132, etc.) is improved. These various aspects combine to improve accuracy and decrease uncertainty in GPS solution snapshots (produced by unit 158a) that are used to then carry out the GPS-aided error filtering (in unit 158b) and to generate the $X_{correct}$ samples 159. This in turn improves accuracy and decreases uncertainty in the ultimate, navigation solution signal 156 ($X_{nav1}$). It will be seen that the more accurate $X_{nav1}$ signal feeds back via path 157a to the GPS solutions generator 158a to help the latter generator 158a to keep a better lock on the incoming GPS signals (131, 132, etc.). That is why it is a UTC system. The GPS hand (158a) synergistically aids the Nav solution hand (185b, 156) and vise versa.

Several hurdles need to be overcome to get to a steady state condition where a fairly accurate GPS solution is being rapidly generated by unit 158a from acquired GPS signal samples 131a, where noise content is reduced and where the ultra-tight assistance or reinforcement 157a from the navigation solution output 156 to the GPS solution output (that of 158a) reaches an acceptable level of accuracy and timeliness. As is implied by dashed connection 157a, because the various GPS RF signal states (from each SV 101-103 to the platform 150) change so much faster than the production of navigation solutions (by on-platform unit 156), a somewhat aged set of navigation solutions ($X_{nav0}$'s) is used to help point the various antennas A1-A3 in the correct directions (in the direction of Range vector 130 for the case of A1) so that the GPS portion (158a) of the system can then better receive and lock onto the frequency and phase of incoming GPS RF signals 131, 132, etc. Then certain aspects of the received and tracked GPS signals are extracted via demodulation and used to reduce uncertainty 130u in the on-board platform representations of the respective Range vectors 130 for the various GPS vehicles 101-103. (The range vectors are GPS based measurements that can be used to generate more accurate $X_{correct}$ samples.) Once the GPS uncertainties (e.g., 130u of vector 130) are sufficiently reduced, the Range vector data (130 plus 130u) may be added to the GPS1 position vector 111 to arrive at a GPS-based, snapshot solution that updates the $X_{correct}$ factor (via error-filtering step 158b and sampling switch 159) and improves resolution of the platform position vector 121. (Actually, to have complete observability of platform position at any given time, at least four GPS Range vectors should be resolved for signals output from a corresponding, at least four GPS vehicles 101-103 in order to obtain a GPS based, solution-improvement for the 3 dimensional position and on-board clock time—x, y, z, t—of platform 150.)

The GPS signal 131 output from space vehicle 101 includes several components which allow the moving platform 150 to better resolve the coordinates of the so-called, pseudo range 130. (It is referred to as "pseudo" because it depends on propagation time of an electromagnetic signal through variable media, i.e. the different layers of the atmosphere.) These GPS signal components include a carrier of known transmission frequency and one that has a determinable phase. It also includes an embedded pseudo-random code sequence (PRN seq.) and embedded GPS clock data. Distance between the GPS vehicle 101 and the platform 150 can be approximated by determining the time it takes for the electromagnetic radiation to travel from vehicle 101 to platform 150. This can be found by multiplying the speed of light, c against the difference between reported satellite time and the receipt time registered by the platform's on-board clock. This same, signal-traveling distance can be expressed as a whole number of full wavelengths of the carrier or of the embedded PRN code at their known transmission frequencies (e.g., L1 carrier is about 1.57542 GHz and C/A PRN code chip rate is 1.023 MHz) plus a fractional portion of a carrier wavelength or of a PRN code chip. (A chip is the time span of a received PRN code stream. In one embodiment, a chip is about 100 nsec long.) The difference between the measured range and the predicted range, a fraction of the code chip, is often referred to as the range residual (RR) and it may be used to improve the accuracy of the $X_{correct}$ signal and thus improve the on-platform resolution of navigation solution vector 121.

More specifically, the PRN code phase of the incoming GPS signal 131 is used at the platform 150 to determine the range residual. Unfortunately, the platform 150 is often moving at a high velocity either towards the GPS vehicle 101 or away from it, or rotating rapidly relative to it, thereby adding a Doppler effect and antenna moment arm effect to the perceived carrier frequency and phase of each incoming GPS signal. Real-time compensation is needed to counteract the Doppler effect so that the onboard computers can lock onto the next incoming GPS signal stream 131, synchronize with it and thereby enable correct demodulation of the navigation data embedded in the carrier signal. This is where the ultra-tight coupling aspect (UTC) of the latest navigation solution comes into play. The latest navigation solution 157a is used to assist in keeping track of the one or more GPS signals for use in producing a next, the GPS-aided navigation solution 156 (the solution is produced by a computation loop including a slow-cycling, error-correcting Kalman Filter, see EKF 270 of FIG. 2). Then, with tracking achieved, the embedded PRN sequence data in the tracked GPS signal(s) is used to lock onto its/their code phase(s). Then the phase-synchronized signal is further used to extract GPS data from it for arriving at one or more corresponding GPS-based position, speed and time measurements. The resolution and accuracy of the GPS measurement(s) (whose determinations are based on calculated signal traveling time) can be further improved by determining the magnitudes of the fractional code chip and/or carrier wavelength portions of the received signals (131, 132, etc.).

Figure 4A:
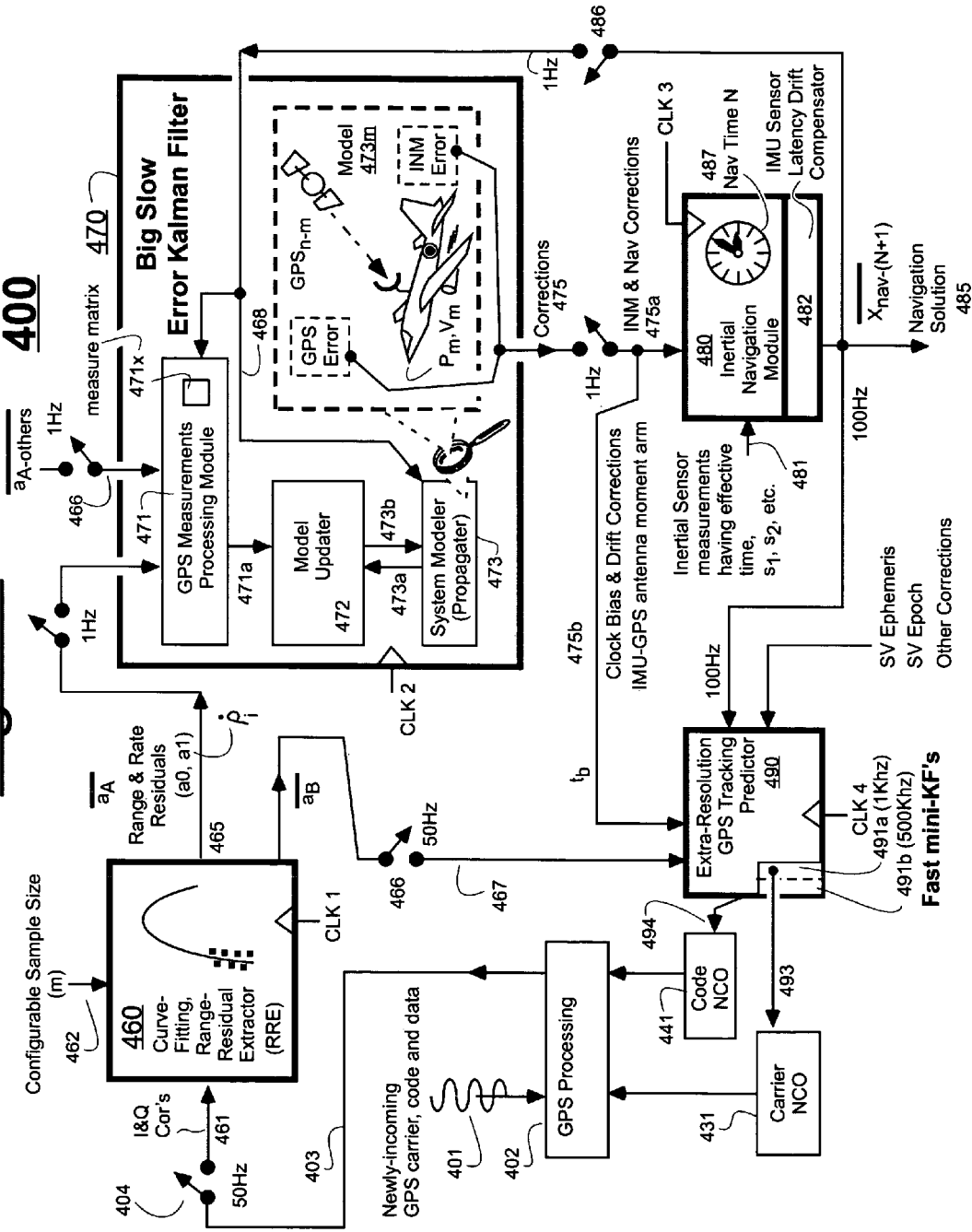
FIG. 4A is a block diagram of the integrated UTC modules of one embodiment showing interrelated inputs and outputs between each module.

There is one additional consideration to be discussed in reference to FIG. 1. It takes a finite amount of time for the inertial sensors associated with the onboard IMU 155 to make their inertial measurements and send the corresponding electrical signal representations (samples 155a) to navigation solution box 156 for integration into the latest solution output ($X_{nav1}$). The measurement and transmission latency amounts can be measured in a laboratory, but in the field, the actual values tend to drift over time, thereby introducing an uncertainty factor into the double-dot portion 155a of the navigation solution 156. Also, the measurement sampling phase and/or rate of the IMU 155 will generally differ from the sampling phases or rates 159 of the GPS-aided production of the $X_{correct}$ factor. This is a data synchronization problem that can suffer from over-time drift when the platform 150 is operating in the field and experiencing various environmental conditions. In addition to these problems, there will also be some clock bias drift and data transport latency drift embedded in the GPS-based corrections. Integrated solutions for these problems will be disclosed when FIG. 4D is described in detail.

Speaking more generally now and retaining focus on FIG. 1, it may be appreciated that an on-platform UTC system 156 can be exposed to a constantly and rapidly changing environment to which the system should dynamically adapt in real time—or better yet, to which the system should preemptively adapt based on forecasts made of what will be happening in the near future (i.e., what will the Doppler shift effects be on GPS signal 131 roughly 1 ms into the future when platform 150 advances from the tip of vector 121 (at time T1) to be at the tip of vector 122 (at time T2)). It takes a finite amount of time for taking measurements and for carrying out measurement-dependent data processing computations in various portions of the system. This introduces a problem of its own when it is desirable to predict ahead of real time what the next Doppler shift will be for each in-sight SV (101-103) but the latest measurement and computational results are valid for a substantially earlier point in real time. By the time a latest navigation solution $X_{nav1}$ has been generated for use (157a) by the GPS getting portion 158a of the system, where that navigation-aided data 157a is based on an old navigation vector obtained at time, $T_0$, the platform 150 has already moved to a new position represented by navigation vector 122, where the latter corresponds to timing coordinate $T_1$ and uncertainty vector 122u and new Doppler effect distortions. A reliable system is needed whereby accurate predictive compensations can be rapidly provided so that the GPS solutions-providing unit 158a can keep an accurate lock on the incoming GPS signals despite the change in position and speed at new location 122 and at new time T1. Solutions for these problems will be disclosed when respective boxes 491a and 491b of FIG. 4A are described as well as FIG. 4C.

Figure 2:
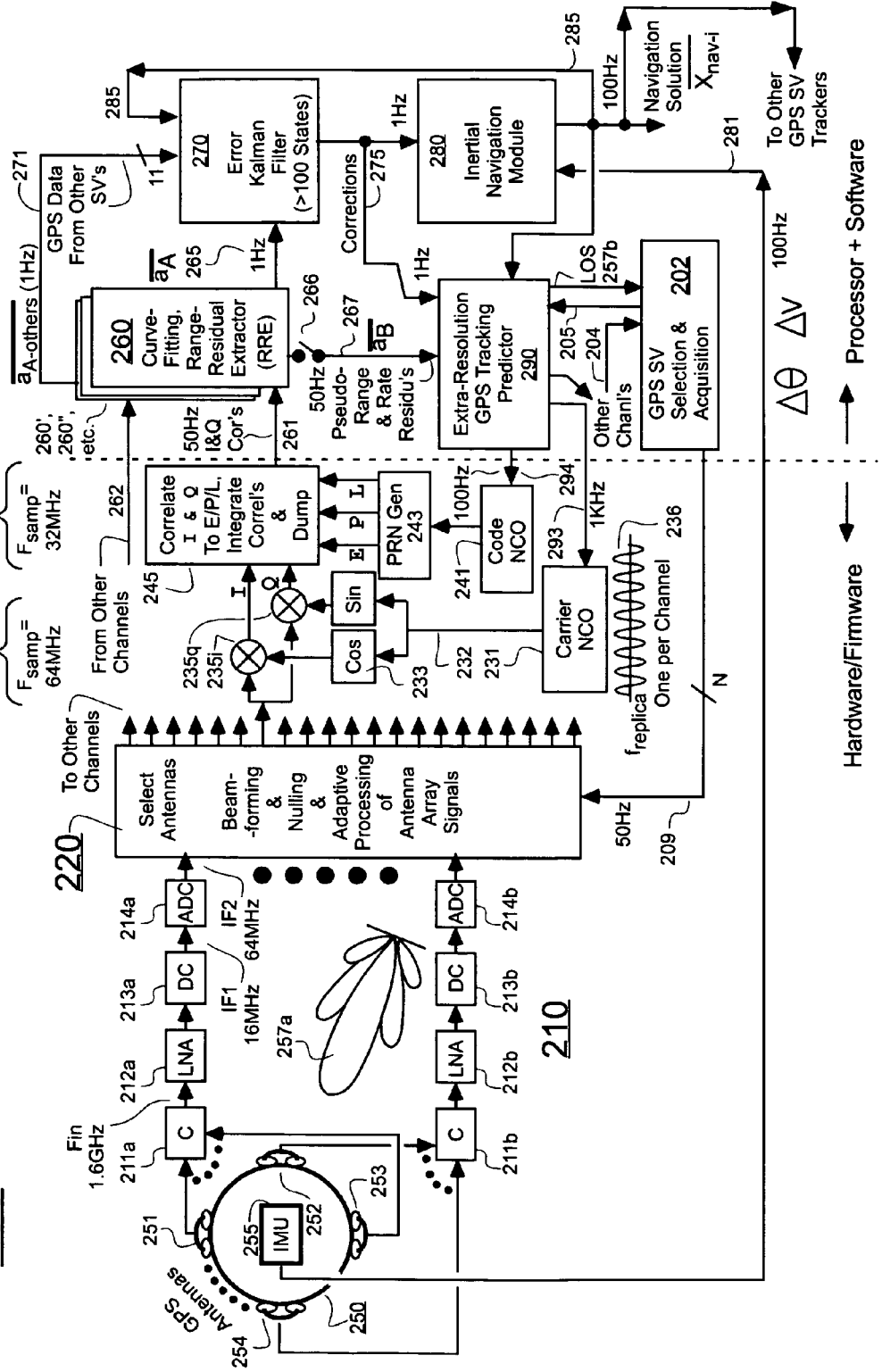
FIG. 2 is a block diagram of a first UTC system in accordance with the invention.

FIG. 2 is a schematic diagram of a first UTC system 200 that is structured in accordance with the invention. Large circle 250 represents a cross section of a tubular platform body (i.e. a missile or aircraft fuselage), which body includes an on-board, inertial measurement unit (IMU) 255 sending inertial measurement signals 281 from IMU-contained inertial sensors to a corresponding inertial navigation module (INM) 280. A series of antenna elements are uniformly distributed about the platform body 250 so that there will generally always be a sufficient number of GPS antenna elements available to point their lines of sight skyward for operative acquisition of at least four GPS signals from a corresponding at least four, in-sight GPS vehicles (e.g. 101-103). For sake of simplicity, icons are provided to represent merely four of the antenna elements, namely 251, 252, 253 and 254. It is understood that in a more practical system, a larger number of antenna elements will be present and more phased-array types of beam-forming connections can be made by that larger number of antenna elements.

The incoming GPS signals (131, 132, etc) are primarily analog in nature and operate at relatively high frequencies such as at about 1.6 GHz. (Although specific frequencies and/or sampling rates are given herein, it is to be understood that these are merely illustrative for showing general relationships between signal rates. Other values of frequencies and sampling rates and relationships may be used as appropriate. Moreover, those skilled in GPS understand that each GPS satellite can transmit over multiple bands, i.e., L1 and L2.) A front-end signal processing section 210 transforms the incoming signals into corresponding digital signals. Although just two, front-end processing paths, 211a-214a and 211b-214b are shown, it is understood that there can be a larger multiplicity of such input paths, i.e. one for each combination of separate antenna element and RF reception band. Signal combiners (C) such as 211a and 211b are provided at the inputs of the front end chains for providing a signal mixing or a signal selecting function. Directional sensitivity pattern 257a represents a possible outcome of such signal mixing and/or selecting. Mechanically steerable antennas are not used in the illustrated embodiment. Instead antenna array technology is used for directing the sensitivity of each of the RF paths towards the relative position of a respective GPS space vehicle (101-103) in digital section 220. Low noise amplifiers 212a-212b are used in the front ends to improve the quality of the selectively combined incoming signals. One or a series of frequency down converters (DC's) such as shown at 213a-213b is used in each front-end path to reduce the carrier frequencies (bands) to a lower intermediate frequencies such as from the 1.6 GHz band down to 16 MHz ($IF_1$). High-speed analog-to-digital converters (ADC's) 214a-214b are used to digitize the down converted signals into sampled streams having a first sampling rate of 64 MHz ($IF_2$) for example.

Digital control unit 220 determines which of the multiplicity of incoming, RF signal paths 211a-214a, 211b-214b; etc, should be used for arriving at GPS calibration measurements and which signals should be ignored. This is referred to as antenna selection. Moreover, digital unit 220 provides control for the antenna element combiners 211a-211b and it further provides adaptive processing for antenna array signals. The specific operations of the GPS antennas 251-254 and the front end processing chains 210 and the digital control unit 220 are not directly relevant to the present invention and their descriptions are provided mostly for completeness of understanding of the overall system. It is to be noted that a control signal 209 feeds back to the digital control unit 220 at a sampling rate of 50 Hz for example. This control signal 209 may be used for determining which of the incoming GPS paths should be selected to use in arriving at the next set of GPS-based correction producing signals, $X_{correct}$. It may be also used for determining the respective line-of-sight (LOS) angles 257b that are to be commanded for each of the incoming RF pathways in front end section 210. It may additionally be used for determining desired null angles for any interference sources detected by the system. (More correctly speaking, a beam forming and nulling algorithm running inside the digital control unit 220 detects jamming situations or the like and calculates the appropriate beam forming and/or nulling parameters to be used as countermeasures.) The GPS vehicle selecting and antenna selecting signal 209 comes from a corresponding GPS SV selection and acquisition control unit 202 which will be later described. This selecting signal 209 is part of a large loop that does not directly affect how quickly the GPS portion can lock onto the carrier frequency and code phase of incoming GPS RF signals and extract useful information from them.

The processing of only one of the GPS channels will now be described for understanding of the carrier lock-on section 230. It is to be understood that the same structure is repeated for each of other GPS channels but these are not shown in order to preserve illustrative clarity. A GPS channel may be defined as corresponding to a given GPS frequency band and also to a given PRN code sequence. Typically, for each given GPS vehicle, a different PRN code sequence is assigned for each of that vehicle's output bands. Each given GPS vehicle will typically have more than one output channel associated with it. For example, if there are 12 in-view vehicles and each transmits on the L1 and L2 bands, there can be a total of 24 received channels (two for each GPS vehicle). The on-platform system 200 of FIG. 2 tries to generate a local and respective, carrier replica signal 236 for each of its active GPS channels. Thus carrier lock-on is performed on a per-channel basis in this embodiment 200. In one embodiment, there can be as many as 24 active channels present at one time. The carrier replicas for each are generated by respective, numerically-controller oscillators (NCO) such as 231. Ideally, the frequency, $f_{replica}$ of each replicated carrier signal should be the same as the Doppler-affected frequency of the incoming channel signal for that channel so that quadrature demodulation may be carried out in units 235i, 235q with minimal error between actual frequency and demodulation frequency. However, typically the replica frequency of each given channel is not exactly the same as that of the respectively incoming RF signal at all times. The platform 250 is moving rapidly and Doppler effects are often changing rapidly. Accordingly, adaptive control signals such as 293 are generated and supplied to the carrier NCO's i.e., 231 for increasing or decreasing their respective counting rates until close, carrier frequency matches are attained for each channel. The speed at which a carrier NCO such as 231 attains a close frequency match depends in part on how well a corresponding GPS tracking predictor 290 (one per channel, and described in more detail below) does its job in predicting relative movement between the platform 250 and the corresponding GPS vehicle (i.e. 101). The GPS tracking predictor has to perform a futuristic prediction rather than a current determination of carrier frequency and phase because of inherent signal propagation latency due to the time it takes for IMU measurement, sampling, and inertial navigation propagation computation. Predictor 290 is in essence using older data to predict what the channel carrier frequency and phase will be of later received GPS signals, where those later received GPS signals are delayed by RF propagation through front end portions 210 and 220. In one embodiment, the total IMU navigation propagation delay is about 0.5 ms and predictor 290 predicts the expected carrier frequency about 0.5 ms ahead in the future based on data garnered 0.5 ms back in the past.

The carrier NCO 231 counts (with wrap around) through address spaces of Sine and Cosine memories 233 at a tracker-corrected increment rate so that digitized representation of corresponding sine and cosine waves at the $f_{replica}$ frequency will be output from the Cos and Sin memories 233. In one embodiment, the sample rate is about 64 MHz. These output sine and cosine waves will be 90 degrees apart from one another and will have a further phase relationship relative to the digitized GPS signal arriving from digital control unit 220 on the exemplary channel.

As already explained, a predetermined PRN code sequence is embedded for each GPS space vehicle so that signal phase can be determined based on this code sequence. (There can be a different one for each transmission band, i.e., for L1 and L2.) CDMA code multiplexing may be used so as to ensure that each GPS space vehicle has a different PRN code sequence during a predefined time period (e.g., a week). Each GPS space vehicle may output its respective PRN code sequence at predetermined timing within its output chip. It is desirable to synchronize an on-board, replica PRN stream with the RF-embedded PRN code and then to subsequently determine the code phase difference between the embedded PRN code sequence of the incoming GPS signal (e.g., 132) and an on-board replica PRN signal (produced by generator 243). Correlation analysis may then be used to determine what code phase difference exists between the GPS and replicated PRN codes. In the illustrated embodiment, the 90 degree apart versions of the carrier replica signal 232 are created as is indicated by the cosine and sine function boxes at 233. The incoming GPS signal is demodulated down to roughly the baseband by multipliers such as shown at 235i and 235q on a per channel basis using the corresponding cosine and sine versions of the replica to produce demodulated I and Q signal components. The I digital components are often referred to as the "in-phase" components while the Q digital components are referred to as the "quadrature-phase" components. In one embodiment, PRN generator 243 has an output sample rate of about 32 MHz, this being the working rate of the code phase matching section 240.

As already indicated, it is desirable to lock onto the code phase of the embedded and known PRN digital sequence in the received GPS channel signal and to determine the rate at which that embedded PRN code sequence is shifting away from the on-board replica (243) or vise versa. This phase shift indicates how the range residual (RR) is changing over time for the given channel. Range residual rate information may then be used to more accurately predict expected Doppler shifts and to thereby more accurately control the carrier NCO 231 for maintaining a demodulation lock on the incoming GPS signal. One problem though, is that the received signals often include noise. A perfect lock-on is rarely possible. Instead, a best correlation lock is sought. In order to perform a best correlation lock onto the code-defined phase of the incoming PRN code sequence (in the I and Q signals), three delayed versions of local replicas of the PRN bit sequence are generated by PRN generator 243. These three, differently delayed, versions are referred to as the E=early, P=prompt and L=late PRN versions. In one embodiment, they are successively a half chip apart from each other. (A chip is the time span of a single PRN code of the code stream.) PRN sequence generator 243 is driven by a numerically controlled code counter 241. Counter 241 counts with wrap-around through the address space of generator/memory 243. The count rate and phase of count should be adjusted though so as to cause the P=prompt PRN version to correlate closely with the code phase of the incoming PRN codes while the E=early and L=late PRN versions correlate much less closely, and with balanced distance from the correlation achieved by the P=prompt PRN version. In the illustrated example, the code NCO 241 runs at approximately 32 MHz but its specific frequency and phase (the address signal sent to PRN generator 243) is updated at a sampling rate of about 100 Hz. The latter updates are provided by update signal 294 coming from GPS tracking predictor 290. The rate at which predictor 290 can practically produce the update signal 294 during steady state running, depends on the rate at which navigation solution samples 285 (100 Hz) are output from a corresponding, inertial navigation module (INM) 280. The accuracy of the predictor produced, phase predictions depends in part on correction signals 275 (1 Hz) output by a corresponding, big-EKF module 270. During a non-steady-state transition, or acquisition mode, a fast GPS sampling switch 266 is closed to obtain high rate GPS measurement samples 267 ($a_B$ samples) from a so-called, RRE unit 260. In one embodiment, this rate is at least 50 Hz, although the rate could be slowed over time as better acquisition is attained, where the more-slowly provided $a_B$ samples contain less noise due to use of a partial curve fitting process (e.g., m<50, as will be explained) where the partial curve fitting is carried out in RRE unit 260.

Unit 245 cross-correlates the E, P, and L sequences coming out of the PRN generator 243 against the I and Q signals arriving from carrier demodulators 235*i* and 235*q*. Due to noise and constant changes within system parameters, as well as due to limits on processor execution speed (especially those of the large and slower-cycling EKF module 270), it is desirable to reduce the output sample rate of the correlations to match two different speeds, namely the 50 Hz acquisition rate of the $a_B$ samples and a much slower, 1 Hz cycling rate of the large and slow-cycling EKF module 270. In the illustrated embodiment 200, this is done in 2 steps. A correlate (and/or sum) and dump algorithm within block 245 reduces the 32 MHz input sample rate of the demodulators 235*i,q* down to 50 Hz by way of correlating integration. In one embodiment, 20 ms worth of I and Q data is integrated into each output sample of block 245, thereby producing a 50 Hz sample output rate. The RRE module 260 then further reduces this 50 Hz sample output rate down to a 1 Hz sampling rate, and while in the process, it further removes noise from the rate reduced signals. In other words, raw GPS measurement data points are compressed into a fewer number of corresponding data points and noise content is reduced in the process before the slowed and compressed measurements are presented to computational unit 270.

The respective cross-correlated results derived from operating the I & Q signals against the early (E), late (L) and prompt (P) local replicas (coming from generator 243) produce six correlation strength signals: $I_E, Q_E, I_P, Q_P, I_L,$ and $Q_L$ within C&D module 245. These six signals can be converted into a phase-representing signal with known techniques. In the embodiment of FIG. 2, a sample down (average down) process to 50 Hz is performed first to produce averaged-down versions of the $I_E, Q_E, I_P, Q_P, I_L,$ and $Q_L$ signals and then the latter signal streams are transferred via line 261 into the RRE for front-end conversion into respective, noise-corrupted phase residual sample signals, or their counterpart noise-containing range-residual samples, $r(\zeta)$ as will be discussed below. The noise-corrupted signals are then smoothed in the RRE's via curve fitting as further discussed below. When the system is essentially locked into carrier and code phase with the incoming GPS signal, the prompt (P) local replica signal stream can be considered to be substantially in-phase with the incoming I signals. Such lock-on can be deemed to have occurred when the power content of the prompt correlation, $R_P$, maximizes and the opposed indicators for early and late correlation power, $R_E$ and $R_L$ (see equations Eq. 1a, 1b below) are substantially smaller and roughly equal to one another so as to statistically cancel out their respectively opposed indications of early and late phase lock-on. This condition leaves the in-phase and quadrature-phase prompt correlations as the statistically predominant indicators of the current carrier phase disparity; and the difference of $R_E$ and $R_L$ as the statistically predominant indicator of code phase disparity between the locally-generated PRN code sequence (243) and the GPS-vehicle generated PRN code sequence for the given channel. Under these conditions, the following indicators can be calculated and used for extracting the range residual magnitude and phase values:

$$R_E = \sqrt{I_E^2 + Q_E^2} \qquad \text{Eq. 1a}$$

$$R_L = \sqrt{I_L^2 + Q_L^2} \qquad \text{Eq. 1b}$$

$$n_c = \frac{R_E - R_L}{R_E + R_L} \qquad \text{Eq. 1c}$$

$$\theta_r = \tan^{-1}(Q_P / I_P) \qquad \text{Eq. 1d}$$

where $\theta_r$ of Eq. 1d represents the carrier phase error between the replicated carrier (232) and the received carrier (also input into multipliers 235*i*, 235*q*) while the $n_c$ result of Eq. 1c defines a code phase error (two times of actual code phase error), which indicates an amount of imbalance between the early and late power values. Ideally, they should be equally balanced.

As the platform moves relative to the GPS SV (e.g., 101), a corresponding change should be observed in the phase error between the platform's prompt PRN code replica (243) and the received PRN code sequence because the range residual, r(t), is changing as a function of time. Therefore the relative phase of the embedded PRN code should also be changing in accordance with variations of the platform orientation relative to GPS vehicle position. It has been observed however, that noise content passed forward from the C&D module 245 corrupts what should otherwise be a polynomial response curve in accordance with classical physical dynamics of two moving masses. According to one aspect of the invention, it is assumed that r(t) takes the form of an $N^{th}$ order polynomial having the code phase error as its variable and further having random noise added on to produced the observed, corrupted output of C&D module 245. This $N^{th}$ order polynomial model with addition of measurement noise is represented by equation Eq. 2a:

$$r(\zeta) = \sum_i a_i \phi_i(\zeta) + v \qquad \text{Eq. 2a}$$

Figure 5:
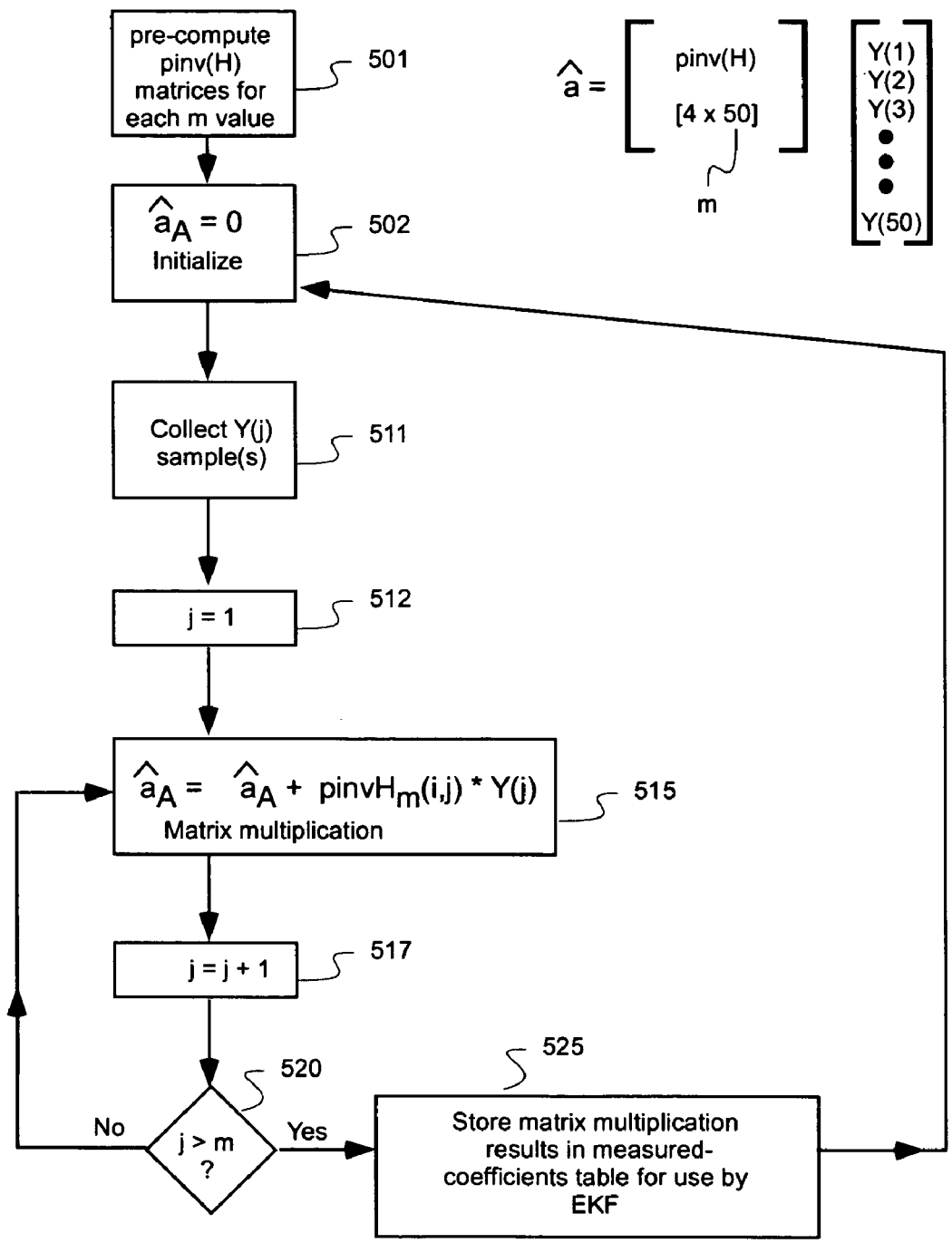
FIG. 5 is a flow chart of a GPS solution generating algorithm that may be used for curve-fitting.

More specifically, in one embodiment the following 3rd order relationship of equation Eq. 2b is assumed:

$$r(\zeta) = \sum_i a_i \phi_i(\zeta) + v \qquad \text{Eq. 2b}$$
$$= a_0 + a_1\zeta + a_2\zeta^2 + a_3\zeta^3 + v$$

where $a_0$, $a_1$, $a_2$ and $a_3$ are unknown coefficients to be solved for over time by way of m-point curve fitting, and $\zeta$ is a reversed-time variable corresponding to each code phase error sample taken at each minor cycle (say, 20 ms per cycle, or a 50 Hz sampling rate on output line 261 of FIG. 2). Accordingly, $\phi_i(\zeta)$ are a set of basis of power functions (e.g., basis of a 3rd order polynomials) which arise over time; $a_k$ are constant coefficient parameter sets whose elements are to be estimated by one or more curve fitting algorithms such as least mean square curve fitting mechanisms (i.e., ones that include computation of a least mean square fitting error); and v is an equivalent measurement noise having a covariance, d which can be determined by signal to jammer power, predetection integration period, and a ratio of carrier power versus noise power: C/No. If noise content is relatively high in the incoming GPS signal then the curve-fitting covariance will generally be large. If noise to signal content is relatively low in the incoming GPS signal then the curve-fitting covariance should generally be relatively small. Thus the curve-fitting attempt will generate a residual covariance (equivalent fitting error covariance) that is indicative of the signal-to-noise ratio of the incoming GPS signal as well as producing compressed GPS measurement samples of slower rate and less noise. (See briefly, FIGS. 3A and 3B.) One of the performance advantages of curve-fit RRE, as compared to other filtering schemes, is that it provides a fitting error covariance measurement based on the computed fitting error of the raw data. The covariance-derived noise indicator may be used for antenna selection and de-selection as well as for other noise responsive functions if desired; for example, providing EKF 270 with a weighting factor for indicating the goodness of measurements made by each respective RRE of the SV range residual for the respective GPS channel. Note that the timespan of the curve-fitting attempt is adjustable. Thus, if the slow-cycling EKF module 270 were running at a slower rate, of say 2 seconds per update (0.5 Hz) rather than 1 second per update (1 Hz), the number of samples, m, used for curve fitting in the RRE 260 could be easily changed from m=50 to m=100 to accommodate the slower update rate of the EKF. Conversely, if the EKF module 270 were running at a faster rate, of say 0.5 seconds per update (2 Hz) rather than 1 second per update (1 Hz) as is illustrated, the number of samples, m, used for curve fitting in the RRE 260 could be easily changed to m=25 to accommodate the faster update rate of the EKF. Moreover, if the correlated I&Q data 261, 262 from a given GPS vehicle was coming in at a rate other than 50 Hz and the desired output sampling rate is, for example, 1 Hz for all, each of RRE's 260, 260', 260", etc. can be operated with its own respective m value. This will be clearer when FIG. 5 is described. Note that parallel RRE's 260', 260", etc. process the correlated I&Q's of other GPS channels. It is feasible to combine GPS signal samples from different carrier frequencies (e.g., the L1 and L2 channels) of a same space vehicle in a same RRE because the range defining polynomial will be unchanged for that one SV even though range measurements are being taken by way of multiple GPS carrier frequencies. The point made here is that the m value for each respective RRE 260, 260', etc. can be adjusted to provide variable rate matching if desired, as well as providing data compression and noise removal and an indication of the amount of noise content found in the output of corresponding C&D module 245. For further information on polynomial curve-fitting, please refer to the co-pending U.S. patent application Ser. No. 10/647,958 of Hanching Grant Wang et al, filed on Aug. 26, 2003, and cited above.

The 3rd order polynomial assumption of Eq. 2b is supportable under basic physics principles because $a_1$ correlates to platform velocity as measured along the line-of-sight (LOS) pointing to the corresponding GPS satellite, $a_2$ correlates to platform acceleration as measured along the same LOS, and $a_3$ correlates to platform rate of acceleration change as measured along the same LOS. Thus the "$a_A$" vector can represent a current model or state of platform position (a0), velocity (a1) and acceleration (a2) as seen along the LOS for the GPS signal feeding the current signal channel. Differently fitted curves with different output sampling rates may be simultaneously generated if desired for each given GPS channel. Thus FIG. 2 shows an $a_A$ vector being output at a 1 Hz sampling rate on line 265 and an $a_B$ vector being output at a different sampling rate (e.g., 50 Hz) on line 267.

Focus is maintained now only on the generation of the $a_A$ vector (1 Hz sampling rate) of line 265 from corresponding I&Q samples 261. For each major computational cycle (of say 1 second each, or 1000 ms), the system can have an m=50 number of minor GPS measurements covering 20 ms each. Each such 20 ms apart, minor sampling point can have a respective range residual value, r(t) which can be viewed as a function of forward-running time, or alternatively this sample can be expressed as r($\zeta$) when viewed as a function of backwards-running time, $\zeta$ (zeta). Use of the backwards-running time variable, $\zeta$ is preferred because r($\zeta$=0) then becomes the initial value or constant bias coefficient, $a_0$ in the polynomial expression. Also, there is a continuum into older history as $\zeta$ increases from 0 (the most recent present) towards positive infinity (previously stored, historical data) and any value of fitted points (e.g., m=50, m=25, etc.) can be selected starting with the same common starting point r($\zeta$=0) and pointing backwards-in-time by different measurement run lengths. The backwards-running time variable, $\zeta$ reaches zero at the end of each gathering of m samples of the correlated PRN phase error. The value of m can be programmably adjusted depending on the use to which the resulting and corresponding $a_A$ vector will be put. There will be one measurement equation (polynomial) for each of the j=1, 2, 3, . . . , m sample points, and a corresponding system of m measurement equations can then be expressed in vector form as:

$$r(\zeta_j) = a_0 + a_1\zeta(j) + a_2\zeta(j)^2 + a_3\zeta(j)^3 \qquad \text{Eq. 3a}$$
$$= [1 \quad \zeta(j) \quad \zeta(j)^2 \quad \zeta(j)^3] \begin{bmatrix} a_0 \\ a_1 \\ a_2 \\ a_3 \end{bmatrix}$$
$$= h^T(\zeta(j))a$$

where zeta ($\zeta$) represents backward-running time (see FIG. 3A), r($\zeta$) is the collection of m (=50) phase measurements which can be re-expressed as an m by 1 (50×1) matrix, Y, and $h^T$ is a collection of m (=50) phase measurement sample times raised to appropriate powers, which $h^T$ collection can be re-expressed as an m-by-4 (50×4) matrix, H in Eq. 3b:

$$Y = \begin{bmatrix} \vdots \\ h^T(\zeta(j)) \\ \vdots \end{bmatrix} a + v \qquad \text{Eq. 3b}$$

$$= Ha + v$$

$$\hat{a} = (H^*R^{-1}H)^{-1} H^*R^{-1}Y \qquad \text{Eq. 3c}$$

$$= (H^*H)^{-1}H^*Y$$

$$= pinv(H)Y, \text{ where } R$$

$$= dI$$

The "a" vector can then be solved for using a curve fitting algorithm such as a least means square curve fitting and by finding the corresponding inverse of the H vector in order to convert from the phase measurement domain (Y) to the "a" vector domain. Then, when given a set of m PRN phase measurements (Y(j) samples), these may be organized into matrix form and multiplied against with the pinv(H) matrix in order to arrive at the best-fit, "a" vector for those m samplings. The programmably established pinv(H) matrix can be precalculated once m is known, and stored as a constant matrix once the increments for zeta ($\zeta$) are determined since pinv(H) is the inverse of those increments taken to appropriate first, second, third and further powers, if any. The added-in noise factor should drop away due to cancellation of random variations provided by the curve fitting operation (e.g., LMS curve fitting). As already explained, noise content ($\gamma$) can be deemed to be relatively small if the curve-fitting error covariance is small and vise versa. The resulting "$a_A$" vector is then output on line 265 from the RRE 260 to EKF module 270. In one embodiment a recomputed version of the "$a_A$" vector is output about once every second (1 Hz). The "$a_A$" vectors output over time on line 265 represent an over-time, consolidated model of how the GPS measured, range residual ($a_0$) is changing relative to time based on accumulated GPS code phase observations taken 50 times over 1 second long, major cycles for a first given GPS channel. It also indicates how the range residual rate ($a_1$) is changing relative to time based on the accumulated GPS code phase observations. This computed collection of time-variable, "$a_A$" coefficients from the one GPS channel is then accumulated as a set of earlier measurements within the Kalman Filter 270 and used to validate an internal model of platform, IMU, and GPS error dynamics (see model 473m of FIG. 4A) relative not only to that one GPS channel, but also to the curve fitted determinations 271 of the other in-use GPS channels. Time matched comparisons are used within the Kalman Filter 270 (see updater 472 of FIG. 4A) to further smooth out variations among the various GPS solutions from the other in-sight GPS channels (in one embodiment there are 11 such $a_{A-others}$) and with yet further model parameters to provide a smoothed-out correction signal (e.g., $X_{correct}$) that is output on line 275 for mixing in with the real-time IMU parameters (281) and the inertial navigation solution ($X_{nav1}$ of FIG. 1) so as to thereby produce a corrected (integrated) navigation solution on line 285. The corrected navigation solution signal 285 is then fed to the GPS tracking predictor 290 so that the predictor 290 has a high-certainty indication of what the current platform position, velocity, and attitude are and what its rate of roll, pitch and/or yaw are so that the predictor 290 can better predict what the Doppler-affected carrier frequency/phase and code frequency/phase will be at a predetermined time in the future (e.g., +0.5 ms into the real time future). The prediction results are then fed via respective lines 293 and 294 to the carrier NCO 231 and code phase NCO 241. It is to be noted that although the above explanation is directed to real time predictive adjustment for the Doppler-affected code frequency and phase, real time predictive adjustment for the Doppler-affected carrier frequency and phase measurement can be generated in a similar fashion. Although the above described embodiment uses one RRE per channel, it is feasible to combine GPS code phase data simultaneously from both the L1 and L2 channels of a same vehicle in a single RRE for production of the polynomial coefficients from the combined L1 and L2 samples because the polynomial coefficients should be identical even though measurements are being taken based on different carrier frequencies. In such a case the RRE enumeration becomes one per space vehicle instead of one per channel.

Figure 3A:
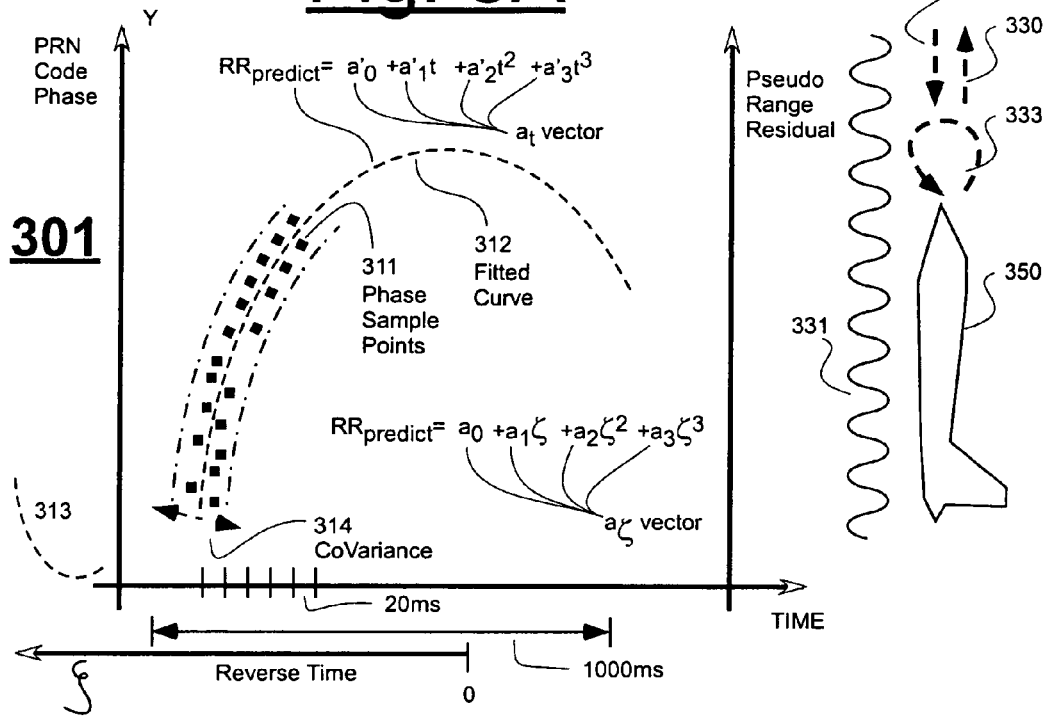
FIG. 3A is a first plot of code phase samplings versus time, where the plot shows how the range-residual defining polynomial may be extracted via curve-fitting when covariance is relatively small.

FIG. 3A graphically illustrates the operations of one embodiment. The platform 350 is moving either towards 330 the source of the GPS signal 331 or away (332) from it, or rotating 333 in some other manner relative to the source (e.g., 101 in FIG. 1). The measurements 311 (taken along axis Y of graph 301) of code phase residual (i.e., the error between the normalized early and late powers) will include random contributions from noise as well as contributions from the actual range residual, r(t). By solving for a well fitted polynomial curve 312 that minimizes fitting error in some predefined way (e.g., least mean squares method), a good measure can be provided of the range residual, r(t), at a desired point in time even though each sample point can be corrupted with noise. It is better to use backwards-running time, $\zeta$ (zeta), as the variable rather than forward running time, t, because then, for any value of m>1 picked, there will be a continuum into older history as $\zeta$ increases from 0 (the present) towards positive infinity (towards previously stored, historical data). In other words, the fitting of curve 312 can take into account a desire to mesh continuously into an earlier fitted curve 313 and/or its correspondingly earlier Y measurements in order to account for platform inertia rather than taking only the most recent frame of say, 1000 ms of incoming data as being an independent set of new measurements. The selection of the 1000 ms time span within which to perform the curve fitting is somewhat arbitrary and is taken to match with the slow, 1 Hz cycling period of Error Kalman Filter 270. A 500 ms time span could have been chosen with a commensurate number of sample points or a 200 ms time span could have been used with a commensurate number of sample points. The chosen 1000 ms time span matches with the 1 Hz update rate of the Error Kalman Filter 270 of FIG. 2. Other parts of the system may benefit from having curve fitted outputs generated at different rates or from receiving GPS-based r(t) measurements without any curve fitting at all. During line-of-sight GPS signal acquisition, for example, switch 266 is temporarily closed to provide more-raw (not necessarily curve fitted) $a_B$ data once every 20 ms (a 50 Hz rate). The quality of this $a_B$ data can be improved over time by switching to longer duration curve fittings for producing the $a_B$ data, such as from m=1 (no fitting) to m=5, m=10 and so forth.

Figure 3B:
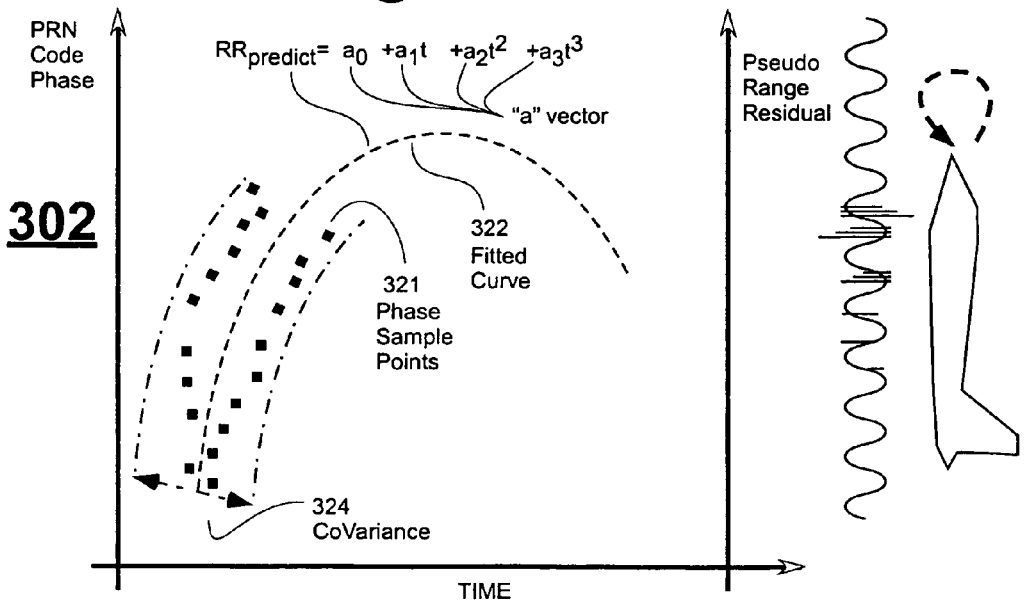
FIG. 3B is a second plot of code phase samplings versus time to show how the range-residual defining polynomial may be extracted via curve-fitting, but to a lesser degree of certainty, when covariance is relatively large.

FIG. 3B shows what can happen when additional noise is introduced into the given GPS channel. The curve-fitting error covariance 324 increases as the measured sample points 321 drift further away from the ideally-fitted curve 322. The error covariance output from the curve-fitting algorithm can therefore function as indicator of noise content within the received GPS signal and/or of the uncertainty of the curve fitting operation. EKF 270 may use the uncertainty information to determine how it weighs the measurement data provided from each of the plural GPS channels, 265 and 271. The amount of noise content in each GPS channel can be evaluated from other system parameters as well. The antennae selector and beam former 220 of FIG. 2 has access to these other system parameters. The covariance output 324 from the curve-fitting algorithm can be combined with the other noise content indicators to provide a more comprehensive evaluation of the ever-changing noise and/or solution uncertainty situation.

FIG. 5 is a flow chart of a computer implemented method (algorithm) 500 for generating the "$a_A$" vector. Each of the a0, a1, a2 and a3 components in each update of the "a" vector can simply be a same sized vector resulting from multiplying and adding results of $pinv_m(H)$ times the collected m measurements stored in the Y vector. Each value of m that is to be used has its own inversion matrix: $pinv_m(H)$. At step 501, the inversion matrix, $pinv_m(H)$ for each value of m that is to be used is pre-computed and stored in memory. At step 502, the corresponding "a" result is reset to 0. At step 511, a corresponding collection of a new plurality of m=50 (for example) samples for the Y(j) vector are obtained. The interval or intervals between the measurement takings that produce the m samples should be set so that the taking of the m samples consumes less than or about the time period of the output sampling rate for the RRE. Thus if the desired output sampling rate is 1 Hz (a 1000 ms period) then setting the measurement interval at 20 ms and setting m at 50 will result in the desired product, 50×20 ms=1000 ms. If forward-running time is being used for the Nth order polynomial, the collecting of the m samples of the Y(j) vector data does not have to be entirely complete as the algorithm loop is entered into at step 512 because the loop index j can be made to follow any of a number of sequences until all m sample points are processed. In the illustrated flowchart, the index, j is initialized to 1 at step 512. It is understood that the j index for a0, a1, a2, a3, etc., increments respectively in step 517. The i index for a0, a1, a2, a3, etc., increments in step 515. Also in step 515 the respective matrix products are summed on an accumulating basis. If j is 50 or less (assume m=50) then the loop repeats at loopback step 520. If not, test step 520 (j>m?) transfers control to step 525, where the computed a0, a1, a2 and a3 values are stored in memory for use by the EKF module. After the 1 Hz EKF update occurs at step 525, control then returns to step 502 for resetting the $a_A$ vector and awaiting the next m=50, or m=other, set of Y(j) measurement values. At the same time, the EKF module 270 (see also 470 of FIG. 4A) can begin to consolidate its propagation model for the correction factors with GPS measurements just made at the 1 Hz rate in the current GPS channel and in the other channels.

Referring again to FIG. 2, the EKF-generated, corrections signal 275 which results from, among other things, the "$a_A$" and "$a_{A-others}$" vector inputs of lines 265 and 271 is fed from the EKF module 270 to the GPS tracking predictor unit 290. In the illustrated example, the corrective updates for replica frequency that are output on bus 293 come out at a rate of 1000 samples per second (1 kHz). This Doppler-compensating rate is substantially greater than the 100 Hz sampling rate at which navigation solutions are being produced on bus 285 by unit 280 and supplied to the GPS tracking predictor 290. One of the reasons such higher resolution GPS tracking can be achieved is because of estimated antenna moment arm, path propagation delay, clock bias and drift corrections data (see 475b of FIG. 4A) that are computed in, and fed from the EKF module 270 to the tracker 290. The GPS tracking predictor 290 is understood to have its own, relatively small and fast Kalman Filters (not shown, see instead 491a, 491b of FIG. 4A) for propagation-wise predicting for a future point in real time, the expected value 293 of the carrier frequency. Because the mini-KFs (not shown, see 491) within the predictor 290 do not have to carry out as many computations as the illustrated, big EKF 270, the GPS tracking predictor 290 can output some of its results (i.e. on line 293) at a much faster rate than can either the big EKF module 270 (1 Hz corrections) or the INM module 280 (100 Hz navigation solutions). Outputs 293 and 294 from the GPS tracking predictor 290 have effective times in the future (e.g., 0.5 ms ahead of current real time) rather than in the present because these predictive signals (293,294) are intended to be at the center timing point of the next real-time sampling period for either the carrier NCO or code NCO processing. It is in this advanced future that the results of predictive outputs 293 and 294 will meet up with the corresponding GPS signals in multiplier units 235 and correlator 245.

The GPS tracking predictor 290 uses the navigation solution 285 (output at a 100 Hz rate) to further predict the Line Of Sight angle 257b for the corresponding channel. This LOS signal 257b is supplied to the GPS SV selection and acquisition module 220, where the latter converts the data into antenna selection and beam-forming information that is output along bus 209 at an update rate of 50 Hz to block 220. The fitting error 314/324 obtained from the curve-fitting performed by block 260 can provide an indication of how much signal power is present. When the signal to noise ratio drops below a pre-determined threshold, the selection and acquisition module 202 may responsively decide to drop tracking of the given GPS vehicle and seek another one for use as a signal source. The apparent signal-to-noise ratio may drop due to intentional or natural causes. In either case, the curve-fitting attempts of block 260, if unsuccessful or poor, give one form of warning of the possibility of interference, jamming or imminent loss of GPS signal.

Ultra tight coupling based on curve-fitting extraction of the range residual (block 260) has several advantages. The time span used for curve fitting (i.e. 1000 ms or less) can be programmably adjusted to suite different situations. The rate at which curve fitting results are output can be programmably adjusted to suite different situations. The curve fitting approach provides additional robustness for countering noise, temporary loss of signal in a given frequency band and/or intentional interference. For example, separate curve fits can be attempted for GPS samples obtained before and after a noise burst, while skipping the time span of a detected noise burst. PRN code phase data may be collected on different frequency bands (e.g., L1 and L2) for given SV (e.g., 101) so as to increase the sample rate and provide robustness against single band interference, The curve-fitting error covariance gives an indication of the quality of signal to noise for the utilized bands. Predictive GPS tracking (block 290) provides for immediate reacquisition of the GPS signal after short blackouts. Automatic protection against high powered intentional jamming is provided because the noise to signal ratio grows large and the GPS selection and acquisition unit 202 is automatically instructed in such a situation to switch to another GPS vehicle or lengthen the integration period (increase the value of m). Another advantage of the curve-fitting approach in block 260 is that it can be made independent of the timing for the correlate and dump function of block 245. Therefore adaptively different, correlate and dump durations may be used in different situations.

In one embodiment, the "big" Error Kalman filter 270 has over 100 state variables as given by the below Table 1. It is this relatively large number of states that causes the big Error Kalman filter 270 to cycle so slowly, i.e., only one correction update every second or longer. If desired, smaller and faster Error Kalman Filters could be used instead. The first twelve state variables (position through attitude) in Table 1 represent errors of the navigation solution provided from the Inertial Navigation Module 280 by way of bus 285. The "$a_A$" vector is a measurement input that is resolved by a time-matched measurements balancer 472 within the big EKF, as will be explained later (FIG. 4A).

TABLE 1

| Error State Variable | # of States | Part of: |
|---|---|---|
| Position | 3 | Navigation Solution (285) |
| Velocity | 3 | |
| Acceleration | 3 | |
| Attitude | 3 | |
| Gyro bias | 3 | IMU parameters |
| Gyro scaling factor | 3 | |
| Gyro misalignment | 6 | |
| Gyro g-sensitivity | 9 | |
| Gyro g^2 sensitivity | 9 | |
| Accelerometer bias | 3 | |
| Accelerometer scaling factor | 3 | |
| Accelerometer misalignment | 3 | |
| Accelerometer g^2 sensitivity | 9 | |
| Data synchronization error | 1 | |
| Clock bias + drift + drift rate | 3 | |
| Pseudo range bias, 1 per SV | 12 | One bias correction signal for each of up to a maximum of 12 SV's that could be in view on a given side of the Earth |
| Signal path TEC, per SV, electron/m² | 12 | Ionosphere propagation correction |
| Signal path TEC rate, per SV, electron/m² | 12 | |
| Clock g-sensitivity | 3 | |
| Antenna Lever arm error | 3 | Corrects for distance between IMU (225) inside platform and GPS antennae (251-254) outside of platform |
| Gravity model error | 3 | |
| Total Number of Kalman States = | 109 | |

The expected relationship between the RRE-produced "$a_A$" measurement vector (obtained for example by curve fitting the carrier phase error rather than the PRN phase error) for each active GPS signal (there can be as many as 24 active channels in one embodiment) and the corresponding EKF model parameters may be expressed per the following Eq. 4a where the EKF model parameters are on the right side of the equals sign:

$$\begin{bmatrix} a_0 \\ a_1 \\ 2a_2 \end{bmatrix} \frac{\lambda}{2\pi} = \begin{bmatrix} -\vec{u}^T(\delta \vec{R}_R) + c(\delta \Delta t_R) - \frac{k}{f^2}\delta TEC + \delta \Delta \varepsilon_0 \\ -\vec{u}^T(\delta \vec{V}_R) + c(\delta \Delta \dot{t}_R) - \frac{k\delta \dot{T}EC}{f^2} \\ -\vec{u}^T(\delta \vec{A}_R) + c(\delta \Delta \ddot{t}_R) \end{bmatrix} \quad \text{Eq. 4a}$$

In Eq. 4a, $\lambda$ is the GPS carrier wavelength, f is the carrier frequency, $u^T$ is the line-of-sight unit vector from the platform to the GPS space vehicle, $R_R$ is the EKF-modeled platform position error, $\Delta t_R$ is the GPS receiver clock bias error (as measured relative to the GPS constellation clock). TEC represents total electron content and is usable for determining propagation time delay of the GPS carrier due to ionospheric conditions. k is an appropriate and empirically determined conversion factor. $\varepsilon_0$ is a collective uncertainty factor representing SV ephemeris error, SV clock bias error relative to GPS constellation, tropospheric propagation error, and other unspecified errors. $V_R$ is the EKF-modeled platform velocity error. $A_R$ is the EKF-modeled platform acceleration error. Equation 4a is the EKF model versus measurement, comparison equation whose balancing provides an approximate indication of GPS measurement errors and EKF unmodeling and modeling errors. When the "$a_A$" vector side (left side, or GPS-measurement side) of Eq. 4a is observed to be generally consistent with the EKF model side (right side) of Eq. 4a, then there is greater confidence for the EKF model and the EKF-generated corrections. Additionally, the curve-fitting error covariance of the "$a_A$" vector may be computed from the sampled data that represents: $d_N(H^*H)^{-1}$ where $d_N$ is a function of GPS carrier signal-to-noise ratio, C/N, interference, and of samples integration time duration. This gives yet another indication of confidence in the generated result signals.

The relationship between the RRE-produced "$a_A$" vector (when curve fitting for the code phase error), of each active GPS signal (there can be as many as 24 active channels in one embodiment) and the corresponding EKF model parameters may be expressed per the following Eq. 4b:

$$\begin{bmatrix} a_0 \\ a_1 \\ 2a_2 \end{bmatrix} \frac{d}{2} = \begin{bmatrix} -\vec{u}^T(\delta \vec{R}_R) + c(\delta \Delta t_R) + \frac{k}{f^2}\delta TEC + \delta \Delta \varepsilon_0 \\ -\vec{u}^T(\delta \vec{V}_R) + c(\delta \Delta \dot{t}_R) + \frac{k\delta \dot{T}EC}{f^2} \\ -\vec{u}^T(\delta \vec{A}_R) + c(\delta \Delta \ddot{t}_R) \end{bmatrix} \quad \text{Eq. 4b}$$

where d is the length (in terms of the span of the transmitted chip in space) of a PRN code chip. The measurements-versus-model balancer (which is included in updater unit 472 of FIG. 4A) can adjust the EKF model propagator (476) to maintain a prespecified level of tolerance for imbalance for Eq. 4b as well as for Eq. 4a. When the "$a_A$" vector side of Eq. 4b is also generally consistent with the EKF side of Eq. 4b, then greater confidence can be had for the accuracy of one or more of the current EKF model states (473m), the model incrementer (propagator 473), the model updater (472) and the EKF-generated corrections (475).

As already mentioned, the error corrections generated by the "$a_A$"-driven and "$a_{A-others}$"-driven EKF module can be used to reduce error in how the GPS tracker predicts carrier phase and prompt code phase (P) so as to remain locked onto the signal arriving in real time from a given SV. The relationship between the corrected pseudo range values for carrier and code phases (PRN chip) and EKF states may be computed according to the following respective equations, Eq. 5a and 5b:

$$r_{carrier} = \vec{u}^T(\vec{R}_{SV}(t1) - \vec{R}_R(t2)) + c(\Delta t_R - \Delta t_{SV}) - \frac{k}{f^2} TEC + \Delta \varepsilon_0 \quad \text{Eq. 5a}$$

$$r_{code} = \vec{u}^T(\vec{R}_{SV}(t1) - \vec{R}_R(t2)) + c(\Delta t_R - \Delta t_{SV}) + \frac{k}{f^2} TEC + \Delta \varepsilon_0 \quad \text{Eq. 5b}$$

The corrected pseudo range rate and acceleration values for carrier and code Dopplers (PRN chip) may be computed according to the following respective equations, Eqs. 6a-6c:

$$v_{P,car} = \vec{u}^T(\vec{V}_{SV}(t1) - \vec{V}_R(t2)) - \frac{kT\dot{E}C}{f^2} + c(\Delta \dot{i}_R - \Delta \dot{i}_{SV}) \quad \text{Eq. 6a}$$

$$a_P = \vec{u}^T(\vec{A}_{SV}(t1) - \vec{A}_R(t2)) + c(\Delta \ddot{i}_R - \Delta \ddot{i}_{SV})$$

$$v_{P,cod} = \vec{u}^T(\vec{V}_{SV}(t1) - \vec{V}_R(t2)) + \frac{kT\dot{E}C}{f^2} + c(\Delta \dot{i}_R - \Delta \dot{i}_{SV}) \quad \text{Eq. 6c}$$

With the corrected pseudo range, range rate and acceleration values calculated for the carrier and code content (PRN chip), the corresponding Doppler rates, Doppler shift amounts and carrier/code phase values may be initially predicted according to the following respective equations, Eqs. 7a-7f:

$$\ddot{\phi}_{carrier} = -\frac{2\pi a_p}{\lambda} \quad \text{Eq. 7a}$$

$$\dot{\phi}_{carrier} = -\frac{2\pi v_{P,car}}{\lambda} \quad \text{Eq. 7b}$$

$$\phi_{carrier} = \phi_{SV} - \text{mod}\left(\frac{2\pi r_{carrier}}{\lambda}, 2\pi\right) \quad \text{Eq. 7c}$$

$$\ddot{\psi}_{code} = -\frac{a_p}{d} \quad \text{Eq. 7d}$$

$$\dot{\psi}_{code} = -\frac{v_{p,cod}}{d} \quad \text{Eq. 7e}$$

$$\psi_{code} = \psi_{SV} - \text{mod}\left(\frac{r_{code}}{d}, m\right) \quad \text{Eq. 7f}$$

where, for one embodiment, d=29.305 meter for the P(Y) code, m (in this instance) is the total number of PRN code chips, and λ=0.1903 meter for the L1 carrier wavelength. Also, a conversion factor of k=40.3 cycle^2 m^3/electron/sec α2 may be used for the TEC factors.

These "initial" computations (whose output sampling rate from the INM is 100 Hz) may be augmented with high-rate further predictions (or "propagations" provided in one embodiment at a 1 kHz sampling rate) by performing the following, small EKF computations of equations Eq. 8a-Eq. 8c which adjust for the approximately half-step-forward (k+½) predictive outlook of the GPS tracking predictor:

Propagator:

$$\begin{bmatrix} \phi \\ \dot{\phi} \\ \ddot{\phi} \end{bmatrix}_{k+\frac{1}{2}} = \begin{bmatrix} 1 & \Delta T & \frac{\Delta T^2}{2} \\ 0 & 1 & \Delta T \\ 0 & 0 & 1 \end{bmatrix} \begin{bmatrix} \phi \\ \dot{\phi} \\ \ddot{\phi} \end{bmatrix}_{k-\frac{1}{2}} \text{ or } \quad \text{Eq. 8a}$$

$$\dot{\phi}_2 = \dot{\phi}_1 + \ddot{\phi}\Delta T$$

$$\phi = \phi + (\dot{\phi}_2 + \dot{\phi}_1)(0.5\Delta T)$$

Residual Comparator:

$$\begin{bmatrix} \delta\phi \\ \delta\dot{\phi} \end{bmatrix}_{t_c+\frac{1}{2}} = \begin{bmatrix} 1 & (t_c + \frac{\Delta t}{2} - t_1) \\ 0 & 1 \end{bmatrix} \begin{bmatrix} \phi \\ \dot{\phi} \end{bmatrix}_{IMU@t_1} - \begin{bmatrix} \phi \\ \dot{\phi} \end{bmatrix}_{Predictor@t_c+\frac{1}{2}}. \quad \text{Eq. 8b}$$

Updater:

$$\begin{bmatrix} \phi \\ \dot{\phi} \\ \ddot{\phi} \end{bmatrix}_{t_c+\frac{1}{2}} = \begin{bmatrix} \phi \\ \dot{\phi} \\ \ddot{\phi} \end{bmatrix}_{t_c+\frac{1}{2}} + \begin{bmatrix} K_{11} & K_{12} & K_{13} \\ K_{21} & K_{22} & K_{23} \\ K_{31} & K_{32} & K_{33} \end{bmatrix} \begin{bmatrix} \delta\phi \\ \delta\dot{\phi} \\ \delta\ddot{\phi} \end{bmatrix}_{t_c+\frac{1}{2}} \quad \text{Eq. 8c}$$

Equation Eq. 8a provides a "half step forward" (e.g., +0.5 ms forward) real-time prediction of what the carrier phase will be, where ΔT represents a full step forward (e.g., 1 ms) of the tracking predictor. (The half step timing arises from an averaging between the initial value and the next, full step propagated prediction as will be explained in FIG. 4C. It is intended to compensate for the tracking predictor sampling delay by propagating to the center of each sampling period.) Equation Eq. 8b provides phase and drift updates which are provided by the INM once every 10 full steps (100 Hz sampling rate)—this is when the next IMU measurement sample comes in for re-anchoring the GPS tracking predictor to real-world data as shall also become clearer in FIG. 4C. $t_c$ represents current real time and $t_c+\frac{1}{2}$ is indicative of being a half step ahead of current time where the magnitude of the half step is 50% of a full propagation step taken by the incremental propagator. In the example of FIG. 4C, a first propagator takes 1 msec full steps while the second one takes 2 usec full steps. Predictive calculation of the phase rate of change and phase acceleration can be implemented by one or more mini-KF's (491a, 491b of FIG. 4A) for propagating forward in real time, but with effective times of result that extend into the future, per equation Eq. 8a for example in order to obtain the predicted values of the carrier phase where the propagation happens at a much faster rate (e.g., at 1 kHz or even at 500 KHz) than could have been obtained if the slower stepping rates had been used of the navigation solution of the INM (as provided on line 285, which has an output sampling rate of 100 Hz) or if the even much slower, forward stepping rate had been used of the big EKF module 270 (operates at 1 Hz). Equation Eq. 8c represents the iterative operation of the mini-KF structure (491a), where the $K_{11}$-$K_{33}$ parameters define a Kalman gain matrix, usually a diagonal matrix. In order to define the phase deltas (δφ) for look-ahead, small Kalman filter of Eq. 8c, however, time matching should be provided for the half-step asynchronism between the INM measurement samples (provided at a 100 Hz rate) and the GPS tracking predictor (290) which is projecting its output forward by a half step into the real time future. This is done in the structure defined by equations Eq. 8a-8c, where $t_c$ is a current time for when INM-computed results are received and $t_1$ is the effective real time of the last INM output sample. (The INM output sample acts as a calibration update so as to reanchor predictor results to actual measurements. This will become clearer in FIG. 4C.) So the structure of equation Eq. 8b produces phase residual (δφ) for successive current time marks as projected initially a half step into the future ahead of the last received INM solution (485) and then full step propagated forward until it is a half step ahead of real time. The mini-Kalman filter of equation Eq. 8c performs the update to the tracking predictor at 100 Hz, and the tracking predictor in turn produces current phase for submission to NCO's 241 and 231 at their respective 100 Hz and 1000 Hz update rates. (Once again, this will become clearer in FIG. 4C, but FIG. 4A will be described first.)

Referring to FIG. 4A, in the illustrated embodiment 400, all four of the main modules (460, 470, 480 and 490—these correspond to 260, 270, 280 and 290 of FIG. 2) operate in rough synchronism with one another even though some may internally step forward faster than the others. The big EKF 470 produces a new corrections 475 once every 1000 ms (1 Hz rate). The curve fitting RRE 460 has its internal m value adjusted so as to also produce new set of GPS-based measurement residuals once every 1000 ms (1 Hz rate). Even though the internal timing clock 487 of the INM 480 triggers 100 times faster (at a 100 Hz rate) to produce new navigation solution samples onto line 485 every 10 ms, a 1 Hz sampling switch 486 is interposed between the INM 480 and the big EKF 470 so that the EKF 470 receives the latest navigation solution for its internal line 468 only once every 1000 ms (1 Hz rate). The big EKF 470 of this embodiment cannot absorb new measurement data any faster than this because it takes a significant amount of time to recomputed all the measurement-verifiable Kalman filter states (over 100 of them) between the receipt times of external GPS measurements (465, 466) and of the latest navigation solution (via sampler 486). In contrast to the slowness of the big EKF 470, the GPS tracking predictor 490 may be viewed as having an internal clock that triggers internally at least 10 times faster (at 1 KHz) than the rate of the INM-internal clock 487. In one embodiment, the GPS tracker internally triggers forward at least 5000 times faster (at 500 KHz) than does the INM 480.

In one embodiment (FIG. 6), in order to attain the 500 KHz prediction rate, the mini-propagator structure (491*a*) of equations Eq. 8a-Eq. 8c is augmented with a sequentially successive, mini-propagator structure (491*b*) as defined by the following speed-up equation, Eq. 8d:

$$\begin{bmatrix} \phi \\ \dot{\phi} \end{bmatrix}_{K+\frac{1}{2}} = \begin{bmatrix} 1 & \Delta T \\ 0 & 1 \end{bmatrix} \begin{bmatrix} \phi \\ \dot{\phi} \end{bmatrix}_{k-\frac{1}{2}} \text{ or } \phi = \phi + (\dot{\phi} \Delta T) \quad \text{Eq. 8d}$$

Because Eq. 8d is even simpler to compute than Eq. 8a-8c, its output phase and phase rate results may be sampled at a rate as high as at least 500 kHz. Note that no further measurement update is included in Eq. 8d because such measurement based calibration was already performed in the sequentially preceding mini-KF structure of equations Eq. 8a-8c.

Still referring to FIG. 4A, the illustrated UTC system 400 may be viewed as having a plurality of RRE modules like 460 (only one shown), each providing a curve fitting operation for the correlated I&Q samples of a corresponding GPS channel (or of a corresponding GPS SV). Each RRE may operate in synchronism with a respective first clock, CLK1 associated with its given GPS source and each RRE may have a corresponding input sampling rate (e.g., 50 Hz for the illustrated sampling switch 404). However, the curve fitted output signal 465 of each RRE can be made to have a sample output rate (e.g., 1 Hz) matching the update rate (also 1 Hz) of the big and slow EKF 470 through appropriate selection of the curve fitting, m value in each RRE and through appropriate selection of the effective input sampling rate (switch 404) of each RRE (only one shown at 460). The relationship between the measured GPS residuals and the Kalman filter error states is defined by a computed measurement matrix 471*x*. The measurement matrix 471*x* can be used to define a measurement sensitivity that is linearized with respect to the navigation solution 485. The model updater periodically checks for balance conditions between the more recently received measurement results 471*a* and the correspondingly propagated model results 473*a*. Propagation of the Kalman filter error states (including navigation error states, GPS errors states and IMU errors states) is performed in system modeler 473 using a model matrix 473*m*. The model matrix 473*m* defines a dynamic sensitivity factor that is linearized with respect to the navigation solution 485. If errors between the compared measurements 471*a* and model results 473*a* are within predefined tolerances, then the model updater 472 allows the system modeler 473 (the EKF states propagator) to continue propagating its results (EKF states) using the current, but adaptively variable, model parameters. On the other hand, if the model updater 472 determines that one or more of the measurements versus model tests generates too large of an imbalance (as specified by predetermined thresholds), the model updater 472 sends corrective parameter adjustments 473*b* to the system modeler 473 for bringing model 473*m* into better agreement with the measured observations (465, 466, 468).

More specifically, time-matched comparisons are made between the most recent measurement results 471*a* and the correspondingly timed EKF model results (model predictions) 473*a* to thereby determine how well the EKF-contained model propagator 473 is predicting platform position error, platform velocity error, clock bias ($\delta t_b$) between the on-platform receiver clock and the GPS constellation clock, and so forth. For example, the carrier-phase and code-phase balancing relationships of above equations Eq. 4a and 4b indicate how well the RRE generated, measurement results match with corresponding EKF states (continued in the right sides of these balancing equations). If the predicted (EKF-propagated) model states are found to be drifting away from the measurement observations, then appropriate corrections 473*b* are made to the model propagator 473 to counteract the observed drift. A corrected version of the inertial sensor measurements (corrected for sensor latency, as will be explained below) is included in the 1 Hz samplings (486) of the navigation solution signal 485, as fed into the measurement matrix 471*x* via line 468. The so-maintained, predictive modeler 473 then steps the current EKF states (represented as current model 473*m*) from its current state time, K to the next propagated states of state time, K+1 while preserving a copy of the K time states in the archive of model checker and updater 472. Basic methods for maintaining a prediction modeler like 473 within predetermined error bounds relative to observed measurements are known in the art under the rubric of Kalman filters. However, some of the aspects that are believed to be novel over prior art approaches alone or in combination and are represented in FIG. 4A include the following: (1) use of curve fitting in the RRE's 460 to smooth out the GPS measurements and filter out measurement noise; (2) use of IMU sensor latency drift compensation 482 to improve the accuracy of the navigation solution signal 485 that is then fed back to the EKF 470 via line 468 and is also fed forward to the GPS tracking predictor 490; (3) modeling data synchronization error and sensor latency error in the big EKF in addition to modeling clock bias drift (GPS error) in the big EKF—this aspect will be detailed in FIG. 4D; and (4) fast propagating the GPS tracking predictor predictions based on the higher accuracy navigation solution signal 485—this aspect will be further detailed in FIG. 4C, but see also the already discussed equations, Eq. 8a-8d above.

Basic methods for accounting for GPS receiver clock bias ($t_b$), as measured in the lab and/or further calibrated by in-field GPS signals are known in the art. Referring to FIG. 4D, the GPS constellation maintains a reference clock 449 that is usually very accurate and close to an ideal or true clock 451 (the latter being shown in phantom because the ideal clock is hypothetical). Using data transmitted from the in-view GPS vehicles, the platform (e.g., 250) maintains its own GPS receiver clock 497. Generally, there will be both a bias and an over-time, bias drift between the clocks 449 and 497. The clock bias drift can be modeled as a random walk or other stochastic processes that is dependent on platform temperature and/or other platform environmental parameters. This modeled bias drift can be updated using GPS-obtained measurements (465, 466). More specifically, agreement is sought between the predicted range residual and the measured range residual, where the measured range residual has a clock bias based, distance offset ($c^*\delta t_b$) added to it. See box 471' of FIG. 4D.

There are other kinds of timing errors possible within the structure of UTC system 400 (FIG. 4A) aside from receiver clock drift. One of these other timing errors has to do with the time consumed by inertial sensors to generate the signals 481 that represent inertially measured platform parameters such as platform acceleration, $a_{xi}(t)$ and the time it takes to transport those signals into storage so they can be used for computing platform velocity, $V_{xi}(t)$ and platform position, $P_{xi}(t)$. Such sensor dynamic latencies and data transport latencies can be measured in the lab. However, these latencies can be subject to in-field and over-time drift. It is believed such drifts were heretofore not accounted for. In accordance with the invention, sensor latency and data-transport latency drifts are modeled as random walks or other stochastic processes dependent on platform temperature and/or other platform environmental parameters. These modeled drifts can be calibrated by comparing the drift compensated, inertial measurements 471'b (FIG. 4D) against the GPS-obtained measurements 471'a. The comparison results can be used to refine the adaptive drift-predicting models 474a, 474b, 474c shown in FIG. 4D so that their respective compensations for clock bias drift (474a), sensor latency drift (474b) and data synchronization drift (474c) causes the inertial dependent data (471'b) to remain in agreement with the GPS-based measurements (471'a). FIG. 4D shows an error comparator 472' comparing time-matched versions of the inertial dependent data (471'b) against the GPS-based measurements data (471'a) and feeding the comparisons results to a measurements filtering portion 474 of the big EKF for further comparison against the model results 473'a. The integrated compensators for clock bias drift (474a), sensor latency drift (474b) and data synchronization drift (474c) are adaptively modified in response to the filtered comparison results so as to reduce disagreement amongst the 3 compared signals; 471'a (GPS-based measurement data), 471'b (IMU-based measurement data), and 473'a (counterpart model predictions for the same range error, range rate error, and/or their respective time derivatives).

In one embodiment, clock bias drift estimation and data synchronization drift estimation are computationally lumped together. Estimator 474a and 474c together carry out a propagated drift estimation in accordance with the following correction algorithm as represented by Eq. 9a:

$$\begin{bmatrix} \delta\Delta t_b \\ \delta\Delta t_v \\ \delta\Delta t_a \\ \delta\Delta t_d \end{bmatrix}_{K+1} = \begin{bmatrix} 1 & \Delta T & \frac{\Delta T^2}{2} & 0 \\ 0 & 1 & \Delta T & 0 \\ 0 & 0 & 1 & 0 \\ 0 & 0 & 0 & 1 \end{bmatrix} \begin{bmatrix} \delta\Delta t_b \\ \delta\Delta t_v \\ \delta\Delta t_a \\ \delta\Delta t_d \end{bmatrix}_K + \begin{bmatrix} RW_b \\ RW_v \\ RW_a \\ RW_d \end{bmatrix}_K \quad \text{Eq. 9a}$$

In Eq. 9a, $\Delta t_b$ represents clock bias and $\delta\Delta t_b$ represents clock bias error. Similarly, $\Delta t_v$ represents clock bias rate, and $\delta\Delta t_v$ represents clock bias rate error. The symbol, $\Delta t_a$ represents clock bias acceleration, and $\Delta t_d$ represents a data-transport latency that relates to a data synchronization problem discussed below. K+1 is the new EKF state 1000 ms after prior state K (a 1 Hz advancement rate). Thus the estimators 474a, 474c advance in step with the system modeler 473 (FIG. 4A). The random-walk models (RW's) for each of the drift variables are structured to follow physical parameters on the platform such as temperature, platform acceleration, power supply voltage and/or other such physical attributes which can produce drift.

In FIG. 4D, unit 472' represents the comparator that determines how well the drift estimators 474a, 474c account for their respective drifts. A first comparison test can be developed between the GPS-based measurements 471'a and the inertial measurements 471'b of range (or range residual), where the compared signals are first corrected by the modeled drift variables. Consider the signal flight time of the GPS signal from an in-view vehicle to the platform antennas. The following distance balancing equations Eq. 9b, 9c may be formulated as follows:

$$\delta\rho_i = c(t_{2,clk} - t_b - t_{1,gpsi} + \Delta\epsilon_{\rho i}) - (\|R_{SVi} - R\| + L_i) \quad \text{Eq. 9b}$$

$$\delta\rho_i = -\vec{u}_i^T \vec{\delta R} + c\delta\Delta t_b - \vec{u}_i^T \vec{V}\delta\Delta t_d + \delta\Delta\epsilon_{\rho i} \quad \text{Eq. 9c}$$

In Eq. 9b, $L_j$ is the whole wavelengths distance from the antenna of GPS vehicle i to the receiver antenna on the platform. $R_{SVi}$-R is the fractional range residual. C is the speed of light in the given medium (the atmosphere). The reference clock (449) of the GPS constellation is represented by reported time, $t_{1,gpsi}$ of received GPS signal i, while the local platform receiver clock (497) is represented by read-out time $t_{2,clk}$. The difference, $t_{2,clk} - t_{1,gpsi}$ therefore gives a rough approximation of the flight time of the received GPS signal 131'a from space vehicle i. As is well known, this approximation can be refined by adding in the lab-measured, clock bias value, $t_b$. However further uncertainty, $\Delta\epsilon_i$ remains for the flight time of the received GPS signal 131'a from space vehicle i due to a host of error mechanisms including path propagation uncertainty and SV ephemeris error. Equation Eq. 9c addresses these error mechanisms with more specificity in terms of Kalman filter error states. $\delta\rho_i$ is the range residual that is the difference between flight-time-determined distance and predicted distance based on the given SV number i ephemeris and platform position. This expression for $\delta\rho_i$ includes the clock bias drift uncertainty component, $\delta\Delta t_b$. The Eq. 9c expression further includes the data synchronization drift, ($\delta\Delta t_d$). When accounting for the latter delay, it is assumed that the platform advances forward by a distance roughly equal to platform velocity V times $\delta\Delta t_d$, the product being a correction added to the range balancing equation, Eq. 9c. The expression of Eq. 9c further includes a satellite path uncertainty factor ($\delta\Delta\epsilon_{\rho i}$—this being one of the 109 EKF states in above Table 1). These drift factors combine in Eq. 9c with the platform position error ($\delta R$). If a close balance can be maintained between the computed left and right sides of equation Eq. 9c, this is taken as indicating that the respective bias and data synchronization estimators, 474a and 474c are in agreement with the propagated values in modeler 473 (FIG. 4A) and the estimators can be said to be substantially converged and accurate. If the left and right sides of equation Eq. 9c differ beyond a predetermined threshold, the adaptive drift estimators are adjusted to bring the left and right sides of balancing equation Eq. 9c closer towards agreement. It is to be understood that when a given number, $N_{in\text{-}view}$ of GPS vehicles are in-view and being used, the left and right side balancing operations can be conducted for j being stepped over the range 1 to $N_{in\text{-}view}$ and that a common value for current clock bias error, $\delta\Delta t_b$, can be arrived at for the platform receiver clock, common to all the in-view GPS vehicles (e.g., 101-103) because receiver clock bias and clock bias drift is common to all the in-view GPS vehicles. Thus noise factors attributed to any one GPS vehicle tend to be removed by performing balancing for the plural in-view vehicles.

Beyond the first balance test of equations Eq. 9a-9b, a second comparison test can be similarly developed for observed value in the range rate portions of the GPS-based measurements from the different GPS vehicles (the a1 vector components). Balance between the GPS-based measurements and the computations of the adaptive model 473m can be evaluated according to following equation Eq. 9d:

$$\delta\dot{\rho}_i = -\vec{u}_i^T \delta\vec{V} + c\delta\Delta t_v \qquad \text{Eq. 9d}$$

In Eq. 9d, $\delta(\text{dot } \rho_i)$ represents the observed range rate residual (the successive $a_1$ vector components) between a given GPS vehicle i and the platform receiver. (See line 465 of FIG. 4A.) Term $\delta V$ represents platform velocity error within the adaptive model 473m and the term, $\delta\Delta t_V$ represents rate of clock drift. Note that the latter term is amplified by the speed of light, c, thus contributing significantly to the observed change in range rate residual ($\delta(\text{dot } \rho_i)$). If the left and right sides of equation Eq. 9d differ beyond a predetermined threshold, the model updater 472 of FIG. 4A detects the imbalance and adjusts the clock drift state in the propagating model (Eq. 9a) via correction path 473b to bring the two sides closer towards agreement. It is to be understood that when a given number, $N_{in\text{-}view}$ of GPS vehicles are in-view and being used, the left and right side balancing operations can be conducted for i over the range 1 to $N_{in\text{-}view}$. Thus noise factors attributed to any one GPS vehicle tend to be removed by performing balancing for the plural in-view vehicles. Also weighting based on curve fitting covariance (314, 324) may be used to give greater emphasis to results from the more confidently fitted (or less covariant) ones of the $r(\zeta)$ polynomial curves generated by the RRE's (460 in FIG. 4A; 460' in FIG. 4D).

In one embodiment, a central platform clock generator produces interrupts for transferring the samples of the modules one to the next. Thus immediately after the RRE 460(') is interrupted at 1 Hz intervals to output its latest $a_4$ vector result, the big EFK module 470 (FIG. 4A) begins to process the new GPS measurement results while being driven by its respective clock, CLK2. In the next 1 Hz interrupt, big EFK 470 outputs its corrections 475 (based on the latest processed GPS-based measurements 465-466 and latest INM-measurements 468 received 1000 ms before) to the INM 480 and the GPS tracking predictor 490.

In FIG. 4A, the Inertial Navigation Module 480 is shown being driven by a third clock, CLK3 and is interrupted once every 10 ms (100 Hz rate) to output its latest navigation solution signal 485 and to begin processing the newest batch of inertial measurement sensor inputs 481 which are supplied from the IMU once every 10 ms (100 Hz rate). Although separate clocks, CLK1, CLK2, CLK3 and CLK4 are shown as being one possible arrangement, they do not have to be different clocks. According to one embodiment, timed sampling interrupts (triggering interrupts) to the four main modules 460, 470, 480 and 490 are driven from a common system clock running at a rate of at least 1 MHz (twice the 500 KHz rate of the GPS tracking predictor). The IMU output signal 485 includes sensor latency and latency drift corrections imparted by unit 482.

Referring to FIG. 4D, a more detailed explanation of sensor latency and latency drift begins at the top left corner of the diagram with platform acceleration being represented by acceleration-versus-time graph 450. At a first ideal or true time, $t_{True1}$, the platform's acceleration is $a_{True1}$. At a second true time, $t_{True2}$, the platform's acceleration is $a_{True2}$. The true time clock 451 (a hypothetical clock) is closely tracked by the GPS constellation clock 449 (a real clock). A number of delays, 452, 454 and 456, each subject to in-field drift, may enter the picture as acceleration sample values such as $a_{True1}$ and $a_{True2}$ are transformed into real and stored signals. First, it can take a first amount of time ($\text{Delay}_1$) 452 for the forces of a given platform maneuver (e.g., a change of velocity) to transmit via the fuselage to the inertial sensors mount positions for registration at the inputs 453 of the relevant one or more sensors. Next, due to sluggishness of sensor mechanism (due to their dynamics), it can take a second amount of time ($\text{Delay}_2$) 454 for the sensors to change states in response to the received forces. Finally, as the sensor output stages 455 convert the sensor responses into electrical or optical signals and forward them to the memory unit 458 of the processing computer, there can be various signal transport delays ($\text{Delay}_3$) 456 involved. Switch 457 represents the sampling action which causes the data to finally become latched into registers or otherwise stored in memory as stored data 458. Initial time tags will be assigned to the so stored data 458. Once in memory, further time delays in the processing of the associated sensor data are no longer a substantial problem because the computer software will process the stored sensor data 458 in accordance with associated time tags of the stored data. However, during time delays 452, 454, and 456, the computer does not have correct time tags logically associated with the incoming data and the platform (150) is often changing its velocity V(t) and position P(t) in the interim before the data gets latched at step 457. Therefore, the velocity $V_x(t_1)$ and position $P_x(t_1)$ that the IMU processor will first assign (in box 482a) to the stored data may not accurately reflect the true velocity $V_y(t_1)$ and position $P_y(t_1)$ of the platform at the assumed sampling time points, $t_{True1}$ and $t_{True2}$. (In passing, it should be noted that the above statement about the irrelevance of data delays past storage points 458 and 467 is not all encompassing. It is limited by its context. The GPS tracking predictor (490 of FIG. 4A) depends on the timeliness of corrections data 475' and the tracking predictor is responsible for real-time updates of the code and carrier NCO's. So for the predictor 490, data delays past storage points 458 and 467 can be relevant.)

As indicated in box 482a, a first digital integration is carried out on the stored and fetched inertial sensor data 481' to obtain the inertially-defined platform velocity $V_x(t)$ as an over time integral of the acceleration samples and to obtain the inertially-defined platform position $P_x(t)$ as an over time integral of the computed velocity samples. Moreover, in box 482b, further adjustment is made by modeling the sum of delays 452, 454 and 456 as a sensor latency value, $\delta t_{imu}$, where the latter is supplied by estimator 474b. The latency corrected values for the inertially-defined platform velocity and position at true time $t_1$, therefore become $V_y(t_1)$ and $P_y(t_1)$. In one embodiment, the sensor latency adjustments of box 482b can be represented by the following equations Eq. 10a-10c:

$$V_2 = V_1 + \Delta V$$

$$P_2 = P_1 + \Delta T \left( \frac{V_2 + V_1}{2} \right) + \delta t_{IMU}(V_2 - V_1)$$

$$= P_1 + V_2 \left( \frac{\Delta T_1}{2} + \delta t_{IMU} \right) + V_1 \left( \frac{\Delta T_1}{2} - \delta t_{IMU} \right)$$

Eqs. 10a, 10b, 10c where $\Delta T$ represents the IMU sampling interval (i.e. $t_3-t_2$ of FIG. 4B), $\Delta V$ represents the current IMU acceleration measurement multiplied by $\Delta T$ (in other words, $\Delta V_x = a_x * \Delta T$) and $\delta t_{IMU}$ represents the sensor latency as modeled by box 474b.

Figure 4B:
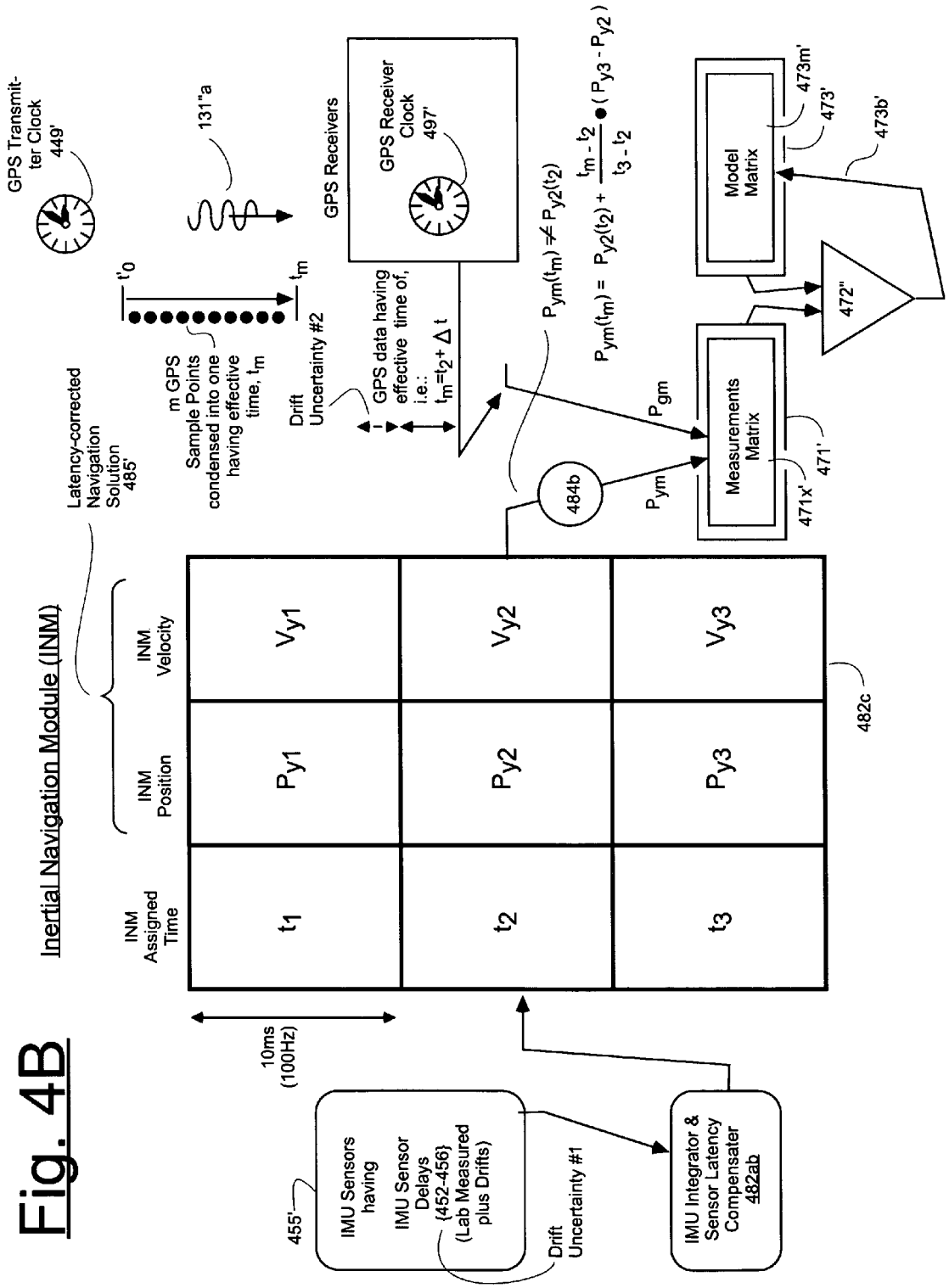
FIG. 4B is a schematic timing diagram for explaining how chronological alignment uncertainties may develop between the GPS-based measurements and the IMU sensor-based measurements.
Figure 4C:
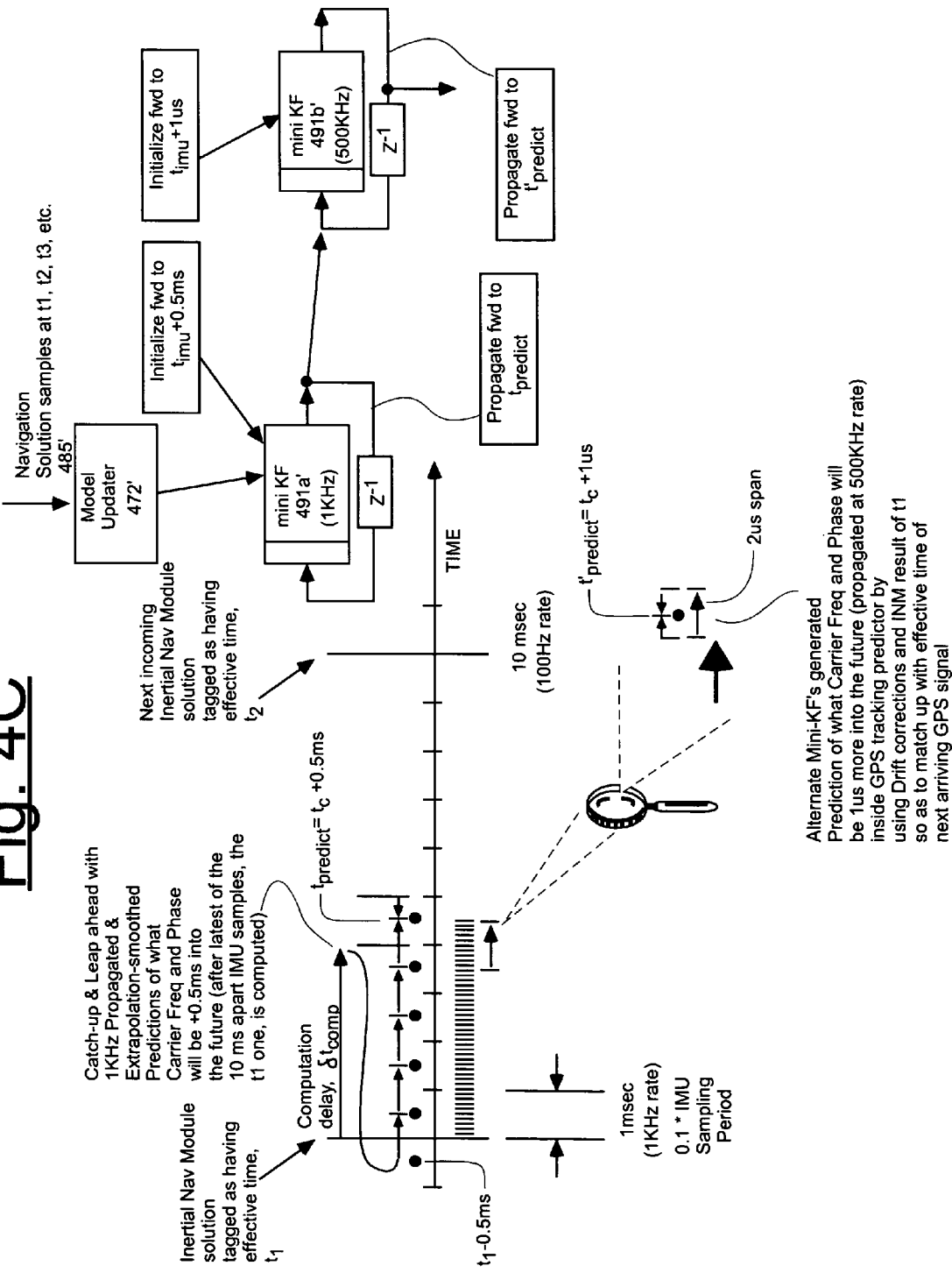
FIG. 4C is another timing diagram for explaining how the GPS tracking predictor projects into the future using alternate modes of forward propagation.
Figure 4D:
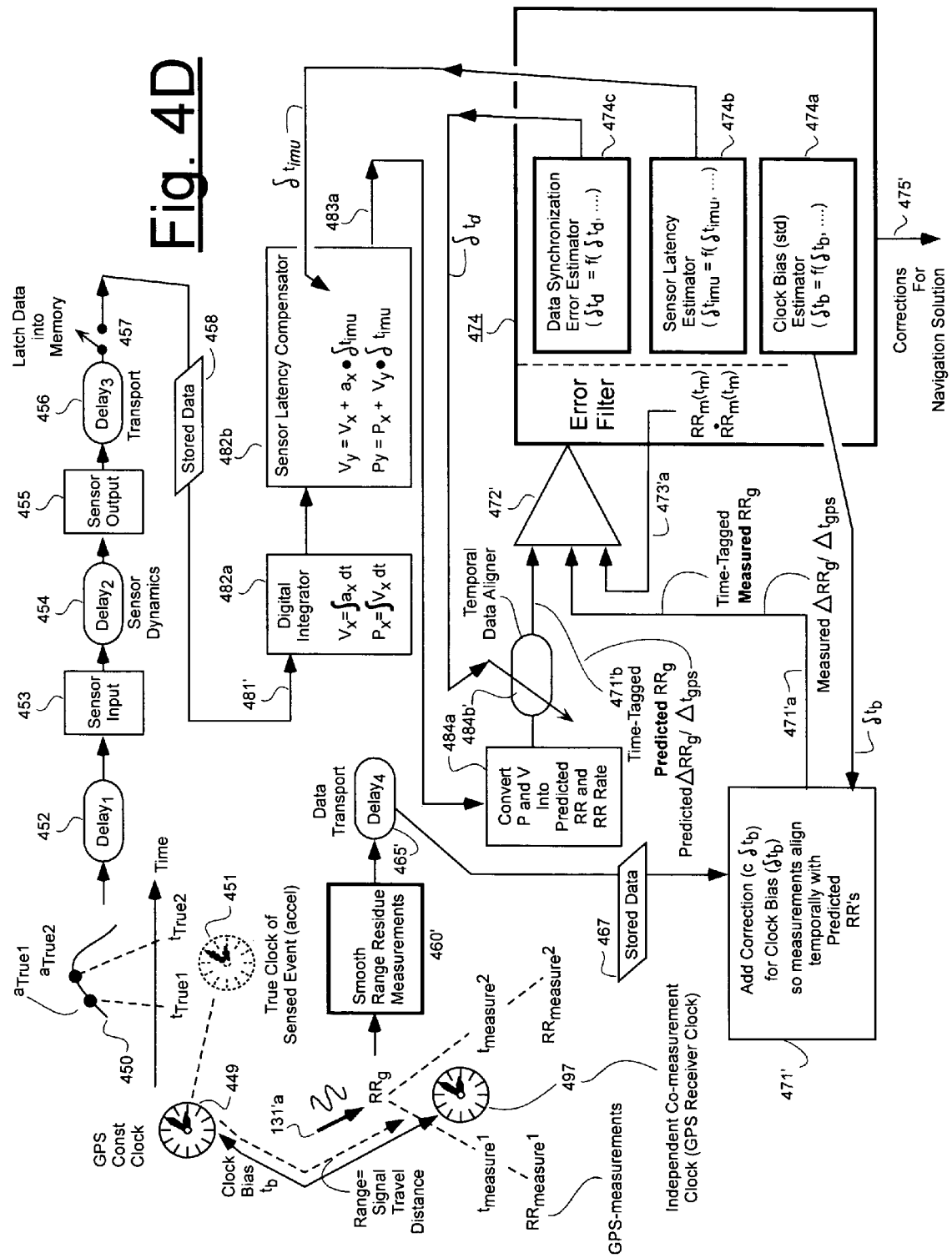
FIG. 4D is a data flow diagram showing how corrections for sensor latency and data synchronization error may be integrated with clock bias correction to thereby provide more accurate error determination within the EKF.

Referring to FIG. 4B, the process is shown schematically in a slightly different way to better show the measurements data converging into the GPS measurement processing module 471' for comparison in model updater (472") against the corresponding variables in the system modeler (propagator) 473'. The incoming data includes the compensated inertial navigation solution of table 482c and the GPS data coming out of the RRE's (460). The compensated inertial navigation solution collecting table 482c is shown to contain position and velocity data, $P_y1(t_1)$, $V_y1((t_1)$, $P_y2(t_2)$, $V_y2((t_2)$, etc. for the respective and regularly-spaced (e.g., 10 ms apart) inertial sensor sampling time points, $t1$, $t2$, etc., where $V_y1(t_1)$ has been derived from raw inertial result $V_x1(t_1)$, $P_y1(t_1)$ has been derived from raw inertial result $P_x1(t_1)$, and $V_y2(t_2)$ has been derived from raw inertial result $V_x2(t_2)$, etc., in order to compensate for sensor latencies inherent in sensors 455'. Compensation occurs in the IMU integrator and sensor latency compensator 482ab of FIG. 4B. Since the sensor dynamics latencies represented in box 455' are subject to in-field drift, this can introduce a certain amount of drift uncertainty into the process. FIG. 4B goes on to illustrate yet another timing variation that is subject to in-field drift. The IMU measurements that have been corrected for sensor latency drift (corrected by unit 482ab) move through the 1 Hz sampling switch 486 (FIG. 4A) to thereby enter the 1 Hz sampling domain of the big EKF. Every 1000 ms, the big EKF checks for agreement between the latest history of GPS measurements, of IMU navigation solution and of its own model propagation computations (EKF state variables). With every ten ticks of the IMU clock (487 in FIG. 4A), the EKF will receive one set of filtered GPS data (465, 466) from the RRE's (460 and alike others). Ideally, the effective time of the received one set of filtered GPS data will align chronologically with the effective time of the most recently received, but faster sampled, set of IMU measurements (the data in table 482c). In actuality, both of the GPS and inertial measurement data flows are subject to different data transport and data processing delays. As seen in FIG. 4D, the incoming GPS data is subject to transport delay 465' as well as other processing delays Just like the case for IMU data which is time-tagged in the A/D process occurring before IMU storage step 458, GPS data is time tagged in its A/D conversion process (analog to digital conversion process, see 214a-214b of FIG. 2), before the digitized data is presented for RRE processing. The RRE processing itself does not introduce time uncertainty. However, there are RF front end processing delays such as 211a-213a before and/or during A/D conversion 214a of FIG. 2 which due introduce a drift-capable delay before the corresponding, digitized GPS data is latched into memory at flow point 467. These various processing and transport delays are collectively booked into the computational model as receiver clock bias. The incoming IMU data is subject to transport delay 456 before being latched into memory at flow point 458. This delay is booked into the computational model as data synchronization error. The various transport and pre-A/D processing delays may drift relative to one another and over time so that a time-varying data synchronization error or delay ($t_d$) develops between the time-stamped GPS and IMU data samples. Data synchronization error can also result from the relative drift between the platform receiver clock and IMU clock, or the relative drift between receiver clock and navigation processor clock, whenever different physical clocks are used.

In a typical system which has multiple processors and multiple associated clocks, clock synchronization and/or data synchronization should be implemented. Many variations are possible in the implementation details. In the case of clock synchronization, one of the clocks with desirable stability is designated as a master (e.g., the GPS receiver clock), and the rest of the clocks are designated as slaves (e.g., the IMU clock and navigation processor clock). The master clock sends sync pulses to the slave clocks to keep the slave clocks in synchronization. Clock synchronization can be carried out by one or both of hardware and software. Time synchronization accuracy provided by hardware can be in terms of tens of nano-seconds to a few micro seconds. Software synchronization tends to be less accurate as it relies on processor interrupt timing. In the case of data synchronization, there may or may not be an intent to synchronize relative to the clocks. Data synchronization can be carried out in various ways. For a GPS-Inertial system such as UTC, since the GPS signal already includes a standard 1 pps sync pulse (this pulse can also be used for clock synchronization), data synchronization is often accomplished by aligning the IMU time-tagged data to the GPS time-tagged data at the navigation processor side. By adding a data synchronization error state in the Kalman filter we reduce this error contribution, especially when the sync error exhibits slow changing characteristics. Clock and/or data synchronization are especially critical for high speed and agile platforms that need high precision navigation. Thus the introduction of the data synchronization error state in the Kalman filter is particularly advantageous in such high speed and/or high agility applications.

As seen in FIG. 4B the 10 ms apart inertial measurements have physical times of effectiveness denoted as $t1$, $t2$, $t3$, etc., after compensation for sensor dynamics latencies are factored in (by propagating from $P_{x1}$ to $P_{y1}$ for example). However, because the RRE-filtered GPS measurements have a center of gravity near the end ($\zeta=0$) of their m raw samples (e.g., m=50), and/or because of the relative drift between receiver clock and IMU and/or processor clock, the effective times of the GPS measurements are not time aligned with the corresponding, one out of every ten ticks (e.g., $t1$, $t2$, $t3$, ... $t11$, $t12$, $t13$, etc.) of the corresponding inertial measurements, $P_{y1}$, $P_{y2}$, .... $P_{y11}$, $P_{y12}$, etc. Due to this asynchronism between the GPS and IMU measurements, a data synchronization error can be introduced into the model evaluation if the GPS and IMU measurements are assumed to belong to the same effective time points. Consider a GPS-based, position measurement, $P_{gm}$ having an effective center of gravity at roughly the end ($\zeta=0$) of its m unfiltered sample points. Call the center of gravity time point, $t_m$. Platform position, as determined by IMU at time point $t2$ is not exactly the same as platform position at time point, $t_m$. In order to fairly compare the inertially-based position measurement, $P_{y2}(t_2)$ with the GPS-based position measurement, $P_g(t_m)$, one or the other of the latter data values should be modified to be time-wise synchronized with the other. Typically, the one with higher sampling rate (e.g., the IMU navigation solution signal) is adjusted to time-match the other one with lower sampling rate (e.g., the GPS measurements-based signals). In the illustrated example (FIG. 4B) it is the inertial-based position measurements that are time-wise interpolated (or simply time shifted) to thereby generate a re-synchronized, inertial-based position measurement value, $P_{ym}(t_m)$, that time-wise aligns with the GPS-based position value, $P_{gm}(t_m)$. This temporal alignment is carried out in module 484b (see also 484b' of FIG. 4D). In the embodiment of FIG. 4B, the INM output samples are adjusted via interpolation. A sample interpolation is shown for platform position, $P_{y2}(t_2)$ where the new effective time point for this data sample is going to be the GPS center of gravity: $t_m=t_2+\Delta t$. Therefore the revised IMU data sample, $P_{ym}(t_m)$ can be computed by interpolating, for example, between time points $t_2$ and $t_3$ if the effective GPS time point, $t_m$ resides between time points $t_2$ and $t_3$.

One embodiment of the interpolation operation 484b can be represented by the following equations Eq. 10d:

$$P_{inm}(t_m) = P_{inm}(t_1) \frac{(t_m - t_1)}{(t_2 - t_1)} (P_{inm}(t_2) - P_{inm}(t_1))$$ Eqs. 10d where $P_{inm}(t_m)$ represents the IMU-generated sample for platform position having effective time tag, $t_m$ to match the corresponding effective time tag of the GPS data, $t_m-t_1$ represents the current data synchronization error (also shown as $\delta t_d$ in FIG. 4D) and $t_2-t_1$ represents the IMU sampling interval. In an alternate embodiment, because there are 10 IMU-based samples for each GPS-based measurement sample, data synchronizer 484b simply picks the velocity and position values of a different IMU timing tick, say those of t3 rather than those of t2 in response to the data synchronization error signal, $\delta t_d$ received from error estimator 474c (FIG. 4D). Similar synchronization operations are understood to be carried out on the IMU velocity samples, $V_{y1}$, $V_{y2}$, etc.

Although for sake of simplicity, FIG. 4B depicts the data synchronization operation 484b as being carried out on position and velocity samples (e.g., $P_{y2}$, $V_{y2}$) obtained from the IMU, it is within the contemplation of the disclosure to alternatively or additionally carry such synchronization operations on range data samples, range residual data samples and/or samples representing their derivatives. FIG. 4D shows unit 484a converting the inertial-based P and V samples into predicted range residual and range residual rate samples. (They are termed, predicted because unit 484a has to predict (based on GPS ephemeris) where the respective GPS vehicles (e.g., 101-103) will be in the sky relative to the platform in order to draw a hypothetical line (like 130 but based on inertial measurements) from the current platform position to the respective GPS vehicle positions, to thereby determine the predicted range residual (RR) and range residual rate samples.) RRE-smoothed, GPS measurements of range and/or range residual and/or their derivatives are output from RRE units such as 460' for the respective in-sight space vehicles (e.g., 101-103). Unit 471' adds the clock bias correction factor(s) (e.g., add c times $\delta t_b$ to the range) so that the GPS measurements are corrected for the clock error or bias between the on-platform clock 497 and the constellation clock 449. Unit 474a estimates clock bias drift. The bias-corrected GPS measurements are time-tagged with appropriate effective times and sent by way of line 471'a to the measurements comparator 472'. Temporal data aligner 484b' functions to chronologically align the time tagged IMU-based measurements with the corresponding GPS measurements (e.g., predicted RR and predicted RR rate sampled at the GPS sampling rate, i.e. 1 Hz) so that counterpart measurements of substantially same effective times are compared against each other by comparator 472'.

Given the drift corrections produced by one or more of estimators 474a, 47b and 474c in portion 474 of the Error Kalman Filter 470, the corresponding corrections 475' (see also 475 of FIG. 4A) output by the EKF 470 tend to have more accurate corrections data 475a for the INM 480 (FIG. 4A) and/or more accurate corrections data 475b for the GPS tracking predictor 490 than would have been available if one or both of drift estimators 474b and 474c (FIG. 4D) were not present. As a consequence of the more accurate INM corrections data 475a, the navigation solution signal 485 output by the INM is more accurate. It is more accurate in terms of magnitude/direction and in terms of time, where the latter temporal accuracy comes from the contributions made by the sensor latency compensator 482b when producing the velocity ($V_y$) and position ($P_y$) components of the navigation solution signal 485.

Focusing attention now on the GPS tracking predictor 490 of FIG. 4A, note that it receives and responds to the improved navigation solution signal 485 and to the clock bias component ($t_b$) and antenna moment arm of the more accurate corrections data 475b output by EKF 470. As a result, the GPS tracking predictor 490 has a better chance of more accurately predicting the carrier frequency 493 and code frequency/phase 494 of the next incoming GPS radio signal 401 (which signal 401 is affected by Doppler shift). If the GPS front end processing unit 402 gets a more accurately tuned carrier demodulating signal from carrier NCO 431 and/or a more accurately tuned, PRN phasing signal from code NCO 441, the GPS front end processing unit 402 can provide less noisy I&Q correlation data 461 (see also 261 of FIGS. 2 and 661 of FIG. 6) to the curve-fitting RR extractors 460. This in turn provides the GPS measurements processing module 471 within the EKF 470 with less noise infected, GPS-based measurements (e.g., RR and RR dot for each in-sight and used SV) and the loop closes synergistically with the EKF model 473m being able to better model GPS error states and INM error states and to thereby produce more accurate correction signals, 475b and 475a, to the GPS tracking predictor and INM respectively. Stated otherwise, the GPS tracking predictor module 490 is therefore receiving a sequence of navigation solution signals 485 that include: (a) corrections for sensor latency drift, $\delta t_{IMU}$, as provide by unit 474b; (b) corrections for clock bias and data synchronization drifts, as provide by unit 474a and 474c; (c) a first removal of GPS noise due to curve fitting in each RRE 460; (d) a second removal of GPS noise due to correlation in unit 245 (FIG. 2; or 645-646 for the below described embodiment of FIG. 6); and (e) a third removal of GPS noise in the EKF due to cross-constellation smoothing provided by the time-matched comparisons made by unit 472' (FIG. 4D). The corrections feed 475b to the GPS tracking predictor module 490 further includes those relating to compensations for the moment arm between the GPS antennae and the centrally mounted IMU. These are shown in above Table 1 of the 109 EKF states.

More generally speaking, the big EKF 470 provides a Markov modeling for error states relating to the accelerometer drift as well as for gyroscope drift, sensor latency drift, GPS signal flight time drift, and gravitational field perturbations. EKF-internal propagations of these modeled states are represented by linearized dynamic equation Eq. 11a and its subordinate matrices shown as Eq. 11b:

$$x = [\ \delta x_{NAV}\quad \delta x_{ACCEL}\quad \delta x_{GYRO}\quad \delta x_{GPS}\quad \delta x_{GRAV}\ ]\qquad \text{Eq. 11a}$$

$$\begin{bmatrix} \delta\dot{x}_{NAV} \\ \delta\dot{x}_{ACCEL} \\ \delta\dot{x}_{GYRO} \\ \delta\dot{x}_{GPS} \\ \delta\dot{x}_{GRAV} \end{bmatrix} = \begin{bmatrix} F_{11} & F_{12} & F_{13} & 0 & F_{15} \\ 0 & 0 & 0 & 0 & 0 \\ 0 & 0 & 0 & 0 & 0 \\ 0 & 0 & 0 & F_{44} & 0 \\ 0 & 0 & 0 & 0 & F_{55} \end{bmatrix} \begin{bmatrix} \delta x_{NAV} \\ \delta x_{ACCEL} \\ \delta x_{GYRO} \\ \delta x_{GPS} \\ \delta x_{GRAV} \end{bmatrix} + \begin{bmatrix} w_{NAV} \\ w_{ACCEL} \\ w_{GYRO} \\ w_{GPS} \\ w_{GRAV} \end{bmatrix}$$

$$F_{11} = \begin{bmatrix} 0_{3\times 3} & I_{3\times 3} & 0_{3\times 3} \\ \dfrac{GM}{\|R_{nav}\|^3}\left(\dfrac{3R_{nav}R_{nav}^T}{\|R_{nav}\|^2} - I_{3\times 3}\right) & 0_{3\times 3} & a^I_{accel}\otimes \\ 0_{3\times 3} & 0_{3\times 3} & 0_{3\times 3} \end{bmatrix}\qquad \text{Eq. 11b}$$

$$F_{12} = \begin{bmatrix} 0_{3\times 3} & 0_{3\times 3} & 0_{3\times 3} & 0_{3\times 3} \\ -C_A^I & C_A^I a^A_{accel}(1) & C_A^I a^A_{accel}(2) & C_A^I a^A_{accel}(3) \\ 0_{3\times 3} & 0_{3\times 3} & 0_{3\times 3} & 0_{3\times 3} \end{bmatrix}$$

$$F_{13} = \begin{bmatrix} 0_{3\times 3} & 0_{3\times 3} & 0_{3\times 3} & 0_{3\times 3} \\ 0_{3\times 3} & 0_{3\times 3} & 0_{3\times 3} & 0_{3\times 3} \\ -C_P^I & C_P^I \omega^P_{Earth}(1) & C_P^I \omega^P_{Earth}(2) & C_P^I \omega^P_{Earth}(3) \end{bmatrix}$$

$$F_{15} = \begin{bmatrix} 0_{3\times 3} \\ I_{3\times 3} \\ 0_{3\times 3} \end{bmatrix}$$

$$F_{44} = \begin{bmatrix} 0 & 1 & 0 & 0_{1\times 12} \\ 0 & 0 & 1 & 0_{1\times 12} \\ 0 & 0 & 0 & 0_{1\times 12} \\ 0_{12\times 1} & 0_{12\times 1} & 0_{12\times 1} & -\tau_{GPS}I_{12\times 12} \end{bmatrix}$$

$$F_{55} = C_E^I Diag[\ -\tau_{gx}\quad -\tau_{gy}\quad -\tau_{gz}\ ]$$

The above Kalman filter dynamic equations 11a-11b use symbols known to those in the field and are included here just for purpose of completeness of description. Detailed descriptions of each symbol used is thus not included here.)

The accumulation of all these EKF error states can be used to give the GPS tracking predictor module 490 a highly confident (low uncertainty) basis on which predict the look-ahead carrier frequency 493 and its phase as well as the PRN code generating frequency and its phase 494. Referring momentarily back to FIG. 1, it may now be appreciated that errors can be reduced by gathering data from as many GPS space vehicles as may be possible in a given arena. If only 3 GPS space vehicles are available, then a vector triangulation algorithm may employed using the resolved range vectors (e.g., 130) of the 3, in-view GPS vehicles (e.g., 101, 102, 103) and this may be used merely to determine platform position (position of 150) but not platform GPS receiver time (3 unknowns and 3 equations). In similar fashion, a vector quad-angulation algorithm may employed on the resolved range vectors of any 4, in-view GPS vehicles to determine platform receiver time (current time inside platform 150) based only on the GPS data (4 unknowns and 4 simultaneous equations). This latter determination may then be used to determine how far off from constellation time (449), the local clock generator (497) on the platform is and to generate a corresponding, clock bias correction signal, $\Delta t_b$ which is then further improved upon by estimating its drift. When 5 or more in-view GPS vehicles are being used, the additional data may be employed to determine IMU sensor latency or IMU data synchronization error with respect to GPS measurements. As explained above, block 474b (FIG. 4D) models the sensor latency drift, $\delta t_{IMU}$ as an environment-dependent random walk similar to what is done in Eq. 9a for the GPS clock bias drift. Blocks 474a and 474c model the GPS clock bias drift and the data synchronization drifts respectively. The latency/synchronization corrections provided by blocks 482b and 484b' (FIG. 4D) reduce the relative latency/synchronization errors that could infect the EKF output, correction signals 475 (e.g., $X_{correct}$) and that could infect the navigation solution signals output by the INM 480. The latency drift estimators 474a-474c therefore operate to bring one or more of the real-time GPS-based measurements (465), the real-time inertial-based measurements (485) and the adaptive model 473 into closer agreement with real time reality surrounding the fast moving platform 150. This allows the NAV-aided GPS signals getter 158a (FIG. 1) to more quickly lock onto the incoming GPS signals 131a and to produce GPS-based measurements with less noise for forwarding to the GPS-aided error filter 158b. The latter unit 158b is then able to deliver more accurate and more timely $X_{correct}$ values by way of update sampler 159 to INM box 156, thereby allowing the latter to produce more accurate $X_{nav1}$ solution signals 157a, 157b for distribution to units 158a and 158b.

Figure 6:
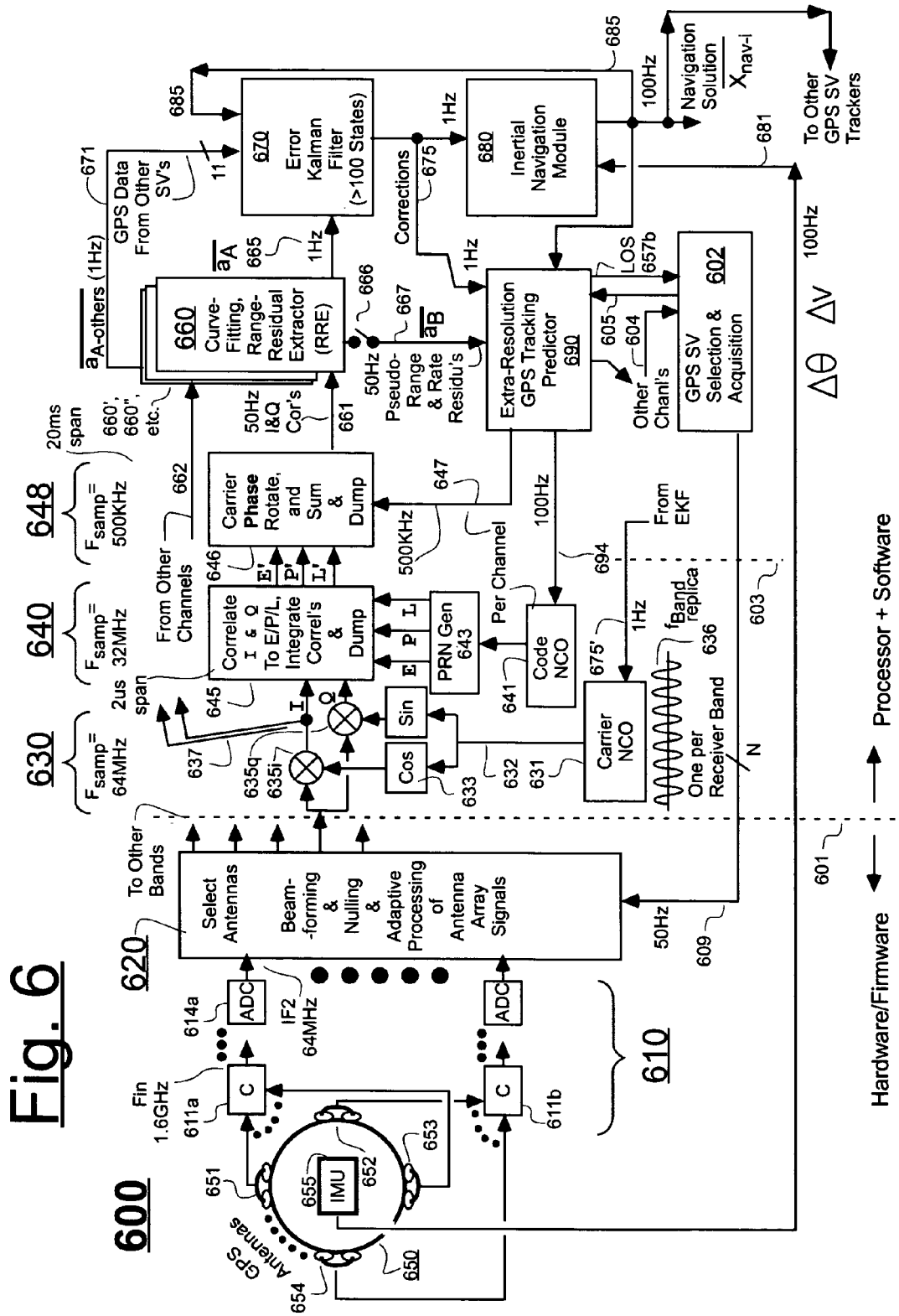
FIG. 6 is a block diagram of a second UTC system in accordance with the invention.

Referring to FIG. 6, a schematic diagram is provided of a second UTC system 600 that is structured in accordance with the invention. FIG. 6 appears similar to FIG. 2 on first glance, and where practical, like reference numbers in the "600" century series are used in FIG. 6 for elements that have similar counterparts identified by reference numbers in the "200" century series in FIG. 2. Parts of front end section 610 have been left out of the illustration so as to allow room for insertion of a carrier phase rotating, and sum & dump module 646 between the I&Q correlator 645 and the RRE modules 660, 660', etc. GPS tracking predictor 690 now feeds a 500 KHz sampled, phase angle adjustment signal 647 to new block 646 (where 500 KHz corresponds to a 2 μs of sample period) for average-down conversion to 50 HZ I and Q components (early, prompt and late). That is not the only difference. Carrier NCO 631 is now updated by a 1 Hz GPS clock correcting signal 675' provided by the big EKF 670. Carrier NCO 631 is repeated on a one-per-receiver band basis in system 600. This is to be contrasted with the one-per-channel basis of FIG. 2 for the there illustrated carrier NCO 231. Moreover, signal demodulators 635i and 635q are also repeated on a one-per-receiver band basis in FIG. 6 rather than the one-per-channel basis used in FIG. 2. This means that there will be a much smaller number of carrier NCO's like 631 and signal demodulators like 635i and 635q in system 600 as compared to the number of such units typically used in FIG. 2. Given a situation where there are 12 in-view GPS vehicles and each is transmitting on just the L1 and L2 bands, there will be 24 channels and a mere 2 bands (L1 and L2). In practical systems there can be more bands and fewer in-view GPS vehicles. This is just an example to show that the computational workload on the totality of carrier NCO's 631 and demodulators 635i-635q in system 600 can be significantly lessened. As a result they can all be practically implemented as software in a corresponding processor, rather than only in firmware or hardware; this being indicated by the shift of line 601 to the left.

A price is paid though, for having only one carrier NCO 631 per receiver band. The effective Doppler frequency of each GPS vehicle transmitting out on the L1 band (for example) is usually different. Yet NCO 631 pretends they are all the same. A same, demodulated; and thus down converted set of I&Q signals 637 is sent out for all the channel processors (e.g., 645-646-660). But each series of channel processors (e.g., 645-646-660) is working with an I&Q set that has not been precisely demodulated at its respective, Doppler-modified carrier frequency and phase. Instead the utilized frequency of carrier NCO 631 will be one that the big EKF 670 establishes based on receiver clock drift, which drift is common for all the then-in-view and utilized GPS vehicles. A different demodulation frequency and phase error will be undesirably present for each channel that uses the once-demodulated output of demodulators 635i-635q. It may be tempting to perform a second, frequency demodulation on a per channel basis to correct for this frequency shift error after the correlate and dump operation is performed by block 645. However, it has been determined that if such a second, frequency demodulation is carried out near the base band (near 0 Hz), one or more unwanted sidebands will be generated and it will be difficult to filter out the signal content of such unwanted sidebands.

Instead of operating in the frequency domain, the 2-stage carrier wipe-off embodiment 600 of FIG. 6 performs a timing shift in the time domain on a per channel basis buy se of the illustrated, carrier phase rotation, and average-down (sum & dump) modules such as 646. To understand on a crude level why this works, it should be appreciated that the feedback loop 675' that urges the carrier NCO 631 towards approximate, frequency lock-on with the incoming signals of a given band (e.g., L1) is simultaneously performing an approximate, phase lock on. If the replica signal 636 is falling behind the incoming PRN's of the given band (e.g., L1), then the EKF feedback loop signal 675' will advance the output frequency of NCO 631, thereby causing it to also advance in phase so as to catch up with the incoming PRN streams. Accordingly, the once demodulated outputs 637 of multipliers 635 will be close to being in phase with the output sine and cosine waveforms of generators 633. A small phase error will be present for each channel.

More formally, after first stage carrier tracking by NCO 631 and correlation in module 645 as well as the sum and dump (which summing acts like a low pass filtering operation following the separation of the down-converted GPS signals into I&Q components at a near baseband frequency), each of the E'=correlated early, P'=correlated prompt and L'=correlated late signals can be expressed in time-domain format per the following equations Eq. 12a-12b for their respective I&Q components:

$$L_{1,j,I}(0, t_k, x) = \sum_{SV_i} A_i(P_i(t_k, x) \oplus D_i(t_k))\cos((\omega_{OFFSET} - \omega_{Dopp,i})t_k - \theta_i(t_k)) + n_i \quad \text{Eq. 12a}$$

$$L_{1,j,Q}(0, t_k, x) = \sum_{SV_i} A_i(P_i(t_k, x) \oplus D_i(t_k))\sin((\omega_{OFFSET} - \omega_{Dopp,i})t_k - \theta_i(t_k)) + n_i \quad \text{Eq. 12b}$$

where $\omega_{offset}$ is an intentional frequency offset (which in one embodiment is set to zero) and where $\omega_{Doppler}$ is the approximate Doppler compensated, angular frequency produced by NCO 631. $\theta_i(t_k)$ is the per channel, sampled phase error.

The phase error may be re-expressed per the following equation Eq. 13:

$$\phi = \text{mod}(\phi + \omega_{OFFSET}\Delta t + \hat{\omega}_{Dopp}\Delta t + \Delta\hat{\theta}, 360). \quad \text{Eq. 13}$$

where $\omega_{OFFSET}\Delta t$ is a precomputed constant, and $\hat{\omega}_{Dopp}\Delta t$ is computed at each $\hat{\omega}_{Dopp}$ update provided by EKF signal 675' (1 Hz update rate). The cosine and sine mixing signals for each vehicle, SV(j) may be obtained by table look-up as precomputed values according to following and respective expressions Exp. 14a-14b for each sampled value of t and θ:

$$\cos((\omega_{OFFSET} - \omega_{Dopp,j})t - \theta_j(t)) \quad \text{Exp. 14a}$$

$$\sin((\omega_{OFFSET} - \omega_{Dopp,j})t - \theta_j(t)). \quad \text{Exp. 14b}$$

The second stage carrier phase rotation module 646 performs a corresponding, rotational matrix multiplication, per the following matrix equation Eq. 15 for the respective I&Q components of each of the E'=correlated early, P'=correlated prompt and L'=correlated late signals:

$$\begin{bmatrix} L_{1,j,I,R}(0, t_k, x) \\ L_{1,j,Q,R}(0, t_k, x) \end{bmatrix} = \begin{bmatrix} \cos\phi & \sin\phi \\ -\sin\phi & \cos\phi \end{bmatrix} \begin{bmatrix} L_{1,j,I}(0, t_k, x) \\ L_{1,j,Q}(0, t_k, x) \end{bmatrix} \quad \text{Eq. 15}$$

where R is the relative early, late or prompt designation and j is the channel identification associated with a given SV.

Rewriting the matrix multiplications of Eq. 15, one may obtain:

$$L_{1,j,I,R}(0,t_k,x) = L_{1,j,I}(0,t_k,x)\cos(-\omega_{Dopp,i}t_k - \theta_i(t_k) + \Delta\phi_k) + L_{1,j,Q}(0,t_k,x)\sin(-\omega_{Dopp,i}t_k - \theta_i(t_k) + \Delta\phi_k)$$

and $$L_{1,j,Q,R}(0,t_k,x) = L_{1,j,Q}(0,t_k,x)\cos(-\omega_{Dopp,i}t_k - \theta_i(t_k) + \Delta\phi_k) + L_{1,j,I}(0,t_k,x)\sin(-\omega_{Dopp,i}t_k - \theta_i(t_k) + \Delta\phi_k)$$

The sine and cosine component signals for these may be obtained by table look up per expressions Exp. 14a-14b.

The time spans over which the respective sum and dump operations of modules 645 and 646 are carried out should be adjusted to match the desired input update rates of the subsequent modules. Thus, the sum and dump time span of module 646 (carrier phase rotate and average-down) is set to 20 ms to match the desired 50 Hz input rate of RRE units 660, 660', 660", etc. The sum and dump time span of module 645 (first stage correlation) is set to 2 µs to match the desired 500 KHz input rate of module 646. The GPS tracking predictor 690 also outputs at a corresponding 500 KHz update rate by using its chained mini-KF's 491a, 491b of FIG. 4A.

Referring to FIG. 4C, the 500 KHz updated rotation error (phase error) signals 647 are projected halfway forward of the 2 µs update period of module 646, or +1.0 µs into the future beyond current time $t_c$. In FIG. 4C this fine resolution propagation is carried out by mini-KF 491b' (cycling at 500 KHz, therefore $Z^{-1}$ interval is 2 µs). Coarser resolution, predictive propagation is carried out by mini-KF 491a' (cycling at 1000 Hz, therefore $Z^{-1}$ interval is 1 ms). Both mini-KF's have their parameters periodically updated by model updater 472' so that the outputs of the mini-KF's 491a', 491b' do not drift far away from real world measurement results such as those provided by the 10 msec apart navigation solution samples at respective times, t1, t2, t3, etc. Inertial-based range values can be extracted by finding the difference between the current Nav vector (121, 122 of FIG. 1) and the SV ephemeredes data (vector 111 of FIG. 1) and from there deriving the expected and Doppler affected carrier and code phases. This inertial-based validation data is available every 10 msec. It is desirable to have the so-called, center of gravity of the latest iterative results from the mini-KF's 491a', 491b' time aligned with the 10 msec apart, inertially-based validation samples.

For example, if the coarse mini-KF 491a' iteratively steps forward from a first propagated state at time $t_1-0.5$ ms to its next propagated state at time $t_1+0.5$ ms, then the center of gravity of these two iteratively interconnected result states will center on the t1 sample time. If the average of the phase values predicted by the two mini-KF result states (the ones produced at $t_1-0.5$ ms and $t_1+0.5$ ms) closely matches the phase result given by the IMU-based validation data (485') at sample time t1, then strong confidence will be had that the coarse mini-KF 491a' is on track in correctly predicting the Doppler-affected GPS carrier and code phases. If the average does not match within predefined tolerances to the IMU-based validation data (485') at sample time t1, then the model updater 472' will adaptively alter the carrier phase (via multiplying the Kalman gains $K_{ij}$ with the phase residual of above equation Eq. 8c) of the mini-KF to bring the results of the latter into line with the IMU-based validation data. The same approach is used for the finer mini-KF 491b'. Alternatively, updating of the finer mini-KF 491b' is based on using result data of the coarse mini-KF 491a' as validation data where the latter is validated by the IMU-based validation data 485'. In order to get the coarse and fine mini-KF's, 491a' and 491b', respectively running at a half step out of phase with the timings (e.g., t1, t2, t3, etc.) of the IMU-based validation data samples 485', during system bootup or reset, the mini-KF's, 491a' and 491b', are initialized to start iterating after respective half-step delays off of one of the IMU sample ticks ($t_{imu}$). From that point forward they continue to run a half step out of phase relative to the t1, t2, etc. time markers, namely ±0.5 ms for the coarse mini-KF, 491a' and ±1.0 μs for the fine mini-KF 491b'.

Although the "effective" full step time of the coarse mini-KF, 491a' is 1.0 ms and the "effective" full step time of the mini-KF 491b' is 2.0 μs, the actual, real time speeds of these phase predictors have to be substantially faster than that. The reason is that they have race forward in effective time faster than does real time so that their utilized outputs have effective times ahead of real current time, $t_c$. This concept is better explained by example. Consider the coarse mini-KF, 491a' and assume that due to data transport and computational delays, the IMU-based validation data (485') that has effective time stamp t1 does not reach the model updater 472' and coarse mini-KF, 491a' until real time point, $t_1$ plus $\delta t_{comp}$. At that delayed time, $t_1+\delta t_{comp}$, the updater recalibrates the mini-KF, 491a' and sets it loose to continue propagating its predicted phase results. However, the last valid state of the recalibrated mini-KF 491a' had effective time, $t_1-0.5$ ms. The coarse mini-KF 491a' starts with that last valid state and iterates forward in effective time to produce the predicted phase values for effective times, $t_1+0.5$ ms, $t_1+1.5$ ms, $t_1+2.5$ ms, etc. It has to generate results sufficiently fast so as to catch up with and bypass the current real time, $t_c$. For example, in the case where it is desired to predict carrier and code phases 0.5 ms into the future (e.g., FIG. 2), the effective time of the utilized mini-KF output is $t_{predict}=t_c+0.5$ ms. Its predictive outputs started at last valid state, $t_1-0.5$ ms and raced ahead of the progression of real time so as to produce a result having an effective time greater than current real time, $t_c$. The same applies for the fine mini-KF, 491b' which in the case of FIG. 6, outraces the progression of real time so as to produce a result having an effective time $t'_{predict}=t_c+1.0$ μs. Various methods will be known to those skilled in the art achieving such results. By way of example, one such method is to not single step through the sequence of equations Eq. 8a-8d, but rather to hardwire them out in parallel so that, say, 6 sequential results are produced in one shot and the desired one is picked out for utilization.

While specific, illustrative values are provided herein with regard to sampling times, prediction time spans, etc., the scope of the invention is not to be limited to merely the illustrative examples. The advantage of the 2-stage carrier wipe off of FIG. 6 is understood to include the fact that the computational load on the processor is significantly reduced, given that updates are needed on a per receiver band basis in stage 1, rather than on a per channel basis, and given that the sum and dump period of correlators 645 is reduced to just a 2 μs update period. Thus the hardware/software division line 601 may be moved as shown to encompass almost all of the processing to the right of module 620 in software. (Inertial measurements 681 going to the INM 680 are digital signals of course.)

RECAPS: To recapitulate some of the concepts described herein, the following recaps are provided without imposing limitations on details above. While bold and double-parenthesized cross-referencing text (e.g., ((100))) is provided in the below recaps as an aid for readability and for finding corresponding (but not limiting) examples of support in the specification and drawings, the so-parenthesized text is not intended to add any limitation whatsoever to the recaps and should be deleted in interpretation of the breadth of disclosure provided by the recaps.

A) RRE

Recap. 1: Among what is disclosed herein is: A method ((301)) for determining relative range as a function of time_ between first and second objects ((350,101)) moving relative to one another, the method comprising:

(a) receiving at said first object a first signal ((131)) transmitted from said second ((101)) object, where said first signal includes a first embedded code stream ((PRN)) that can be used to define the phase of said first signal as received at said first object relative to a corresponding first replica code stream produced ((243)) in said first object ((350));

(b) defining the first relative range between the first and second objects as a first, unknown $N^{th}$ order polynomial of relative phase as a function of time;

(c) taking m measurements ((311)) of the relative phase between the first embedded code stream and the first replica code stream, where m is greater than N;

(d) fitting a first, $N^{th}$ order polynomial to the taken, m measurements in accordance with a first predefined curve fitting algorithm; and (e) using the first fitted $N^{th}$ order polynomial to define a first relative range ((r(t))) and/or one or more over time derivatives of the first relative range at a given first time.

Recap 2: The method of Recap 1 wherein:

(b.1) said defining of the first unknown $N^{th}$ order polynomial uses backward-running time so that a constant coefficient ((r(ζ=0))) of the first fitted polynomial will correspond to a most recently taken measurement of the relative phase and/or one or more of its over time derivatives.

Recap 3: The method of Recap 1 wherein:

said second object is a first GPS space vehicle ((101));

said first object is an acceleratable, agile platform ((150)); and said signal ((131)) is a GPS radio signal having a pseudo-random code sequence defining at least part of said embedded code stream.

Recap 4: The method of Recap 1 wherein:
(e.1) said using of the first fitted $N^{th}$ order polynomial includes using one or more coefficients (($a0$)) of the first fitted $N^{th}$ order polynomial to define the first relative range at a predefined time.

Recap 5: The method of Recap 4 wherein:
(e.2) said using of the first fitted $N^{th}$ order polynomial includes using one or more coefficients (($a1$)) of the first fitted $N^{th}$ order polynomial to define a rate of change of the first relative range at the predefined time.

Recap 6: The method of Recap 1 and further comprising:
(c.1) setting said number, m of measurements to be taken, and time intervals between said measurements to respective values so that total time consumed for taking the m measurements for the corresponding first and second objects will be about equal to, but not exceed a predefined first output sampling rate for said using of the first fitted $N^{th}$ order polynomial.

Recap 7: The method of Recap 6 and further comprising:
(f) repeating said steps (a), (c), (d) and (e) at a rate matching said predefined first output sampling rate.

Recap 8: The method of Recap 1 wherein:
the first embedded and first replica code streams are such that a change of relative phase between the first embedded code stream and the first replica code stream indicates a change in a corresponding first relative range between the first and second objects, and said receiving of the first signal is subject to receiving noise mixed in with the first embedded code stream of the first received electromagnetic signal; and
(d.1) said first predefined curve fitting algorithm includes computation of a least mean square fitting error.

Recap 9: The method of Recap 1 wherein:
(d.1) said first predefined curve fitting algorithm includes computation for a given value of m, of a corresponding, first solution producing matrix (($pinvH_m(I,j)$)), which matrix can be matrix multiplied against a samples containing vector (($Y(j)$)) holding data representing said m taken measurements to thereby produce a first solution vector (($a_A(N)$)) containing N+1 coefficient values for the first fitted $N^{th}$ order polynomial.

Recap 10: The method of Recap 1 and further comprising:
(f) receiving at the first of the objects a second electromagnetic signal (($132$)) transmitted from a third (($102$)) of the at least first and second objects, where the received second signal includes a second embedded code stream ((PRN)) that can be used to define an arriving phase of the received second signal relative to a phase of a corresponding second replica code stream produced (($243$)) in the first object (($350$)), the second embedded and second replica code streams being such that a change of relative phase between the second embedded code stream and the second replica code stream indicates a change in a corresponding second relative range between the first and third objects, said receiving of the second signal being subject to receiving noise mixed in with the second embedded code stream of the second received electromagnetic signal;
(g) defining the second relative range between the first and third objects as a second, unknown $N'^{th}$ order polynomial of the second said relative phase and/or one of its time domain derivatives versus at least one of forward and backward-running time;
(h) taking m' measurements (($311$)) of the corresponding relative phase between the second embedded code stream and the second replica code stream, where m' is greater than N';
(i) fitting a second, $N'^{th}$ order polynomial to the taken, m' measurements in accordance with a second predefined curve fitting algorithm; and
(j) using the second fitted $N'^{th}$ order polynomial to define the second relative range (($r(t)$)) and its over time derivatives, at a given second time.

Recap 11: The method of Recap 10 wherein:
said first object is an acceleratable, agile platform (($150$));
said second object is a first GPS space vehicle (($101$));
said third object is a second GPS space vehicle (($102$)); and
said first and second electromagnetic signals (($131,132$)) are GPS radio signals having respective pseudorandom code sequences respectively defining at least part of said respective first and second embedded code streams.

Recap 12: The method of Recap 10 and further comprising:
(k) transmitting data (($265,271$)) representing said first and second relative ranges to a data processor (($270,280$)) located on said first object so that the data processor can use the transmitted data to resolve the position of the first object, at least with respect to the second and third objects (($101,102$)).

Recap 13: The method of Recap 12 wherein:
(i.1) said fittings of the first $N^{th}$ order polynomial and second, $N'^{th}$ order polynomial occur in parallel or time overlap so that the data processor can receive the data (($265,271$)) representing the first and second relative ranges within a predefined sampling period of the data processor.

Recap 14: A range value extracting apparatus (($260$)) for determining one or more relative ranges between at least first and second objects (($350,101$)) which can move relative to one another, the apparatus being located in a first of the objects and comprising:
(a) a first receiving port (($261$)) for receiving a first digital input data signal obtained from a corresponding first electromagnetic signal (($131$)) which has been transmitted from the second (($101$)) of the objects and received by the first object, where the received first electromagnetic signal includes a first embedded code stream ((PRN)) that is extracted within the first object via demodulation (($235$)) and is then cross-correlated (($245$)) against a corresponding first plurality of time-staggered replica code streams ((E,P,L)) produced (($243$)) in the first object so as to produce a first digital phase signal indicating a first relative phase between the first plurality of replica code streams and the first embedded code stream,
where the produced first digital phase signal is included in said first digital input data signal received by the first receiving port,
where a change in said first relative phase indicates a change in a corresponding first relative range between the first and second objects, and
where said receiving of the first electromagnetic signal by the first object is subject to receiving noise mixed in with the first embedded code stream of the first received electromagnetic signal;
(b) a first sampler (($511$)) which takes m samples (($311$)) of the first digital phase signal over a first predefined sampling period, where m is greater than 3;
(d) a first curve fitter (($515$)) which computationally finds a first, $N^{th}$ order polynomial representing phase and/or time domain derivatives of said phase versus at least one of forward and backward-running time, where the found first, N $N^{th}$ order polynomial fits with the m samples taken over said first predefined sampling period in accordance with a first predefined curve fitting algorithm, where N is at least 2; and (e) a first output port ((265)) for outputting a first result signal representing the first fitted, N N$^{th}$ order polynomial.

Recap 15: The extracting apparatus of Recap 14 wherein:

(b.1) said first sampler is programmable such that at least one of said respective m value and first predefined sampling period of the sampler is adjustable so as to thereby define a desired output sampling rate.

Recap 16: The extracting apparatus of Recap 14 wherein:

(d.1) said first curve fitter ((515)) includes a first predefined curve fitting means that generates a signal representing a least mean square fitting error.

Recap 17: The extracting apparatus of Recap 14 wherein:

(d.1) said first curve fitter ((515)) includes a solution generating means that stores ((501)) at least a corresponding, first solution producing matrix ((pinvH$_m$(I,j))) for a given value of m that is used by said sampler, said first solution producing matrix ((pinvH$_m$(I,j))) being one that can be matrix multiplied against a samples containing vector ((Y(j))) holding data representing m taken measurement samples to thereby produce a first solution vector ((a$_A$(N))) containing N+1 coefficient values for the first fitted N$^{th}$ order polynomial.

Recap 18: The extracting apparatus of Recap 14 and further comprising:

(f) a second receiving port ((262)) for receiving a second digital input data signal obtained from a corresponding second electromagnetic signal ((132)) which has been transmitted from a third ((102)) of the objects and received by the first object, where the received second electromagnetic signal includes a respective second embedded code stream ((PRN)) that is extracted within the first object via demodulation ((235)) and is then cross-correlated ((245)) against a corresponding second plurality of time-staggered replica code streams ((E,P, L)) produced ((243)) in the first object so as to produce a second digital phase signal indicating a second relative phase between the second plurality of replica code streams and the second embedded code stream, where the produced second digital phase signal is included in said second digital input data signal received by the second receiving port, where a change in said second relative phase indicates a change in a corresponding second relative range between the first and third objects, and where said receiving of the second electromagnetic signal by the first object is subject to receiving noise mixed in with the second embedded code stream of the second received electromagnetic signal;

(g) a second sampler ((511)) which takes m' samples ((311)) of the second digital phase signal over a second predefined sampling period, where m' is greater than N';

(h) a second curve fitter ((515)) which computationally finds a second, N'$^{th}$ order polynomial representing second phase and/or time domain derivatives of said second phase versus at least one of forward and backward-running time, where the found second, N'$^{th}$ order polynomial fits with the m' samples taken over said second predefined sampling period in accordance with a second predefined curve fitting algorithm, where N' is at least 2; and (i) output port means ((271)) for outputting a second result signal ((a$_{A-other}$)) representing the second fitted, N'$^{th}$ order polynomial, the output port means optionally including said first output port.

Recap 19: The extracting apparatus of Recap 18 and further comprising:

(j) further output port means ((267)) for outputting a third result signal ((a$_B$)) having a respective output sampling rate ((50 Hz)) that is substantially greater than a corresponding output sampling rate of said first result signal.

B) Clock Bias Drift Estimator (Combination: Bias and Synch Error Estimator)

Recap 20: A method for estimating clock bias ((474a)) between a GPS reference clock ((449)) and an on-platform clock ((497)) of a GPS receiver, and for further estimating data synchronization error ((474c)) between GPS-based position measurements and inertial-sensor based position measurements, the method comprising:

(a) modeling ((Eq. 9a)) said clock bias and data synchronization errors within an Error Kalman Filter (EKF) as a self-propagating function of currently modeled bias ($\delta \Delta t_b$), currently modeled bias drift velocity ($\delta \Delta t_v$), and currently modeled, data synchronization error ($\delta \Delta t_d$);

(b) measuring change of range residual ($\delta \rho_J$) for a given GPS vehicle, J relative to said platform;

(c) updating the modeled clock bias error and modeled data synchronization error based on following measurement equation, Eq. 9c;

$$\delta \rho_j = -\vec{u}_j^T \vec{\delta R} + c\delta\Delta t_b - \vec{u}_j^T \vec{V} \delta\Delta t_d + \delta\Delta\epsilon_{\rho j} \ldots \quad \text{Eq. 9c}$$

where $\delta R$ is an Error Kalman Filter (EKF)-modeled, platform position error; $u_j$ is a directional unit vector pointing from the platform to space vehicle j, c is the average speed of light in an atmosphere through which the GPS signal travels, $\delta\Delta t_b$ is the EKF-modeled GPS receiver clock bias, V is an INM-generated, platform velocity; $\delta\Delta t_d$ is the EKF-modeled, data synchronization error, and $\delta\Delta\epsilon_{\rho j}$ is an EKF-modeled error associated with a GPS-measured range residual of the given GPS vehicle j, relative to said platform.

Recap 21: The method of Recap 20 and further comprising (d) using a GPS-based measurement of rate of change of range residual ($\delta\dot{\rho}_J$) in following measurement equation Eq. 9d for balancing the EKF model against observations:

$$\delta\dot{\rho}_j = -\vec{u}_j^T \vec{\delta V} + c\delta\Delta t_v \quad \text{Eq. 9d}$$

where $u_j$ is a directional unit vector pointing from the platform to space vehicle j, $\delta V$ is an EKF-modeled, drift for range residual rate of platform velocity error, $\delta\Delta t_v$ is the EKF-modeled GPS receiver clock bias rate, and c is the speed of light in the GPS-signal carrying atmosphere.

C) Data Synchronization Error Estimator 474c

Recap 22: A method for estimating data synchronization error ((474c)) between GPS-based measurements and inertial sensor based measurements of an ultra-tightly-coupled GPS/inertial navigation system (UTC system) to thereby account for a drift in relative data synchronization times of respective signals representing the GPS-based measurements ((471'a)) and the inertial sensor based measurements ((471'b)) to reach an adaptive corrections producing means ((472')) of the UTC system, where the UTC system is disposed on a platform ((150)) that is subject to at least one of high acceleration and temperature changes, the method comprising:

(a) propagating ((Eq. 9a)) an estimate of said data synchronization error over time using a currently modeled data synchronization error ($\delta\Delta t_d$);

(b) measuring change of range residual ($\delta\rho_i$) for at least one GPS space vehicle i relative to said platform; and (c) updating the synchronization error ($\delta\Delta t_d$) using the measured change of range residual ($\delta\rho_j$) in balancing a measurement equation ((Eq. 9c)).

Recap 23: The data synchronization error estimating method of Recap 22, wherein said data synchronization error is due at least in part to time-matching uncertainty between time tags of the GPS-based measurement signals and time tags of the inertial sensor based measurement signals.

Recap 24: The data synchronization error estimating method of Recap 22, wherein said data synchronization error is due at least in part to data transport delay ((456)) of the inertial sensor based measurement signals.

Recap 25: The data synchronization error estimating method of Recap 22, wherein:

(a.1) said propagating ((Eq. 9a)) of the estimate of said data synchronization error over time is carried out in a GPS/inertial Kalman filter ((470)) of the UTC system.

Recap 26: The data synchronization error estimating method of Recap 22, wherein:

(c.1) said updating of the synchronization error includes using a measurement equation in the form of following Eq. 9c:

$$\delta\rho_i = -\vec{u}_i^T \vec{\delta R} + c\delta\Delta t_b - \vec{u}_i^T \vec{V} \delta\Delta t_d + \delta\Delta\epsilon_{\rho i} \qquad \text{Eq. 9c}$$

where $\delta R$ is an Error Kalman Filter (EKF)-modeled platform position error, $u_i$ is a directional unit vector pointing from the platform to space vehicle i, c is the speed of light, in a predefined, GPS-signal carrying medium, $\delta\Delta t_b$ is an EKF-modeled GPS receiver clock bias, V is an INM-generated representation of platform velocity, and $\delta\Delta\epsilon_{\rho i}$ is an EKF-modeled error associated with a GPS-measured range residual of the given GPS vehicle i, relative to said platform.

Recap 27: A GPS/inertial navigation system that estimates data synchronization error ((484b')) between GPS-based measurements ((471'a)) and inertial-sensor based measurements ((471b)) generated by an inertial navigation module ((480)) of the GPS/inertial navigation system, where the system is mounted in a platform and the system comprises:

(a) synchronization error estimating means ((Eq. 9a, 474c)) for estimating said data synchronization error by propagating the estimated data synchronization error over time using an updateable error propagating model;

(b) GPS measuring means for measuring change of range residual ($\delta\rho_i$) for at least a given GPS vehicle i relative to said platform; and (c) updating means ((472)) for updating said synchronization error (we try to estimate sync error so we update sync error, we are not updating the model) using the GPS-measured change of range residual ($\delta\rho_i$) as part of a measurement equation ((Eq. 9c)) that includes $\delta\rho_i$ and $\delta\Delta t_d$ as variables thereof.

Recap 28: The GPS/inertial navigation system of Recap 27 wherein:

(a.1) said synchronization error estimating means ((Eq. 9a, 474c)) forms part of a GPS/inertial Kalman filter ((470)) of the GPS/inertial navigation system.

Recap 29: The GPS/inertial navigation system of Recap 27 wherein:

(c.1) said updating means operates in accordance with a measurement equation in the form of following Eq. 9c:

$$\delta\rho_i = -\vec{u}_i^T \vec{\delta R} + c\delta\Delta t_b - \vec{u}_i^T \vec{V} \delta\Delta t_d + \delta\Delta\epsilon_{\rho i} \qquad \text{Eq. 9c}$$

where $\delta R$ is an Error Kalman Filter (EKF)-modeled platform position error, $u_i$ is a directional unit vector from the platform to space vehicle i, c is the speed of light in a predefined medium, $\delta\Delta t_b$ is an EKF-modeled GPS receiver clock bias, V is an INM-generated signal representing platform velocity, and $\delta\Delta\epsilon_{\rho i}$ is an EKF-modeled error associated with the range residual of the given GPS vehicle i, relative to said platform.

D) IMU Sensor Latency Compensator

Recap 30: A method for compensating for inertial sensor latency ((454)) in an ultra-tightly-coupled GPS/inertial navigation system (UTC system) including an inertial navigation module (INM) ((480)), receiving inertial sensor signals ((481)) from inertial sensors subject to having said sensor latencies, the method comprising:

(a) propagating ((Eq. 9a, 474b)) an estimate of said sensor latency ($\delta t_{imu}$); and (b) modifying velocity and position signals ((482a)) of the INM to compensate for the sensor latency ($\delta\Delta t_{imu}$) by forward propagating first INM velocity and position signals to define latency-corrected second INM velocity and position signals ((483a)) in accordance with correction equations having a form of following Eq. 10b-10c:

$$V_2 = V_1 + \Delta V \qquad \text{Eqs. 10a, 10b, 10c}$$

$$P_2 = P_1 + \Delta T\left(\frac{V_2 + V_1}{2}\right) + \delta t_{IMU}(V_2 - V_1)$$

$$= P_1 + V_2\left(\frac{\Delta T_1}{2} + \delta t_{IMU}\right) + V_1\left(\frac{\Delta T_1}{2} - \delta t_{IMU}\right)$$

where $V_1$ is a first INM velocity signal, $\Delta V$ is platform velocity change associated with a modeled sensor latency ($\delta\Delta t_{imu}$) multiplied by current, inertially sensed, platform acceleration (($a_x$, FIG. 4D)), $P_1$ is a first INM position signal, and $\Delta T$ is a sampling interval of the INM.

Recap 31: The sensor latency compensating method of Recap 30 wherein said compensated-for sensor latency includes at least one of sensor dynamics latency ((454)), sensor input processing delay ((452)), and sensor output transport delay ((456)).

Recap 32: The sensor latency compensating method of Recap 30 wherein said compensated-for sensor latency can be initially measured under controlled laboratory conditions.

Recap 33: The sensor latency compensating method of Recap 30 wherein said modifying of the velocity and position signals is carried out in the inertial navigator module (INM).

Recap 34: The sensor latency compensating method of Recap 30 wherein said estimating of said sensor latency ($\delta t_{imu}$) is generated by:

(a) propagating ((like Eq. 9a)) an estimate of said sensor latency over time using a currently modeled sensor latency ($\delta\Delta t_{imu}$);

(b) measuring change of range residual ($\delta\rho_i$) for at least one GPS space vehicle i relative to said platform; and (c) updating the model of the currently modeled sensor latency ($\delta\Delta t_{imu}$) using the measured change of range residual ($\delta\rho_j$) in response to a measurement versus model balancing equation ((Eq. 9c)) that includes at least $\delta\rho_i$ and $\delta\Delta t_{imu}$ as variables thereof.

Recap 35: An ultra-tightly-coupled GPS/inertial navigation system (UTC system) having an EKF ((474)) that adaptively compensates for differences between received GPS measurements ((471'a)) representing range residual values for respective, different GPS channels at respective GPS sampling times ((t'k1,t'k2)) as designated by an on-platform GPS receiver clock ((497)) and EKF predictions ((473'a)) for those range residual values at EKF times ((tk1,tk2)) corresponding to the respective GPS sampling times; where said EKF prediction model ((473m)) is linearized with respect to a navigation solution from an inertial navigation module (INM) ((480)) of the UTC system and where it takes a first variable delay time ($t_{IMU}$) for the inertial measurement signals to effectively reach a data latching node ((458)) of the INM and where a second variable delay time ($t_d$) or synchronization error time exists between said latching ((458)) of the inertial measurement signals and counterpart latching ((467)) of the GPS sampling data, the UTC system comprising:
- (a) a first variable time compensator ((482b)), the first variable time compensator adding a first sensor latency compensation ($\delta t_{IMU}$) into navigation solution signals ((483a)) output by the INM to account for sensor latency in said first sampling time ($t_{IMU}$).

Recap 36: The UTC system of Recap 35 and further comprising:
- (b) a second variable time compensator ((474c,484b')) provided in the EKF ((470)), the second variable time compensator estimating a second drift compensation ($\delta \Delta t_d$) to be provided between the latched INM and latched GPS data samples before time-matched comparison ((472')) takes place within the EKF of said latched INM and latched GPS data samples.

Recap 37: The UTC system of Recap 36 and further comprising:
- (c) a third variable time compensator ((474a)) provided in the EKF ((470)), the third variable time compensator providing EKF states representing a third drift compensation ($\delta \Delta t_b$) so as to compensate for a clock bias drift that develops between a GPS reference clock ((449)) and the on-platform clock ((497)) of the GPS receiver.

Recap 38: The apparatus of the UTC system of Recap 37 wherein:
said GPS measurements ((465,466)) representing range residuals for respective, different GPS channels at respective GPS sampling times ((t'k1,t'k2)) are stored in a first a first portion of a measurements matrix ((471x));
said EKF predictions ((484a)) for those range residual values based on inertial sensor measurements made at sensor sampling times ((t1,t2)) are stored in a second portion ((482c)) of the measurements matrix ((471x)); and further where the apparatus of the UTC system includes:
time-matched comparator means ((484b,472")) for comparing the archived GPS measurements against correspondingly timed ones of the EKF predictions in order to form corresponding measurement residuals; and
an EKF updator ((472")) operatively coupled to the time-matched comparator means ((472")) and to the EKF model ((473m')) for comparing the measurement residuals against EKF predicted measurement drifts ((474a-c)) and for responsively updating the first through third variable time compensators ((474a-c)) by using said measurement residuals.

Recap 39: In a combined GPS and inertial navigation system, an inertial navigation module ((480)) comprising:
- (a) an inertial signal receiver for receiving inertial measurement signals ((481)) from one or more inertial sensors where at least one of the sensors exhibits at least one of a sensor dynamics delay ((454)), sensor data output transport delay ((456)), and sensor measurement input delay ((453)); and
- (b) a latency compensator ((482b)) for adding to uncompensated velocity and/or position signals produced ((482a)) by the inertial navigation module, delay compensating signals that compensate for one or more of said sensor dynamics delay ((454)), sensor data output transport delay ((456)), and sensor measurement input delay ((453)).

Recap 40: The inertial navigation module ((480)) of Recap 39 and further having a compensated output port ((485)) coupled to a GPS tracking predictor ((490)) of the combined GPS and inertial navigation system, the output compensated output port outputting latency compensated velocity and/or position signals to the GPS tracking predictor.

Recap 41: The inertial navigation module ((480)) of Recap 39 and further having a compensated output port ((485)) coupled to an Error Kalman Filter ((470)) of the combined GPS and inertial navigation system, the output compensated output port outputting latency compensated velocity and/or position signals to said Error Kalman Filter.

E) GPS Tracking Predictor

Recap 42: A GPS tracking predictor ((490)) for use within an ultra-tightly-coupled GPS/inertial navigation system (UTC system) having a GPS signal tracking subsystem, including a carrier demodulator ((235)), a code generator ((243)), and a code correlator ((245)), said UTC system further including an inertial navigation module (INM) ((480)) that generates navigation solution signals ((485)) using inertial-based sensor measurements obtained from an on-platform inertial measurement unit ((255,455)), and an EKF ((470)) that provides navigation and GPS corrections, where to-be-tracked GPS signals are subject to Doppler effects due to relative movement between GPS signal sources and the UTC system, where said INM ((480)) outputs the navigation solution signals ((485)) at a first sampling rate ((100 Hz)), where said EKF ((470)) outputs navigation and GPS correction signals ((475)), at a second sampling rate ((1 Hz)), the second sampling rate being substantially smaller than the first sampling rate, the GPS tracking predictor comprising:
- (a) a first mini-Kalman Filter ((491a',FIG. 4C)) which propagates a replica phase and Doppler shift at a third output sampling rate ((1000 Hz)) substantially greater than the first sampling rate and at half-step-ahead of current sampling time ((485)); and
- (b) a model updater ((472',FIG. 4C)) receiving the navigation solution signals from the INM at said first sampling rate ((100 Hz)), and receiving GPS related corrections ((475b,FIG. 4A)) from the EKF at said second, smaller sampling rate ((1 Hz)), said model updater using residuals of the navigation solution signals compared against the propagated replica phase and Doppler shift so as to update states of the first mini-Kalman Filter ((491a')) so as to reduce error of the replica phase and Doppler as compared against the INM-based counterparts taken at said first sampling rate ((100 Hz)).

Recap 43: The GPS tracking predictor ((490)) of Recap 42 wherein:
said GPS related corrections ((475b,FIG. 4A)) include clock bias and bias drift corrections, atmospheric propagation delay corrections, and antenna moment arm correction.

Recap 44: The GPS tracking predictor ((490)) of Recap 42 wherein:

said replicas include a carrier replica ((493)) and a code replica ((494)).

Recap 45: The GPS tracking predictor ((490)) of Recap 42 wherein:
- (a.1) said time-matched residuals of phase and Doppler shift are computed according to following equation Eq. 8b $$\begin{bmatrix} \delta\phi \\ \delta\dot\phi \end{bmatrix}_{t_c+\frac{1}{2}} = \begin{bmatrix} 1 & \left(t_c + \frac{\Delta t}{2} - t_1\right) \\ 0 & 1 \end{bmatrix} \begin{bmatrix} \phi \\ \dot\phi \end{bmatrix}_{IMU@t_1} - \begin{bmatrix} \phi \\ \dot\phi \end{bmatrix}_{Predictor@t_c+\frac{1}{2}} \quad \text{Eq. 8b}$$

where $\delta\phi$ and its derivatives represent at least one of replica phase and replica Doppler frequency shift, $t_1$ represents a most recent INM sampling time, $t_c$ represents current effective time for the current output of the tracking predictor, $t_c+\frac{1}{2}$ represents the center of time period between the current effective time and next effective time, and $\Delta t$ is the full sampling period of Tracking predictor.

Recap 46: The GPS tracking predictor ((690)) of Recap 42 and further comprising:
- (c) a second mini-Kalman Filter ((491b',FIG. 4C)) which propagates the phase and Doppler of a replica at a fourth output sampling rate ((500 KHz)) substantially greater than the third sampling rate and at a corresponding half-step-ahead of current sampling time ((485')).

F) 2-Stage Wipe-Off

Example of Dual Stage UTC with RRE

Recap 47: An ultra-tightly-coupled GPS/inertial navigation system (UTC system) ((600)) having a multi-stage carrier wipe-off structure and comprising:
- (a) a GPS signal receiver ((610-620)) which receives GPS signals from plural GPS space vehicles over respective frequency bands ((L1,L2)), each in-band signal received from a given vehicle having a corresponding, distinct, phase-defining code ((PRN)), where each unique combination of band and phase-defining code corresponds to a respective GPS channel;
- (b) one or more, first stage carrier demodulators ((635)), each for a respective band and operating to demodulate received GPS carrier on a per-band basis with use of respective, per-band replica carrier signals ((636)) that at least in part use a clock drift signal ((675')) estimated by the EKF, said first stage carrier demodulators generating in-phase and quadrature components ((FIG. 6:I&Q)) on a per-band basis;
- (c) a plurality of per-channel code correlators ((645)), receiving the per-band quadrature components for their respective channels and generating cross-correlation signals representative of cross-correlations between the per-band quadrature components and per-channel replicas of phase-defining codes ((643)) expected in each operative GPS channel, where at least one ((P=prompt)) of the per-channel replicas of phase-defining codes in each operative channel is phase shifted to approximately correlate well with the per-band quadrature components for that channel;
- (d) a plurality of per-channel carrier phase rotators ((646)), receiving the per-channel cross-correlation signals of the respective correlators of their channels, each per-channel carrier phase rotator performing a respective, channel-specific and variable phase shift and summing on its respective per-channel cross-correlation signal so as to reduce phase error between the rotated quadrature components for its channel and the at least one ((P=prompt)) per-channel replica of the phase-defining code which approximately correlates well with the per-band quadrature components for that channel;
- (e) a plurality of per-channel range residual extractors (RRE's) ((660,660')) operatively coupled to the respective, carrier phase rotators of their respective channels, each RRE producing a corresponding, extracted RR signal ((665,671)) representing at least a range residual magnitude ((a0)) for its respective GPS channel;
- (f) a big Error Kalman Filter (EKF) ((670)) receiving the extracted RR signals from said RRE's as measurement residuals that are to be compared ((472)) against predicted range residual magnitudes and derivatives generated by the big EKF;
- (g) an inertial navigation module (INM) ((680)) receiving inertial sensor measurements ((481)) from inertial sensors mounted to a same movable platform as is said UTC system, the INM outputting navigation solution ((485)) at a first sampling rate ((100 Hz)), where at least a representative subset ((468)) of the output navigation solution signals is fedback to the big EKF at a second sampling rate ((1 Hz)) so that the big EKF can generate navigation solution correction signals ((675)) at said second sampling rate for application at least to the INM; and
- (h) a GPS tracking predictor ((690)) receiving the output navigation solution signals at said first sampling rate and receiving the GPS related correction signals ((675)) at said second sampling rate, the GPS tracking predictor responsively producing first and second phase prediction signals, where the first prediction signals ((694)) are generated on a per-channel basis and applied to respective per-channel code generator ((643)) which responsively produce said per-channel replicas of the phase-defining codes in each operative channel, where the replicas are phase shifted in accordance with the first prediction signals ((694)) to approximately correlate well with the per-band quadrature components for that channel;

where the second prediction signals ((647)) are generated on a per-channel basis and applied to respective ones of said per-channel carrier phase rotators ((646)) to responsively cause said reduction in the phase error between the rotated quadrature components for its channel and the at least one ((P=prompt)) per-channel replica of the phase-defining code, and where the second prediction signals ((647)) are generated at a third sampling rate ((500 KHz)) substantially greater than said first sampling rate ((100 Hz)).

Example of Dual Stage UTC with Tracking Predictor

Recap 48: An ultra-tightly-coupled GPS/inertial navigation system (UTC system) ((600)) having a multi-stage carrier wipe-off structure and comprising:
- (a) a GPS signal receiver ((610-620)) which receives GPS signals from plural GPS space vehicles over respective frequency bands ((L1,L2)), each in-band signal received from a given vehicle having a corresponding, distinct, phase-defining code ((PRN)), where each unique combination of band and phase-defining code corresponds to a respective GPS channel;
- (b) one or more, first stage carrier demodulators ((635')), each for a respective band and operating to demodulate received GPS carrier on a per-band basis with use of respective, per-band replica carrier signals ((636)) that at least in part use a clock drift signal ((675')) estimated by the EKF, said first stage carrier demodulators generating in-phase and quadrature components ((FIG. 6:I&Q)) on a per-band basis;

(c) a plurality of per-channel code correlators ((645)), receiving the per-band quadrature components for their respective channels and generating cross-correlation signals representative of cross-correlations between the per-band quadrature components and per-channel replicas of phase-defining codes ((643)) expected in each operative GPS channel, where at least one ((P=prompt)) of the per-channel replicas of phase-defining codes in each operative channel is phase shifted to approximately correlate well with the per-band quadrature components for that channel;

(d) a plurality of per-channel carrier phase rotators ((646)), receiving the per-channel cross-correlation signals of the respective correlators of their channels, each per-channel carrier phase rotator performing a respective, channel-specific and variable phase shift and summing on its respective per-channel cross-correlation signal so as to reduce phase error between the rotated quadrature components for its channel and the at least one ((P=prompt)) per-channel replica of the phase-defining code which approximately correlates well with the per-band quadrature components for that channel; and (h) a GPS tracking predictor ((690)) receiving the output navigation solution signals at said first sampling rate and receiving the GPS related correction signals ((675)) at said second sampling rate, the GPS tracking predictor responsively producing first and second phase prediction signals, where the first prediction signals ((694)) are generated on a per-channel basis and applied to respective per-channel code generator ((643)) which responsively produce said per-channel replicas of the phase-defining codes in each operative channel, where the replicas are phase shifted in accordance with the first prediction signals ((694)) to approximately correlate well with the per-band quadrature components for that channel;

where the second prediction signals ((647)) are generated on a per-channel basis and applied to respective ones of said per-channel carrier phase rotators ((646)) to responsively cause said reduction in the phase error between the rotated quadrature components for its channel and the at least one ((P=prompt)) per-channel replica of the phase-defining code, and where the second prediction signals ((647)) are generated at a third sampling rate ((500 KHz)) substantially greater than said first sampling rate ((100 Hz)).

Recap 49: The UTC system of Recap 48 and further comprising (i) a plurality of per-channel range residual extractors (RRE's) ((660,660')) operatively coupled to the respective, carrier phase rotators of their respective channels, each RRE producing a corresponding, extracted RR signal ((665,671)) representing at least a range residual magnitude ((a0)) for its respective GPS channel;

(j) a big Error Kalman Filter (EKF) ((670)) receiving the extracted RR signals from said RRE's as measurement residuals that are to be compared ((472)) against predicted range residual magnitudes and derivatives generated by the big EKF; and (k) an inertial navigation module (INM) ((680)) receiving inertial sensor measurements ((481)) from inertial sensors mounted to a same movable platform as is said UTC system, the INM outputting navigation solution ((485)) at a first sampling rate ((100 Hz)), where at least a representative subset ((468)) of the output navigation solution signals is fedback to the big EKF at a second sampling rate ((1 Hz)) so that the big EKF can generate navigation solution correction signals ((675)) at said second sampling rate for application at least to the INM;

Recap 50: An ultra-tightly-coupled GPS/inertial navigation system (UTC system) ((600)) having a multi-stage carrier wipe-off structure and comprising:

(a) a GPS signal receiver ((610-620)) which receives GPS signals from plural GPS space vehicles over respective frequency bands ((L1,L2)), each in-band signal received from a given vehicle having a corresponding, distinct, phase-defining code ((PRN)), where each unique combination of band and phase-defining code corresponds to a respective GPS channel;

(b) one or more, first stage carrier demodulators ((635)), each for a respective band and operating to demodulate received GPS carrier on a per-band basis with use of respective, per-band replica carrier signals ((636)) where the replica carrier signals are generated by numerically-controlled oscillators ((631)) that at least in part use a clock drift signal ((675')) estimated by the EKF, said first stage carrier demodulators generating in-phase and quadrature components ((FIG. 6:I&Q)) on a per-band basis;

(c) a plurality of per-channel code correlators ((645)), receiving the per-band quadrature components for their respective channels and generating cross-correlation signals representative of cross-correlations between the per-band quadrature components and per-channel replicas of phase-defining codes ((643)) expected in each operative GPS channel, where at least one ((P=prompt)) of the per-channel replicas of phase-defining codes in each operative channel is phase shifted to approximately correlate well with the per-band quadrature components for that channel;

(d) a plurality of per-channel carrier phase rotators ((646)), receiving the per-channel cross-correlation signals of the respective correlators of their channels, each per-channel carrier phase rotator performing a respective, channel-specific and variable phase shift and summing on its respective per-channel cross-correlation signal so as to reduce phase error between the rotated quadrature components for its channel and the at least one ((P=prompt)) per-channel replica of the phase-defining code which approximately correlates well with the per-band quadrature components for that channel; and (e) a plurality of per-channel range residual extractors (RRE's) ((660,660')) operatively coupled to the respective, carrier phase rotators of their respective channels, each RRE producing a corresponding, extracted RR signal ((665,671)) representing at least a range residual magnitude ((a0)) for its respective GPS channel.

Recap 51: The multi-stage wipe-off structured UTC system of Recap 50 and further comprising:

(f) a big Error Kalman Filter (EKF) ((670)) receiving the extracted RR signals from said RRE's as measurement residuals that are to be compared ((472)) against predicted range residual magnitudes and derivatives generated by the big EKF;

(g) an inertial navigation module (INM) ((680)) receiving inertial sensor measurements ((481)) from inertial sensors mounted to a same movable platform as is said UTC system, the INM outputting navigation solution ((485)) at a first sampling rate ((100 Hz)), where at least a representative subset ((468)) of the output navigation solution signals is fedback to the big EKF at a second sampling rate ((1 Hz)) so that the big EKF can generate navigation solution correction signals ((675)) at said second sampling rate for application at least to the INM;

(h) a GPS tracking predictor ((690)) receiving the output navigation solution signals at said first sampling rate and receiving the GPS related correction signals ((675)) at said second sampling rate, the GPS tracking predictor responsively producing first and second phase prediction signals, where the first prediction signals ((694)) are generated on a per-channel basis and applied to respective per-channel code generator ((643)) which responsively produce said per-channel replicas of the phase-defining codes in each operative channel, where the replicas are phase shifted in accordance with the first prediction signals ((694)) to approximately correlate well with the per-band quadrature components for that channel;

where the second prediction signals ((647)) are generated on a per-channel basis and applied to respective ones of said per-channel carrier phase rotators ((646)) to responsively cause said reduction in the phase error between the rotated quadrature components for its channel and the at least one ((P=prompt)) per-channel replica of the phase-defining code, and where the second prediction signals ((647)) are generated at a third sampling rate ((500 KHz)) substantially greater than said first sampling rate ((100 Hz)).

Recap 52: The multi-stage carrier wipe-off structured UTC system of Recap 50 wherein:

(a.1) said GPS signal receiver ((610-620)) is implemented in one or both of hardware and firmware; and (b.1) said one or more, first stage carrier demodulators ((635)) are implemented in software executing on a corresponding processor ((601)).

Recap 53: The multi-stage carrier wipe-off structured UTC system of Recap 50 wherein:

(e.1) one or more of said per-channel range residual extractors use curve fitting to extract their respectively extracted RR signals ((665,671)).

Recap 54: The multi-stage wipe-off structured UTC system of Recap 50 wherein:

(f.1) said big EKF ((670)) has at least 100 Kalman error states.

Recap 55: The multi-stage carrier wipe-off structured UTC system of Recap 50 wherein:

(f.1) said big EKF ((670)) includes a clock bias drift estimator ((474a)) for modeling over-time drift in a clock bias ($\Delta t_b$) that develops between a reference clock of the utilized GPS constellation ((101-103)) and an on-platform reference clock ((497)) of the UTC system.

Recap 56: The multi-stage carrier wipe-off structured UTC system of Recap 50 wherein:

(f.1) said big EKF ((670)) includes a data synchronization error estimator ((474c)) for estimating a data synchronization error ($\Delta t_d$) between navigation solution ((485)) and GPS measurements.

Recap 57: The multi-stage carrier wipe-off structured UTC system of Recap 50 wherein:

(g.1) said INM ((680)) includes a sensor latency compensator ((482)) for compensating IMU sensor latency ($\Delta t_{imu}$).

Recap 58: The multi-stage carrier wipe-off structured UTC system of Recap 50 wherein:

(h.1) said GPS tracking predictor ((690)) includes a plurality of filtering propagators ((491a-b)) for generating said second carrier prediction signals ((647)) on a per-channel basis and at said third sampling rate ((500 KHz)).

G) 1-Stage Wipe-Off, Simpler UTC System

UTC with RRE and Tracking Predictor

Recap 59: An ultra-tightly-coupled GPS/inertial navigation system (UTC system) ((200)) comprising:

(a) a GPS signal receiver ((210-220)) which receives GPS signals from plural GPS space vehicles over respective frequency bands ((L1,L2)), each in-band signal received from a given vehicle having a corresponding, distinct, phase-defining code ((PRN)), where each unique combination of band and phase-defining code corresponds to a respective GPS channel;

(b) one or more, digital demodulators ((235)), each for a respective GPS channel and operating to demodulate received GPS signals on a per-channel basis with use of respective, per-channel replica carrier signals ((236)) generated by respective per-channel, carrier frequency replicators ((231,431)), said demodulators generating in-phase and quadrature components ((I&Q)) on a per-channel basis;

(c) a plurality of per-channel correlators ((245)), receiving the per-channel quadrature components for their respective channels and generating cross-correlation signals representative of cross-correlations between the per-channel quadrature components and per-channel replicas of phase-defining codes ((243)) expected in each operative GPS channel, where at least one ((P=prompt)) of the per-channel replicas of phase-defining codes in each operative channel is phase shifted to approximately correlate well with the per-channel quadrature components for that channel;

(d) a plurality of per-channel range residual extractors (RRE's) ((260,260')) operatively coupled to the respective, per-channel correlators of their respective channels, each RRE producing a corresponding, extracted RR signal ((265,271)) representing at least a range residual magnitude ((a0)) for its respective GPS channel;

wherein one or more of said per-channel range residual extractors use curve fitting to extract their respectively extracted RR signals ((265,271));

(e) a big Error Kalman Filter (EKF) ((470)) receiving the extracted RR signals from said RRE's as measurement inputs that are to be compared ((472)) against predicted range residual magnitudes and derivatives generated by the big EKF;

(f) an inertial navigation module (INM) ((280)) receiving inertial sensor measurements ((281)) from inertial sensors mounted to a same movable platform as is said UTC system, the INM outputting navigation solution signals ((485)) at a first sampling rate ((100 Hz)), where at least a representative subset ((468)) of the output navigation solution is fedback to the big EKF at a second sampling rate ((1 Hz)) so that the big EKF can generate navigation solution correction signals ((475)) at said second sampling rate for application at least to the INM; and (g) a GPS tracking predictor ((490)) receiving the output navigation solution signals at said first sampling rate and receiving the GPS related correction signals ((475b)) at said second sampling rate, the GPS tracking predictor responsively producing first and second phase prediction signals, where the first prediction signals ((294)) are generated on a per-channel basis and applied to respective per-channel code generator ((241-243)) which responsively produce said per-channel replicas of the phase-defining codes in each operative channel, where the replicas are phase shifted in accordance with the first prediction signals ((294)) to approximately correlate well with the per-band quadrature components for that channel;

where the second prediction signals ((293,493)) are generated on a per-channel basis and applied to respective ones of said carrier replicators ((231,431)) to responsively cause a reduction in the carrier phase and Doppler error between the demodulated quadrature components ((out-of-235*i*,*q*)) for its channel and the at least one ((P=prompt)) per-channel carrier replica, and where the second prediction signals ((293)) are generated at a third sampling rate ((1 KHz)) substantially greater than said first sampling rate ((100 Hz)).

UTC with Tracking Predictor:

Recap 60: An ultra-tightly-coupled GPS/inertial navigation system (UTC system) ((200)) comprising:
 (a) a GPS signal receiver ((210-220)) which receives GPS signals from plural GPS space vehicles over respective frequency bands ((L1,L2)), each in-band signal received from a given vehicle having a corresponding, distinct, phase-defining code ((PRN)), where each unique combination of band and phase-defining code corresponds to a respective GPS channel;
 (b) one or more, digital demodulators ((235)), each for a respective GPS channel and operating to demodulate received GPS signals on a per-channel basis with use of respective, per-channel replica carrier signals ((236)) generated by respective per-channel, carrier frequency replicators ((231,431)), said demodulators generating in-phase and quadrature components ((I&Q)) on a per-channel basis;
 (c) a plurality of per-channel correlators ((245)), receiving the per-channel quadrature components for their respective channels and generating cross-correlation signals representative of cross-correlations between the per-channel quadrature components and per-channel replicas of phase-defining codes ((243)) expected in each operative GPS channel, where at least one ((P=prompt)) of the per-channel replicas of phase-defining codes in each operative channel is phase shifted to approximately correlate well with the per-channel quadrature components for that channel; and
 (d) a GPS tracking predictor ((490)) receiving the output navigation solution signals at said first sampling rate and receiving the GPS related correction signals ((475*b*)) at said second sampling rate, the GPS tracking predictor responsively producing first and second phase prediction signals,
  where the first prediction signals ((294)) are generated on a per-channel basis and applied to respective per-channel code generator ((241-243)) which responsively produce said per-channel replicas of the phase-defining codes in each operative channel, where the replicas are phase shifted in accordance with the first prediction signals ((294)) to approximately correlate well with the per-band quadrature components for that channel;
  where the second prediction signals ((293,493)) are generated on a per-channel basis and applied to respective ones of said carrier replicators ((231,431)) to responsively cause a reduction in the carrier phase and Doppler error between the demodulated quadrature components ((out-of-235*i*,*q*)) for its channel and the at least one ((P=prompt)) per-channel carrier replica, and where the second prediction signals ((293)) are generated at a third sampling rate ((1 KHz)) substantially greater than said first sampling rate ((100 Hz)).

Recap 61: The UTC system of Recap 60 and further comprising:
 (e) a plurality of per-channel range residual extractors (RRE's) ((260,260')) operatively coupled to the respective, per-channel correlators of their respective channels, each RRE producing a corresponding, extracted RR signal ((265,271)) representing at least a range residual magnitude ((a0)) for its respective GPS channel;
  wherein one or more of said per-channel range residual extractors use curve fitting to extract their respectively extracted RR signals ((265,271));
 (f) a big Error Kalman Filter (EKF) ((470)) receiving the extracted RR signals from said RRE's as measurement inputs that are to be compared ((472)) against predicted range residual magnitudes and derivatives generated by the big EKF; and
 (g) an inertial navigation module (INM) ((280)) receiving inertial sensor measurements ((281)) from inertial sensors mounted to a same movable platform as is said UTC system, the INM outputting navigation solution signals ((485)) at a first sampling rate ((100 Hz)), where at least a representative subset ((468)) of the output navigation solution is fedback to the big EKF at a second sampling rate ((1 Hz)) so that the big EKF can generate navigation solution correction signals ((475)) at said second sampling rate for application at least to the INM.

UTC with RRE:

Recap 62: An ultra-tightly-coupled GPS/inertial navigation system (UTC system) ((200)) comprising:
 (a) a GPS signal receiver ((210-220)) which receives GPS signals from plural GPS space vehicles over respective frequency bands ((L1,L2)), each in-band signal received from a given vehicle having a corresponding, distinct, phase-defining code ((PRN)), where each unique combination of band and phase-defining code corresponds to a respective GPS channel;
 (b) one or more, digital demodulators ((235)), each for a respective GPS channel and operating to demodulate received GPS signals on a per-channel basis with use of respective, per-channel replica carrier signals ((236)) generated by respective per-channel, carrier frequency replicators ((231,431)), said demodulators generating in-phase and quadrature components ((I&Q)) on a per-channel basis;
 (c) a plurality of per-channel correlators ((245)), receiving the per-channel quadrature components for their respective channels and generating cross-correlation signals representative of cross-correlations between the per-channel quadrature components and per-channel replicas of phase-defining codes ((243)) expected in each operative GPS channel, where at least one ((P=prompt)) of the per-channel replicas of phase-defining codes in each operative channel is phase shifted to approximately correlate well with the per-channel quadrature components for that channel; and
 (d) a plurality of per-channel range residual extractors (RRE's) ((260,260')) operatively coupled to the respective, per-channel correlators of their respective channels, each RRE producing a corresponding, extracted RR signal ((265,271)) representing at least a range residual magnitude ((a0)) for its respective GPS channel;
  wherein one or more of said per-channel range residual extractors use curve fitting to extract their respectively extracted RR signals ((265,271)).

Recap 63: The UTC system ((200)) of Recap 62 and further comprising:
  (e) a big Error Kalman Filter (EKF) ((470)) receiving the extracted RR signals from said RRE's as measurement inputs that are to be compared ((472)) against predicted range residual magnitudes and derivatives generated by the big EKF;
  (f) an inertial navigation module (INM) ((280)) receiving inertial sensor measurements ((281)) from inertial sensors mounted to a same movable platform as is said UTC system, the INM outputting navigation solution signals ((485)) at a first sampling rate ((100 Hz)), where at least a representative subset ((468)) of the output navigation solution is fedback to the big EKF at a second sampling rate ((1 Hz)) so that the big EKF can generate navigation solution correction signals ((475)) at said second sampling rate for application at least to the INM; and
  (g) a GPS tracking predictor ((490)) receiving the output navigation solution signals at said first sampling rate and receiving the GPS related correction signals ((475*b*)) at said second sampling rate, the GPS tracking, predictor responsively producing first and second phase prediction signals,
    where the first prediction signals ((294)) are generated on a per-channel basis and applied to respective per-channel code generator ((241-243)) which responsively produce said per-channel replicas of the phase-defining codes in each operative channel, where the replicas are phase shifted in accordance with the first prediction signals ((294)) to approximately correlate well with the per-band quadrature components for that channel;
    where the second prediction signals ((293,493)) are generated on a per-channel basis and applied to respective ones of said carrier replicators ((231,431)) to responsively cause a reduction in the carrier phase and Doppler error between the demodulated quadrature components ((out-of-235*i,q*)) for its channel and the at least one ((P=prompt)) per-channel carrier replica, and
    where the second prediction signals ((293)) are generated at a third sampling rate ((1 KHz)) substantially greater than said first sampling rate ((100 Hz)).

Recap 64: The UTC system ((200)) of Recap 63 wherein:
  (e.1) said big EKF ((270)) has at least 100 Kalman error states.

Recap 65: The UTC system ((200)) of Recap 63 wherein:
  (e.1) said big EKF ((270)) includes a clock bias drift estimator ((474*a*)) for modeling over-time drift in a clock bias ($\Delta t_b$) that develops between a reference clock of the utilized GPS constellation ((101-103)) and an on-platform receiver reference clock ((497)) of the UTC system.

Recap 66: The UTC system ((200)) of Recap 63 wherein:
  (f.1) said big EKF ((270)) includes a data synchronization error estimator ((474*c*)) for estimating over-time drift in a data synchronization error ($\Delta t_d$) between navigation solution ((485)) from the INM and GPS measurements.

Recap 67: The UTC system ((200)) of Recap 63 wherein:
  (f.1) said INM ((680)) includes a sensor latency compensator ((474*b*)) for compensating over-time drift in an IMU sensor latency ($\Delta t_{imu}$).

Recap 68: The UTC system ((200)) of Recap 63 wherein:
  (g.1) said GPS tracking predictor ((490)) includes a plurality of filtering propagators ((491-*ba*)) for generating said second prediction signals ((293)) on a per-channel basis and at said third sampling rate ((1 KHz)).

Recap 69: A method for providing ultra-tightly-coupled (UTC), synergistic interaction between an inertial measurement portion and a GPS receiving portion of an on-platform navigation system, the method comprising:
  (a) receiving ((210-220)) a plurality of GPS signals from plural GPS space vehicles over respective frequency bands ((L1,L2)), each in-band signal received from a given vehicle having a corresponding, phase-defining code ((PRN)), where each unique combination of band and phase-defining code corresponds to a respective GPS channel;
  (b) demodulating ((235)) received GPS signals on a per-channel basis by using a respective, per-channel carrier replica ((236)) for each respective GPS channel, the per-channel carrier replica ((236)) being generated by respective per-channel, carrier replicators ((231,431)), said demodulating generating in-phase and quadrature components ((I&Q)) on a per-channel basis;
  (c) cross-correlating ((245)) the per-channel quadrature components of the respective channels with per-channel replicas of phase-defining codes ((243)) expected in each operative GPS channel, where at least one ((P=prompt)) of the per-channel replicas of phase-defining codes in each operative channel is phase shifted to approximately correlate well with the per-channel quadrature components for that channel, said cross-correlating generating cross-correlation signals representative of said cross-correlations between the per-channel quadrature components and the per-channel replicas of phase-defining codes; and
  (d) extracting from the cross-correlation signals, extracted RR signals ((265,271)) that each represent at least a range residual magnitude ((a0)) for its respective GPS channel;
    wherein one or more of said per-channel range residual extractions use curve fitting to extract their respectively extracted RR signals ((265,271)).

Recap 70: The UTC method of Recap 69 and further comprising:
  (e) using a big Error Kalman Filter (EKF) ((470)) to receive the extracted RR signals as measurement residuals and to compare ((472)) the measurement residuals against predicted range residual magnitudes and derivatives generated by the big EKF;
  (f) using an inertial navigation module (INM) ((280)) to receive inertial sensor measurements signals ((281)) from inertial sensors mounted to a same movable platform as is said UTC system, the INM outputting navigation solution ((485)) at a first sampling rate ((100 Hz)), where at least a representative subset ((468)) of the output navigation solution signals is fedback to the big EKF at a second sampling rate ((1 Hz)) so that the big EKF can generate navigation solution correction signals ((475)) at said second sampling rate for application at least to the INM;
  (g) using a GPS tracking predictor ((490)) to receive the output navigation solution at said first sampling rate and to receive the GPS related correction signals ((475*b*)) at said second sampling rate, where the GPS tracking predictor responsively produces first and second phase prediction signals, and
    where the first prediction signals ((294)) are generated on a per-channel basis and applied to respective per-channel code generator ((241-243)) which responsively produce said per-channel replicas of the phase-defining codes in each operative channel, where the replicas are phase shifted in accordance with the first prediction signals ((294)) to approximately correlate well with the per-band quadrature components for that channel; and where the second prediction signals (($293,493$)) are generated on a per-channel basis and applied to respective ones of said carrier replicators (($231,431$)) to responsively cause a reduction in the phase and Doppler error between the demodulated quadrature components ((out-of-$235i,q$)) for its channel and the at least one ((P=prompt)) per-channel replica of the phase-defining code, and where the second prediction signals (($293$)) are generated at a third sampling rate ((1 KHz)) substantially greater than said first sampling rate ((100 Hz)).

Recap 71: A navigation system providing ultra-tight coupling between GPS tracking subsystem and inertial navigation subsystem, and comprising:
(a) a code phase error measurement unit (($245$)) for generating code phase error signals (($261$)) indicative of a correlation-determined relationship between in-phase and quadrature phase components of a received GPS signal relative and that of a locally generated code replica signal (($243P$)), generated using a tracking predictor using navigation solution from an INM; and
(b) a curve-fitting Range Residual Extractor (RRE) (($260$)), operatively coupled to the phase shift measurement unit for receiving the code phase error signals as a first set of samples and for computing curve fitting parameters (($265$)), for fitting a polynomial of predetermined order to the first set of samples in accordance with predetermined curve fitting criteria, where fitting error between the fitted curve and the first set of samples is indicative of an amount of noise present in the code phase error signals generated by the code phase error measurement unit;

Recap 72: The navigation system of Recap 71 and further comprising:
(c) an error Kalman filter (($270$)), operatively coupled to the RRE and responsive to the curve fitting parameters (($265$)) computed by the RRE.

Recap 73: A method for providing ultra-tight coupling between GPS tracking and inertial navigation of an integrated navigation system, the method comprising:
(a) generating code phase error signals (($261$)) indicative of a correlation-determined relationship between in-phase and quadrature phase components of a received GPS signal relative and that of a locally generated code replica signal (($243P$)), generated by a tracking predictor using navigation solution from a INM;
(b) collecting a first set of code phase error signals as a first set of samples for computing curve fitting parameters (($265$)) for fitting a polynomial of predetermined order to the first set of samples in accordance with predetermined curve fitting criteria; and
(c) generating (($500$)) from the collected first set of code phase error signals, said corresponding set of curve fitting parameters (($265$)) for fitting the polynomial of predetermined order to the first set of samples in accordance with the predetermined curve fitting criteria.

Recap 74: The method of Recap 73 wherein:
(c.1) a first of said curve fitting parameters (($a0$)) is indicative of a range residual between a source (($101$)) of the received GPS signal and a receiving platform (($250$)), operatively coupled to the code phase error measurement unit for where fitting error between the fitted curve and the first set of samples is indicative of an amount of noise present in the code phase error signals generated by the phase shift measurement unit.

Recap 75: A navigation system providing ultra-tight coupling between GPS tracking subsystem and inertial navigation subsystem, and comprising:
(a) a curve-fitting Range Residual Extractor (RRE) (($260$)) which finds a best-fit polynomial (($312$)) representing range residual versus time from correlation measurements (($311$)) between an incoming GPS signal and a locally-generated replica (($243$)) for that incoming GPS signal.

Recap 76: The navigation system of Recap 75 wherein said locally-generated replica (($243$)) is generated by a tracking predictor (($290$)) that is responsive to navigation solution signals sampled from an INM (($280$)).

Recap 77: The navigation system of Recap 75 where the best-fit polynomial (($312$)) is third order.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A method of determining a relative range parameter that is descriptive of a relative range (RR) that changes as a function of time, the relative range parameter representing for a first corresponding time point, one or more of changing range aspects between a first physical object and a second physical object moving relative to each other, said method comprising:
(a) receiving a signal at said first object from said second object;
(b) obtaining over-time samplings, including past samplings in a neighborhood leading up to the first corresponding time point, of at least one relative phase signal representing a changing phase condition between said received signal and a locking-on replica signal produced by said first object;
(c) applying a curve fitting algorithm to said obtained over-time samplings of the at least one relative phase signal, where the curve fitting algorithm produces a fitted and parameterized curve extending at least to the first corresponding time point and extending through the neighborhood of said past samplings; and
(d) predictively determining the relative range parameter for the first corresponding time point from use of said curve fitting algorithm;
(e) repeating steps (a) to (d) for a next corresponding time point;
where said locking-on replica signal used in conjunction with the first corresponding time point is produced in response to a carrying out of predictive step (d) for a previous corresponding time point preceding the first corresponding time point.

2. The method of claim 1 wherein said relative range parameter is selected from the group consisting of: a derivative of a relative range, or a combination of both a relative range and a derivative of said relative range.

3. The method of claim 1 wherein:
said first object is an agile platform whose motions tend to induce substantial Doppler shifts in the frequency and phase of the received signal;
said second object is a GPS space vehicle; and
said signal is a GPS signal comprising at least one pseudo-random code sequence.

4. The method of claim 1 wherein said relative phase is a relative carrier phase between a carrier phase of said signal and a carrier phase of said replica signal.

5. The method of claim 1 wherein said relative phase is a relative code phase between a code phase of said signal and a code phase of said replica signal.

6. The method of claim 1 wherein said relative phase is a combination of a relative carrier phase between a carrier phase of said signal and a carrier phase of said replica signal, and a relative code phase of said signal and a code phase of said replica signal.

7. The method of claim 1 wherein said curve fitting algorithm uses at least one technique selected from the group consisting of: an Nth order polynomial fit, a spline fit, a Fourier series fit, and a Tchebychev fit.

8. The method of claim 7 wherein said curve fitting algorithm is an Nth order polynomial fit applied to m samples of said at least one relative phase and, wherein m is greater than N.

9. The method of claim 8 wherein m is selected for having a matching output sampling rate corresponding to an input rate of a predefined extended Kalman filter.

10. The method of claim 1 wherein said curve fitting algorithm processes said obtained over-time samplings of the at least one relative phase using backward running time.

11. A machine-implemented method for predictively defining a relative range as a function of time between a first physical object and a second physical object moving relative to each other, the machine-implemented method comprising:
(a) automatically receiving a signal transmitted from the second object, wherein said received signal comprises a plurality of embedded code streams;
(b) obtaining past relative phase samples by automatically measuring over time and storing at least one relative phase indicator indicative of relative phase between said embedded code stream and a corresponding at least one, locking-on replica code steam produced by said first object;
(c) automatically applying a curve fitting algorithm to said obtained past relative phase samples so that the curve fitting algorithm produces a fitted and predictive curve which predicts a next expected value and next expected rate of change for the measured relative phase; and
(d) automatically using the predicted relative range values to assist in future carrying outs of said automated step of receiving the signal transmitted from the second object.

12. A machine-implemented method for determining relative range as a function of time between first and second physical objects moving relative to one another, the machine-implemented method comprising:
(a) receiving at said first object a first signal transmitted from said second object, where said first signal includes a first embedded code stream that can be used to define the phase of said first signal as received at said first object relative to a corresponding first replica code stream produced in said first object;
(b) automatically defining the first relative range between the first and second objects as a first, unknown $N^{th}$ order polynomial of relative phase as a function of time;
(c) within the first object, taking m measurements of relative phase between the first embedded code stream and the first replica code stream, where m is greater than N;
(d) automatically fitting a first, $N^{th}$ order polynomial to the taken, m measurements in accordance with a first predefined curve fitting algorithm; and
(e) using the first fitted $N^{th}$ order polynomial to define a first relative range and one or more over time derivatives of the first relative range at a given first time.

13. The machine-implemented method of claim 12 wherein the first given time follows the associated occurrence times of at least m−1 of the measured relative phases to thereby cause the defining in step (e) of the first relative range and one or more of its over time derivatives to substantially be a predictive definition of the first relative range and its one or more derivatives.

* * * * *

UNITED STATES PATENT AND TRADEMARK OFFICE
CERTIFICATE OF CORRECTION

PATENT NO. : 7,579,984 B2 Page 1 of 1
APPLICATION NO. : 11/286031
DATED : August 25, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 772 days.

Signed and Sealed this

Fourteenth Day of September, 2010

David J. Kappos
*Director of the United States Patent and Trademark Office*